United States Patent
Smith, Jr. et al.

(10) Patent No.: US 7,680,737 B2
(45) Date of Patent: Mar. 16, 2010

(54) SYSTEMS AND METHODS FOR PROCESSING PAYMENTS WITH PAYMENT REVIEW FEATURES

(75) Inventors: Gordon L. B. Smith, Jr., Littleton, CO (US); Emiko Gordon, Westminster, CO (US); Dennis Lee, Coon Rapids, MN (US)

(73) Assignee: Moneygram International, Inc., St. Louis Park, MN (US)

( * ) Notice: Subject to any disclaimer, the term of this patent is extended or adjusted under 35 U.S.C. 154(b) by 798 days.

(21) Appl. No.: 11/482,187

(22) Filed: Jul. 6, 2006

(65) Prior Publication Data

US 2008/0010200 A1 Jan. 10, 2008

(51) Int. Cl.
*G06Q 40/00* (2006.01)
(52) U.S. Cl. .............................. 705/41; 705/4; 705/35; 705/36; 445/404.2; 379/112.06; 379/133
(58) Field of Classification Search ................ 705/1–80; 455/404.2; 379/112.06, 133
See application file for complete search history.

(56) References Cited

U.S. PATENT DOCUMENTS

| | | | |
|---|---|---|---|
| 5,383,113 A | 1/1995 | Kight et al. | |
| 5,465,206 A | 11/1995 | Hilt et al. | |
| 5,649,117 A | 7/1997 | Landry | |
| 5,920,847 A | 7/1999 | Kolling et al. | |
| 5,956,700 A | 9/1999 | Landry | |
| 5,987,132 A | 11/1999 | Rowney | |
| 6,032,133 A | 2/2000 | Hilt et al. | |
| 6,408,284 B1 | 6/2002 | Hilt et al. | |
| 6,892,180 B1 * | 5/2005 | Pointeau et al. ............... | 705/14 |
| 6,996,542 B1 | 2/2006 | Landry | |
| 7,031,939 B1 | 4/2006 | Gallagher et al. | |
| 7,248,855 B2 * | 7/2007 | Joyce et al. .................. | 455/406 |
| 2002/0023055 A1 | 2/2002 | Antognini et al. | |
| 2002/0120846 A1 | 8/2002 | Stewart et al. | |
| 2003/0200107 A1 | 10/2003 | Allen et al. | |
| 2004/0034594 A1 | 2/2004 | Thomas et al. | |
| 2004/0049456 A1 | 3/2004 | Dreyer | |
| 2004/0064407 A1 | 4/2004 | Kight et al. | |
| 2004/0064408 A1 | 4/2004 | Kight et al. | |
| 2004/0064409 A1 | 4/2004 | Kight et al. | |

(Continued)

OTHER PUBLICATIONS

MasterCard staff, All About payment cards, 2005, MasterCard International, pp. 1-3.*

(Continued)

*Primary Examiner*—James P Trammell
*Assistant Examiner*—Marissa Liu
(74) *Attorney, Agent, or Firm*—Michael Best & Friedrich LLP

(57) ABSTRACT

Methods and systems of processing a plurality of payments. One method can include receiving the plurality of payments from a plurality of customers, the plurality of payments payable to at least one receiver, determining a first set of payments included in the plurality of payments to automatically accept based on validation parameters, determining a second set of payments included in the plurality of payments to reject based on the validation parameters, determining a third set of payments included in the plurality of payments to conditionally accept based on the validation parameters, and electronically prompting at least one user to accept or reject payments included in the third set of payments.

13 Claims, 43 Drawing Sheets

U.S. PATENT DOCUMENTS

| | | |
|---|---|---|
| 2004/0064410 A1 | 4/2004 | Kight et al. |
| 2004/0139008 A1 | 7/2004 | Mascavage, III |
| 2004/0236687 A1 | 11/2004 | Tyson-Quah |
| 2005/0033604 A1 | 2/2005 | Hogan |
| 2005/0033690 A1 | 2/2005 | Antognini et al. |
| 2005/0065893 A1 | 3/2005 | Josephson |
| 2005/0075978 A1 | 4/2005 | Leavitt et al. |
| 2005/0171862 A1 | 8/2005 | Duncan |
| 2005/0177437 A1 | 8/2005 | Ferrier |
| 2005/0177505 A1 | 8/2005 | Keeling et al. |
| 2005/0192901 A1 | 9/2005 | McCoy et al. |
| 2005/0222952 A1 | 10/2005 | Garrett et al. |
| 2006/0074802 A1 | 4/2006 | Hall et al. |
| 2006/0080238 A1 | 4/2006 | Nielsen et al. |

OTHER PUBLICATIONS

PCT/US06/26265 International Search Report.

\* cited by examiner

| WORK DAY | DATE | ITEMS FOR REVIEW | ACCEPTED | REJECTED | OPEN | % OPEN | % REJECTED |
|---|---|---|---|---|---|---|---|
| TODAY | 2-JAN | 30 | 26 | 4 | 0 | 0.0% | 13.3% |
| 2 DAYS | 31-DEC | 25 | 21 | 1 | 3 | 12.0% | 4.0% |
| 3 DAYS | 30-DEC | 28 | 25 | 3 | 0 | 0.0% | 10.7% |
| PROCESSING WINDOW MTD YTD | 3 DAYS | 83 | 69 | 8 | 3 | 3.6% | 9.6% |

LOGO

DEMO USER – ADEMO003   [HOME]   [AGENT LOCATOR]
XYZ CORPORATION

VIEW PRINTABLE REPORT   PRINT RECEIPTS

☐ Zipped File   (DOWNLOAD REPORT)
Comma Separated Values (CSV) Format ▼

Runtime: 5/15/2006 9:08 PM CDT
Business Week: Monday-Friday
End of Business Day: 5:45:00 PM FOR QUESTIONS, PLEASE CONTACT YOUR
ACCOUNT RELATIONS MANAGER OR
CUSTOMER SERVICE AT 1-800-555-5555

Transactions (5)
1-2 of 5 Transactions

Transaction Period 5/15/2006 8:08:00 PM CDT – 5/15/2006 9:08:00 PM CDT

<<Previous Next>>   Go to Page: [1 ▼] of 3

| Reference # | Date/Time △ | Sender Name | Amount | Account # | Receive Location | Message | Transaction Status | Tracked Transaction Effective Date | Tracking History |
|---|---|---|---|---|---|---|---|---|---|
| 00000000 | 5/15/2006 8:10 PM CDT | John Doe | $135.00 | 0123456 | 0000 | (DEMO) | Received | | |
| 00000001 | 5/12/2006 8:45 PM CDT | Jane Doe | $50.00 | 0123457 | 0000 | (DEMO) | Received | | Tracked by ADEMO002 2/16/2006 |

Totals
Receive Location                        Transactions   Amount
0000 – XYZ Corporation – Minneapolis – 99999999    5    $288.05
Grand Total                                        5    $288.05

<<Previous Next>>   Go to Page: [1 ▼] of 3

LOGO

DEMO USER – ADEMO003  [HOME]  [AGENT LOCATOR]  TRANSACTION TOOLS  USER ADMIN  BILLER MAIN OFFICE  LOGOFF
XYZ CORPORATION

REPORTS

VIEW PRINTABLE REPORT  PRINT RECEIPTS

Comma Separated Values (CSV) Format ▼  ☐ Zipped File  DOWNLOAD REPORT

FOR QUESTIONS, PLEASE CONTACT YOUR ACCOUNT RELATIONS MANAGER OR CUSTOMER SERVICE AT 1-800-555-5555

Transaction Period 4/6/2006 5:00:01 PM CDT – 4/12/2006 5:00:00 PM CDT
Runtime: 4/12/2006 6:54 PM CDT
Business Week: Monday-Friday
End of Business Day: 5:00:00 PM Transactions (9)
1-5 of 9 Transactions
Select to Track All None <<Previous Next>>  Go to Page: [1 ▼] of 2

| Track | Reference # | Date/Time △ | Sender Name | Amount | Account # |
|---|---|---|---|---|---|
| ☑ | 00000000 | 4/6/2006 7:24 PM CDT | John Doe | $150.00 | 0123456 |
| ☐ | 00000001 | 4/6/2006 8:21 PM CDT | Jane Doe | $50.00 | 0123457 |
| ☐ | 00000002 | 4/6/2006 8:21 PM CDT | James Doe | $275.00 | 0123458 |
| ☑ | 00000003 | 4/6/2006 10:10 PM CDT | Jack Doe | $250.00 | 0123459 |
| ☐ | 00000004 | 4/6/2006 10:21 PM CDT | Jill Doe | $195.00 | 0123460 |

<<Previous Next>>  Go to Page: [1 ▼] of 2

TRACK – ALL RESULTS    TRACK – SELECTED

LOGO

REPORTS | TRANSACTION TOOLS | USER ADMIN | BILLER MAIN OFFICE | LOGOFF

DEMO USER – ADEMO003    [HOME]    [AGENT LOCATOR]
XYZ CORPORATION

FOR QUESTIONS, PLEASE CONTACT YOUR ACCOUNT RELATIONS MANAGER OR CUSTOMER SERVICE AT 1-800-555-5555

( VIEW PRINTABLE REPORT )   ( PRINT RECEIPTS )
Comma Separated Values (CSV) Format ▼   ☐ Zipped File   ( DOWNLOAD REPORT )

Runtime: 3/14/2006 8:19 AM MST
Business Week: Monday-Saturday
End of Business Day: 5:45:00 PM
Completed Transactions
Transaction Period: 3/13/2006 5:45:01 PM MST – 3/14/2006 5:45:00 PM MST Transactions (9)
1-5 of 9 Transactions <<Previous Next>>    Go to Page: [1 ▼] of 2

| Reference # | Date/Time ▲ | Sender Name | Amount | Account # | Processed Action |
|---|---|---|---|---|---|
| 00000040 | 3/13/2006 7:45 PM MST | Jesse Doe | $130.00 | 0123600 | Accepted |
| 00000041 | 3/13/2006 8:45 PM MST | Joseph Doe | $53.00 | 0123601 | Accepted |
| 00000042 | 3/13/2006 9:45 PM MST | Judy Doe | $71.00 | 0123602 | Accepted |
| 00000043 | 3/13/2006 9:47 PM MST | Juniper Doe | $220.00 | 0123603 | Rejected |
| 00000044 | 3/13/2006 9:51 PM MST | Joshua Doe | $119.00 | 0123604 | Accepted |

<<Previous Next>>    Go to Page: [1 ▼] of 2

150 → LOGOFF

LOGO  REPORTS  TRANSACTION TOOLS  USER ADMIN  BILLER MAIN OFFICE

DEMO USER – ADEMO003  [HOME]  [AGENT LOCATOR]  FOR QUESTIONS, PLEASE CONTACT YOUR
XYZ CORPORATION           300      302           ACCOUNT RELATIONS MANAGER OR
                                                 CUSTOMER SERVICE AT 1-800-555-5555

(VIEW PRINTABLE REPORT)  (PRINT RECEIPTS)    414
Comma Separated Values (CSV) Format ▼    □ Zipped File  (DOWNLOAD REPORT) ← 416

412                                              Runtime: 3/14/2006 8:19 AM MST
418                                              Business Week: Monday-Saturday
                                                 End of Business Day: 5:45:00 PM
                                                 Transaction Summary
                                Transaction Period: 2/15/2006 5:45:01 PM MST – 2/17/2006 5:45:00 PM MST
                                Days until Auto Accept / Reject: 3   Auto Accept / Reject Value: Accept Days (3)
1-3 of 3 Days

| Date | Review Items | Accepted | Rejected | Open | % Accepted | % Rejected | % Open |
|---|---|---|---|---|---|---|---|
| 2/17/2006 | 28 | 24 | 4 | 0 | 86.0% | 14.0% | 0.0% |
| 2/16/2006 | 25 | 21 | 1 | 3 | 84.0% | 4.0% | 14.0% |
| 2/15/2006 | 28 | 25 | 3 | 0 | 89.0% | 11.0% | 0.0% |
| Grand Total: | 81 | 69 | 8 | 3 | 85.0 | 10.0% | 4.0% |

SYSTEMS AND METHODS FOR PROCESSING PAYMENTS WITH PAYMENT REVIEW FEATURES

BACKGROUND OF THE INVENTION

Payment systems have become a convenient way for customers to make payments to one or more receivers. The payments can include payments related to one or more bills ("bill payments"), payments for one or more prepaid goods and/or services ("prepaid payments"), payments for opening and/or loading one or more stored value card payments ("stored value card payments"), and/or other types of payments made from a customer to a receiver. Payment systems are often operated by third-party service providers or processing systems, that accept and process payments on behalf of receivers.

Receivers, however, may want the ability to review a payment provided by a customer in order to handle exception items. Some exception items can include rejects. Rejects can include payments that are received but are not able to be immediately processed, and, sometimes are rejected and sent back to the sending customer. For example, accepting a payment in the mortgage or insurance industries has legal and other implications that a receiver may want to avoid if the payment is late, incorrect, etc. Therefore, many receivers review a payment prior to accepting it and have the opportunity to reject the payment.

Receivers often use payment instruments (e.g., paper checks) to perform payment returns (e.g., refunds) for rejected payments. In some embodiments, rejected payments are either returned to the customer or are voided. Providing a payment instrument to a customer, however, can create additional issues and problems, such as check printing equipment and maintenance requirements, remote check printing, check inventory and security requirements, lost check procedures, address resolution procedures, etc., which can be costly for the receiver and can delay or inhibit the return of a payment to the customer.

SUMMARY OF THE INVENTION

Some embodiments of the invention provide a method of processing a plurality of payments including receiving the plurality of payments from a plurality of customers, the plurality of payments payable to at least one receiver, determining a first set of payments included in the plurality of payments to automatically accept based on validation parameters, determining a second set of payments included in the plurality of payments to reject based on the validation parameters, determining a third set of payments included in the plurality of payments to conditionally accept based on the validation parameters, and electronically prompting at least one user to accept or reject at least one payment included in the third set of payments.

Additional embodiments provide a system for processing a plurality of payments including validation parameters, a processor, and a payment management application. The processor receives the plurality of payments payable to at least one receiver, determines a first set of payments included in the plurality of payments to accept based on the validation parameters, determines a second set of payments included in the plurality of payments to reject based on the validation parameters, and determines a third set of payments to conditionally accept based on the validation parameters. The payment management application electronically prompts at least one user to accept or reject at least one payment included in the third set of payments.

Further embodiments provide a method of processing payments including receiving a plurality of payments; tracking the plurality of payments in a database, wherein each of the plurality of payments is linked to a receiver identification code; enabling a receiver to review payments linked thereto using a receiver identification code of the receiver; electronically prompting the receiver to accept or reject at least one of the plurality of payments; and returning a payment if the at least one of the plurality of payments is rejected.

BRIEF DESCRIPTION OF THE DRAWINGS

FIG. 2 illustrates a summary report of the payment management application of FIG. 1 according to one embodiment of the invention.

FIG. 10f illustrates a daily basic report page of the payment management application of FIG. 1 according to one embodiment of the invention.

FIG. 10k illustrates a real-time detailed report page of the payment management application of FIG. 1 according to one embodiment of the invention.

FIG. 10*l* illustrates a summary report criteria page of the payment management application of FIG. 1 according to one embodiment of the invention.

FIG. 12 illustrates an items to track report page of the payment management application of FIG. 1 according to one embodiment of the invention.

FIG. 19 illustrates an accept/reject pending transaction review report page of the payment management application of FIG. 1 according to one embodiment of the invention.

FIG. 23 illustrates an accept/reject completed transaction review report page of the payment management application of FIG. 1 according to one embodiment of the invention.

FIG. 25 illustrates an accept/reject summary report page of the payment management application of FIG. 1 according to one embodiment of the invention.

DETAILED DESCRIPTION

Figure 1:
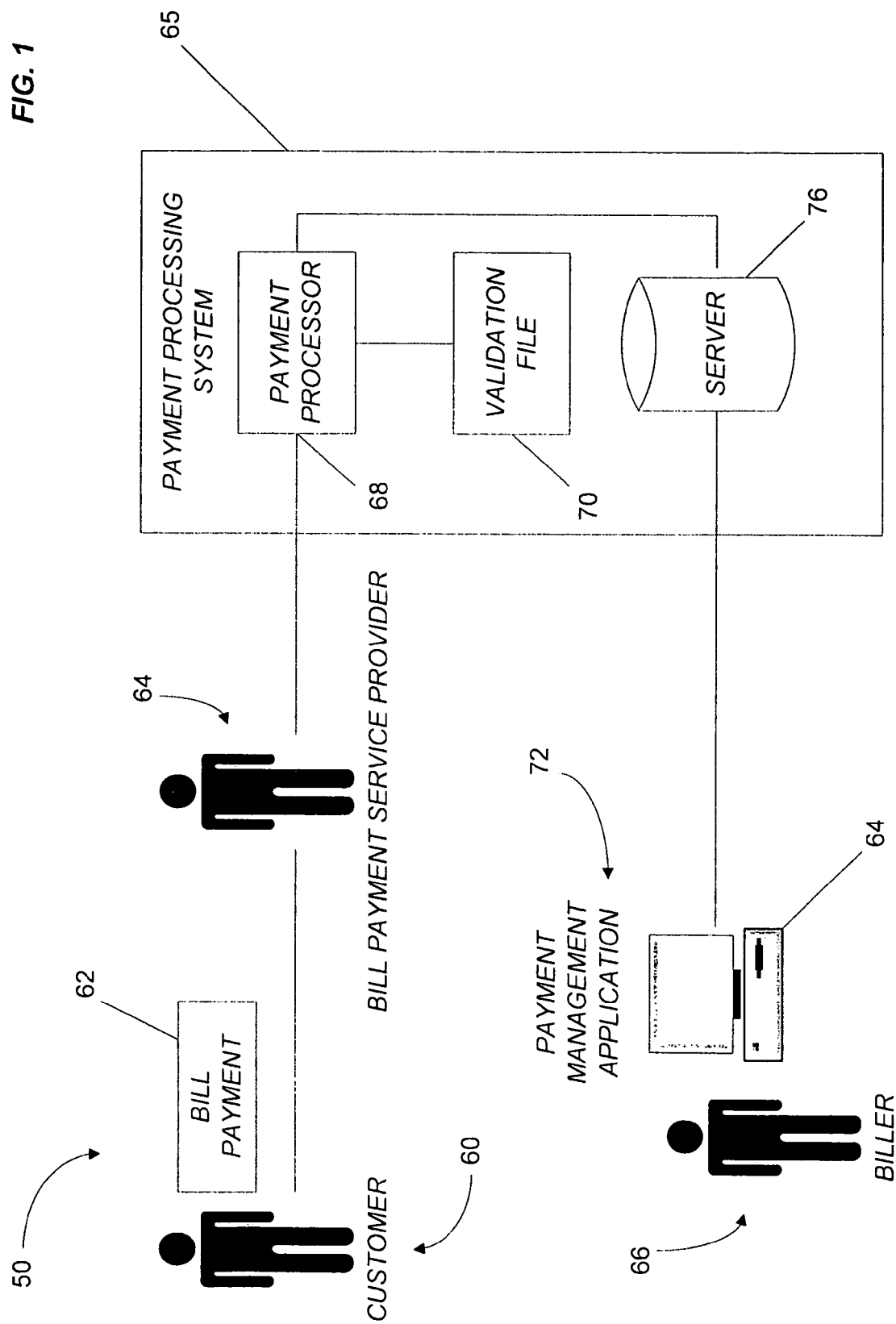
FIG. 1 illustrates a system for processing payments according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and software components or modules. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

FIG. 1 illustrates a system 50 for processing payments according to one embodiment of the invention. The system 50 includes a customer 60 who presents a payment 62 to a processing service provider or processing system 64. In some embodiments, the processing system 64 can provide functionality in addition to processing payments. For example, the processing system 64 can also provide mortgage processing, money transfer processing, stored value card processing, money order processing, etc. The processing system 64 can be operated by the receiver 66 or a third-party organization.

The payment 62 provided by the customer 60 can include a bill payment, a prepaid payment (e.g., for purchasing telephone minutes), a stored value card payment, or other types of payments made from a customer to a receiver. The payment 62 can include cash; an automated clearing house ("ACH") transaction; an electronic payment; a payment from a check, a credit card, a debit card, or a stored value card; etc.

The processing system 64 accepts and processes payments on behalf of a receiver 66. It should be understood that although only one customer 60, payment 62, and receiver 66 is illustrated in FIG. 2, the system 50 can include multiple customers 60 each providing one or more payments 62 to one or more receives 66 through the processing system 64. In addition, the processing system 64 can include one or more locations or agents that accept payments 62 from customers 60.

As shown in FIG. 1, the processing system 64 can process payments 62 using a payment processor 68. In some embodiments, the payment processor 68 can access validation parameters. The validation parameters can include one or more parameters for processing a payment 62. The validation parameters can include one or more files or records stored in a memory module of the processing system 64 or another system, a systematic interface, hard-coded logic or circuitry, or any other mechanism for specifying rules or parameters for processing a payment 62. If the processing system 64 accepts payments 62 on behalf of multiple receivers 66, the payment processor 68 can access validation parameters for specific receivers 66 from one or more sources (e.g., a validation file for each receiver 66). For example, the payment processor 68 can access validation parameters that include parameters for a specific receiver 66 that can be set by the processing system 64 and/or the receiver 66. The parameters can include valid and/or invalid account numbers, confirmed fraudulent account numbers, expired account numbers, valid and/or invalid payment amounts, etc.

The payment processor 68 can determine whether to accept a payment 62, reject a payment 62, or conditionally accept and hold a payment 62 for review based on the validation parameters. If the payment processor 68 rejects a payment 62, the processing system 64 can return the rejected payment 62 to the customer 60. In some embodiments, rejected payments 62 can be determined by the payment processor 68 while the customer 60 is physically present at an agent location of the processing system 64. If the customer 60 is physically present, the processing system 64 can directly return the rejected payment 62 (e.g., the rejected check) to the customer 60. By determining rejected payments when payments 62 are presented to the processing system 64 and before funds are transferred to the receiver 66 or another destination (e.g., a trust account), the processing system 64 can prevent further processing of rejected payments and can eliminate the need to return payments to customers 60 and/or the processing system 64 for rejected payments. It should be understood that in place of or in addition to physically presenting a payment 62 to the processing system 64, a customer 60 can provide an electronic payment to the processing system 64. For example, a customer 60 can present an electronic payment 62 to the processing system 64 when the customer is physically remote from the processing system using a telephone, a computer, or another device to send a text message, a voice message, or a facsimile message or filling out an electronic form and transmitting the form over a network, such as the Internet, to the processing system 64.

After the payment processor 68 determines how to process a payment 62, the receiver 66 can review payments 62 received and/or updated or modified by the processing system 64 via a payment management application 72. In some embodiments, the receiver 66 can be notified of payments 62 received and/or updated or modified by the processing system 64 via a message sent by the payment processor 68. For example, the payment processor 68 can send the receiver 66 an email message, a text message, a voice message, a facsimile message, etc. alerting the receiver 66 that a payment 62 has been received, processed, held, reviewed, accepted, rejected, and/or updated or modified. In some embodiments, the processing system 64 can be configured to notify a receiver 66 of received and/or modified payments 62 based on parameters set by the receiver 66 or the processing system 64. For example, a receiver can specify an email address for receiving messages from the system 64, a predetermined time for receiving message from the system 64, a format for receiving message from the system 64, etc. In addition to or in place of receiving a message, a receiver 66 can receive a report (e.g., an electronic report or a report printed directly to a printer of the receiver 66) that indicates payments 62 received by the processing system 64 on behalf of the receiver 66. The report can be provided in real-time or at predetermined times (e.g., on a daily basis). Upon receiving a message or a report, the receiver 66 can execute the payment management application 72 in order to view details of the one or more payments 62 included in the message or report. In some embodiments, if the receiver 66 receives an electronic message or report, the message or the report can include a link. The receiver 66 can select the link in order to automatically execute the payment management application 72, and, in some embodiments, bypass a secure login of the payment management application 72 and cause the payment management application 72 to automatically display details of the one or more transactions or payments 62 that the message or report pertained to.

In some embodiments, the receiver 66 can execute the payment management application 72 using a workstation 74. The workstation 74 can include a processor; a memory module; an input device, such as a keyboard; and an output device, such as a monitor and/or a printer. The memory module can store the payment management application 72 or a portion thereof. In some embodiments, in addition to or in place of storing the payment management application 72 on the workstation 74, the workstation 74 can obtain information over a network, such as a local area network or the Internet, and can provide the information to the receiver 66 using the output device. For example, the workstation 74 can store and execute a browser application (e.g., Internet Explorer provided by Microsoft) and can connect to a server 76 (e.g., a web server or an application server) that stores and executes the payment management application 72 or a portion thereof. The server 76 can obtain information from the payment processor 68 and/or other modules and/or systems, and, in some embodiments, the server 76 and the payment processor 68 can be combined in a single system (e.g., a payment processing system 65). The workstation 74 can obtain data from the server 76 and can display the data to the receiver 66 using the browser application. Using a standard browser application that is installed on general purpose workstations to execute and operate the payment management application 72 can allow a receiver 66 to view payments 62 received by the processing system 64 using any workstation connected to the appropriate network and providing the appropriate browser application without requiring any additional or proprietary software or hardware. It should be understood that the payment management application can also be installed on a computer of the receiver 66 as a thin client application or a fat client application and can communicate with the processing system 64 (e.g., the payment processor 68) via a dedicated or non-dedicated connection or network.

The payment management application 72 can provide a single application that receivers 66 can use to manage various parts of a payment processing process performed by the processing system 64. For example, the payment management application 72 can include a reporting tool that assists receivers 66 in performing research, reconciliation, balancing, skip tracing, etc. The payment management application 72 can also provide held payment review that provides receivers 66 the opportunity to review a conditionally accepted payment 62 received by the processing system 64 and to accept or reject the payment 62. As previously noted, in a number of industries (e.g., the mortgage industry and the insurance industry), accepting a payment 62 has legal and other implications. Therefore, receivers 66 may want to review a payment 62 prior to accepting the payment 62 and may want to have an opportunity to reject the payment 62. The ability to review payments 62 received by the processing system 64 may also be used by receivers 66 that want to screen or filter payments 62 with incorrect data (e.g., an account number) in order to make sure that payments 62 that cannot be applied or processed properly are returned (rejected) in order to avoid unnecessary costs associated with the handling, processing, and managing of the payment 62. In some embodiments, if a receiver 66 rejects a payment 62, the payment management system 72 can provide an easy to use, near real-time rejection tool that allows the receiver 66 to reject the payment and initiate a return of the payment (e.g., a refund) to the customer without requiring the receiver 66 to issue payment instruments, such as paper checks. In some embodiments, the processing system 64 can assist the receiver 66 in returning payments to customers 60 for rejected payments 62. For example, the receiver payment service provider 64 can provide a money transfer system or other electronic funds transfer system or network, which can be part of the processing system 64 or a separate system, that the processing system 64 can use to return a payment to customer 60 from the processing system 64, which initially accepted the payment 62.

As noted above, to determine how to process payments 62 received by the processing system 64 on behalf of a receiver 66, the payment processor 68 can use validation parameters. Processing a payment can include accepting the payment without conditions, conditionally accepting the payment for review to be accepted or rejected by the receiver 66, or rejecting the payment.

Accepted payments 62 (e.g., payments accepted without conditions or payments conditionally accepted) can receive reference numbers. Payments 62 accepted without condition can be assigned a receive status, and payments 62 conditionally accepted for review can be assigned a review or pending status. In some embodiments, only payments with a received status are funded to the receiver 66 or another destination by the processing system 64.

In some embodiments, the payment management system 72 can inform the receiver 66 of all accepted, rejected, and/or conditionally accepted payments 62. Payments 62 in a review or pending status can appear in a different color or format in order to be clearly distinguishable from received or accepted transactions.

Using the payment management application 72, the receiver 66 can review pending payments 62 that were conditionally accepted and can accept or reject each payment 62. In some embodiments, as described with respect to FIG. 19, the payment management system 72 can provide the receiver 66 with selection mechanisms (e.g., check boxes) that allow the receiver 66 to chose "ACCEPT" or "REJECT" for a specific payment 62 having a review or pending status. Once the receiver 66 chooses a selection, the payment management application 72 can prompt the receiver 66 to confirm his or her selection by displaying a "Are you sure you want to _____ (Accept/Reject) this transaction?" prompt. The receiver 66 can answer "YES" in order to confirm the selection or can select "NO" in order to cancel the selection. In some embodiments, canceling the selection can leave the payment 62 unchanged with a review or pending status. As noted above, accepted or received payments 62 are assigned a receive status and rejected transactions are assigned a refund or an available to refund status. Using the payment management application 72, the receiver 66 can accept or reject individual payments 62 one at a time or accept or reject multiple payments 62 as a batch.

In some embodiments, leaving payments 62 in a review or pending status can be a risk to the receiver 66 and/or the processing system 64. To prevent payments 62 from being left in a review or pending status, the processing system 64 can force closure of the payments 62 when needed. For example, the processing system 64 can accept or reject all payments 62 that have been in a review or pending state for a predetermined amount of time (e.g., approximately 3 to 5 days). In some embodiments, the payment management application 72 can allow receivers 66 to enable the automated acceptance or rejection feature of the processing system 64 and/or to select whether to automatically accept or automatically reject pending payments 62 that are not timely processed. The processing system 64 can also be configured to determine the number of days to wait before automatically accepting or rejecting pending payments 62 (e.g., 1 to 7 business days) in order to suit business needs. For example, a receiver 66 can select a business week (e.g., week starts on Monday and ends on Friday) from a screen or menu provided by the payment management application 72 (see FIG. 7*a*). After selecting a business week, the processing system 64 can automatically determine when to automatically accept or reject pending payments 62. In some embodiments, the processing system 64 can be aware of non-business days and/or holidays and can adjust the automatic pending payment process accordingly (e.g., extend the time period another day).

In some embodiments, the payment management application 72 can allow a receiver 66 to turn off the automatic accepting, rejecting, and holding of payments. If the feature is turned off, the payment processor 68 of the processing system 64 can accept and process all received payments 62. When the processed payments reach the receiver 66, the receiver 66 can reject particular payments and can initiate a return of rejected payments to customers 60 and/or the processing system 64 (e.g., using the payment management application 72).

In some embodiments, the payment processor 68 can automate the settlement of receives, rejected items, and returned rejected items. There can be various options for performing the settlement process between the processing system 64 and the receiver 66. For example, payments can be netted against all received payments, settled separately, settled to different bank accounts, etc. One settlement method can include a daily (e.g., Monday through Friday) automated clearing house ("ACH") net settlement that includes all activities (e.g., Receives+Rejects−Returns−Returned Item Fee=Settlement). Another settlement method can include a daily ACH settlement that settles receives separately from rejects and returned items (e.g., Receives=Settlement 1 and Reject−(Returned+Returned Item Fee)=Settlement 2). Yet another settlement method can include a daily ACH settlement that settles receives, returns, and rejects separately (e.g., Receives=Settlement 1, Return+Returned Item Fee=Settlement 2, Rejects=Settlement 3). In addition to or in place of using ACH transactions to perform settlements, settlements can be performed via wire transfers, SWIFT transfers, or other transfer mechanisms or systems. In some embodiments, the payment management application 72 also provides settlement reports for the receiver 66 and/or an organization managing the processing system 64 in order to account for returned payments resulting from rejected payments and how the returns affect the settlement.

In some embodiments, the payment management application 72 can also allow the receiver 66 to redirect transactions to different receive locations or codes of the receiver 66. For example, particular users of the payment management application 72 associated with the receiver 66 (e.g., an accounting user or a supervisor user) can be authorized to select payments 62 to deposit to certain back accounts (e.g., trust accounts). The ability to direct payments 62 to particular accounts can be useful to receivers 66 who deal in third-party collections and have contractual requirements to keep payments and funding associated with the customers 60 of one company separate from payments and funding associated with customers 60 of another company. Typically, receivers 66 who deal in third-party collections use checks or receipts to manually sort payments into individual slots or buckets based on the client or customer 60 who provided the payment. This can be time-consuming and inefficient, especially for large, third-party receivers who have a large number of accounts (e.g., a large number of receivers 66 that the third-party receiver collects for). In some embodiments, the payment management application 72 can provide a customer or client set-up page that receivers 66 can use to set up various companies and their corresponding accounts (e.g., trust accounts). The receiver 66 can then use a tracking or posting tool of the payment management application 72 in order to select a specific company for each payment received from a customer 60. In some embodiments, the payment management application 72 can also provide reports that track totals (e.g., daily totals) for each account and/or track any transactions that have not been posted or directed to a particular account.

If a payment is rejected, the receiver 66 and/or the processing system 64 can notify the customer 60. In some embodiments, the receiver 66 can be responsible for contacting the customer 60 since the receiver 66 may have a relationship with the customer 60 and may have contact information for the customer 60. The payment management application 72, however, may provide notification tools for the receiver 66 to use. For example, the payment management application 66 can allow the receiver 66 to extract a file that the receiver can use to load rejected payment information into a correspondence generating system (e.g., a letter writing system) that generates correspondence that can be transmitted to customers 60. In some embodiments, the payment management application 72 can also be configured to format data extracted from the application 72 according to specific needs or requirements. For example, in some embodiments, the payment management application 72 can provide the receiver 66 with a template (e.g., a letter or text document template) that the receiver 66 can use to perform a mail merge. The payment management application 72 can also provide a selection mechanism, such as a button, that the receiver 66 can select in order to automatically create correspondence (e.g., letters) based on a report of rejected payments generated by the payment management application 72.

The payment management application 72 can also provide correspondence generation. For example, the payment management application 72 can generate a one page letter or report that can be used in a return item letter. In some embodiments, the letter or report can be customized by the receiver 66. The letter or report can be generated such that it can be folded in three and placed into a window envelop with an address of a customer in the window. The letter or report can contain the customer's address, a standard statement, and a location of a nearest processing system 64 agent or location where the customer 60 can pick up the returned payment (e.g., a refund). In some embodiments, the letter or report can also state the amount to be returned to the customer 60. The amount to be returned to the customer 60 can include the amount of the payment 62 initially provided by the customer 60. In some embodiments, a fee can also be applied to the rejected payment 62, which can be subtracted from the amount to be returned to the customer 60.

In some embodiments, the payment management application 72 can provide the receiver 66 with one or more reports for tracking payments 62 in a review or pending status, so that decisions on these items can take place in a timely manner. For example, one report generated by the payment management application 72 can show each outstanding payment 62 (see FIG. 19). The outstanding payments 62 included in the report can be sorted (e.g., based on a one or more parameters selected by the receiver 66). For example, the outstanding payments 62 can be sorted by age (e.g., the amount of time that the payment has been pending).

In some embodiments, the payment management application 72 can also provide a second report to a receiver 66 that summarizes the receiver's performance in clearing conditionally accepted payments 62 (e.g., the number of conditionally accepted payments, the number of conditionally accepted payments ultimately accepted, the number of conditionally accepted payments ultimately rejected, the percentage of payments accepted, the percentage of reviewed payments accepted, the percentage of payments rejected, the percentage of reviewed payments rejected, the number of outstanding pending payments, etc.). FIG. 2 illustrates a summary report 80 of a receiver's performance in clearing conditionally accepted payments 62 according to one embodiment of the invention. In some embodiments, the payment management system 72 can display generated reports on a monitor, and can also provide printable versions of the reports that can be sent to a printer or other hard-copy generating device. The payment management application 72 can also provide versions of reports that can be downloaded and stored to one or more storage devices (e.g., a file, a database, a compact disc, etc.) and/or communicated or transmitted (e.g., emailed). For example, the payment management application 72 can provide downloadable reports that can be manipulated using standard spreadsheet applications, such as Excel provided by Microsoft.

In addition to or in place of managing conditionally accepted payments, the payment management application 72 can also help a receiver 66 manage other features of receiving payments 62 through the processing system 64. For example, in some embodiments, the payment management system 72 can provide a tracking tool that allows receivers 66 to track activities associated with payments in real-time or otherwise, such as tracking the posting of payments or tracking the individuals or users reviewing particular payments. For example, receivers 66 can use the tracking tool to flag transactions as posted to an accounting system or other system. Tracked transactions can be displayed by the payment management application 72 in a color or format different than untracked transactions in order to provide a quick view of tracked and untracked transactions. The payment management application 72 can also record the tracking event. For example, the payment management application 72 can record the user identifier, time, and date associated with when the receiver 66 marked the transaction as tracked. In some embodiments, particular users of the payment management application 72 associated with the receiver 66 can be authorized to track a transaction (e.g., flag transactions as posted). The processing system 64 and/or a receiver 66 can also turn off the tracking functionality.

In some embodiments, the payment management application 72 can also provide one or more reports that indicate untracked transactions that have been outstanding (e.g., unposted) for more than a predetermined amount of time (e.g., a single business day). The report can list all transactions based on various categories (e.g., untracked, tracked, untracked and tracked) from oldest to newest or sorted by different parameters as requested by the receiver 66. The report can allow the receiver 66 to flag or select transactions to track. In addition, the payment management application 72 can provide another report that keeps track of all outstanding transactions. The reports provided by the payment management application 72 can also be customized based on reporting parameters selected by a user (e.g., an individual associated with a receiver 66). A user can select individual reporting parameters in order to create a customized report. A user can also allow other users to use or apply the reporting parameters in order to generate the customized report.

The payment management application 72 can also provide audit and/or tracking features in order to track actions performed by individual users associated with the receiver 66 or a third-party organization managing the processing system 64 that use the payment management application 72. In some embodiments, the payment management application 72 can also provide one or more audit or tracking reports. The reports can track various activities performed by the receiver 66, such as outstanding refunds, receiver's performance, a user's activity within the application 72, etc.

In some embodiments, the payment management application 72 can provide additional features and/or services. For example, the payment management application 72 can provide help functionality that can aid the receiver 66 in correctly and efficiently operating the payment management application 72 and/or solve any problems or concerns the receiver 66 has with the payment management application. The payment management application 72 can also allow the receiver 66 to obtain customer service information, such as contact information for an account relation manager assigned to the receiver 66. In addition, the payment management application 72 can provide information regarding other services or features provided by the processing system 64 that can be obtained by the receiver 66. The payment management application 72 can also allow the receiver 66 to create and/or modify (e.g., customize) reports and/or graphs generated by the payment management application 72. Furthermore, in some embodiments, the payment management application 72 can allow the receiver 66 to order marketing materials. The marketing materials can provide information to the receiver's customers 60 of how to make payments 62 using the processing system 64 (e.g., locations, costs, process, facts, etc.).

In some embodiments, the payment management application 72 can also provide a promotional tool that a receiver 66 or a third-party organization managing the processing system 64 can use to set up promotions. For example, the receiver 66 can set up a promotion that picks a number of transactions at predetermined times (e.g., one transaction every hour) based on one or more parameters (e.g., random selection). The customer 60 associated with the selected transaction can receive a prize from the receiver 66 and/or the processing system 64. The receiver 66 can use promotions in order to encourage customers 60 to make payments using the processing system 64.

In addition, in some embodiments, the payment management application 72 provides a message posting tool. Users of the payment management application 72 (e.g., users associated with one or more receivers 66 or a third-party organization managing the processing system 64) can use the message posting tool to post information that can be provided to all or a subset of users that access the payment management application 72.

In some embodiments, the payment management application 72 can also assist a receiver 66 with invoicing or payment request presentment (e.g., bill presentment) and/or collections (e.g., generating overdue warnings, etc.). For example, the payment management application 72 can allow the receiver 66 to request payment from a customer 60 or from a third-party organization managing the processing system 64 (e.g., prepare, print, and/or make a bill or an invoice available to a user). In some embodiments, a third-party organization managing the processing system 64 can also use the payment management application 72 to request a payment from a customer 60 and/or a receiver 66.

Furthermore, the payment management application 72 can allow a receiver 66 to set (e.g., submit), configure, or modify validation parameters associated with the receiver 66 that are used by the processing system 64 to automatically accept or reject or conditionally accept payments 62 received by the processing system 64. The receiver 66 can also use the payment management application 72 to set, configure, or modify any other parameters used by the processing system 64 and/or the application 72 to process and manage payments 62 for the receiver 66.

Figure 3:
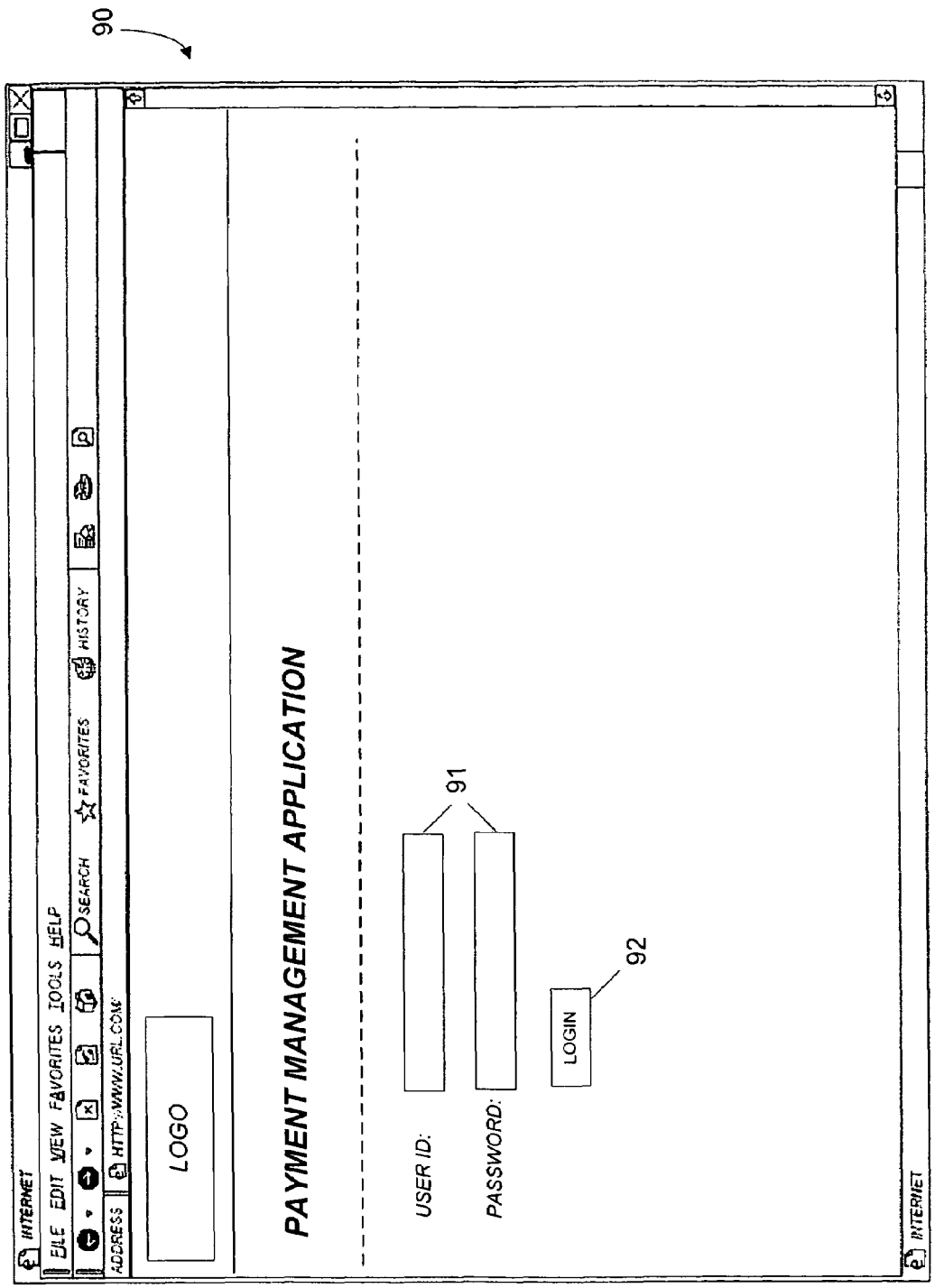
FIG. 3 illustrates a login page of the payment management application of FIG. 1 according to one embodiment of the invention.

FIG. 3 illustrates a login page 90 of the payment management application 72 according to one embodiment of the invention. As shown in FIG. 3, a user (e.g., an individual associated with a receiver 66 or a third-party organization managing the processing system 64) can provide a user identifier and/or a password or other authentication information, such as a personal identification number, a fingerprint, a voice print, an RSA token, etc., using one or more input mechanisms 91 (e.g., input fields) included in the login page 90. In some embodiments, the application 72 can provide one or more authentication options or tools for obtaining authentication data from a user, such as a microphone and related logic for performing a voice analysis, a fingerprint reader and related logic for performing a fingerprint analysis, an RSA token reader and logic for performing a RSA token analysis, etc. After entering the user identifier and the password, the user can select a login selection mechanism 92 in order to submit the identifier and the password to the payment management application 72 for verification.

Figure 4A:
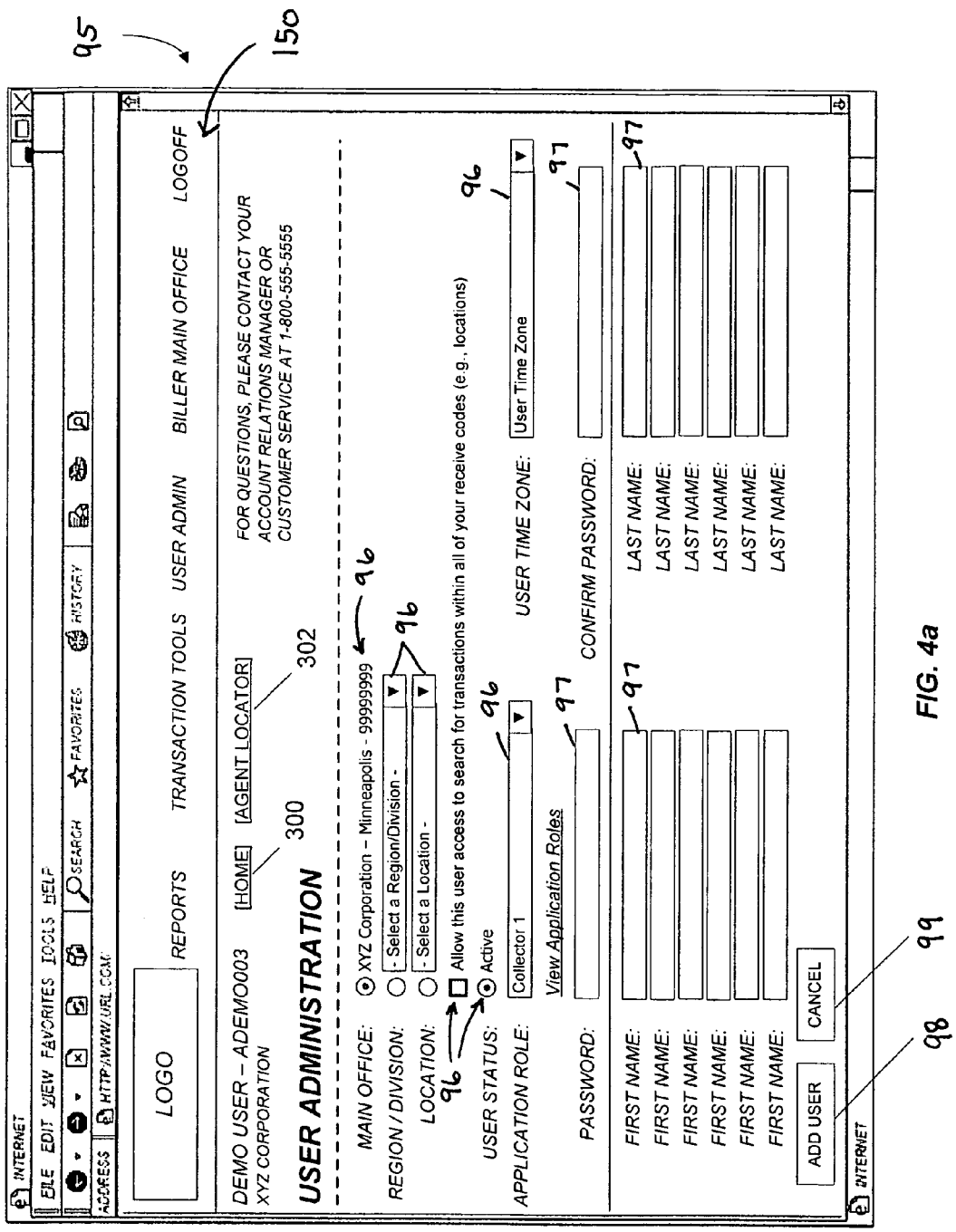
FIG. 4 illustrates a user administration page of the payment management application of FIG. 1 according to one embodiment of the invention.
Figure 4B:
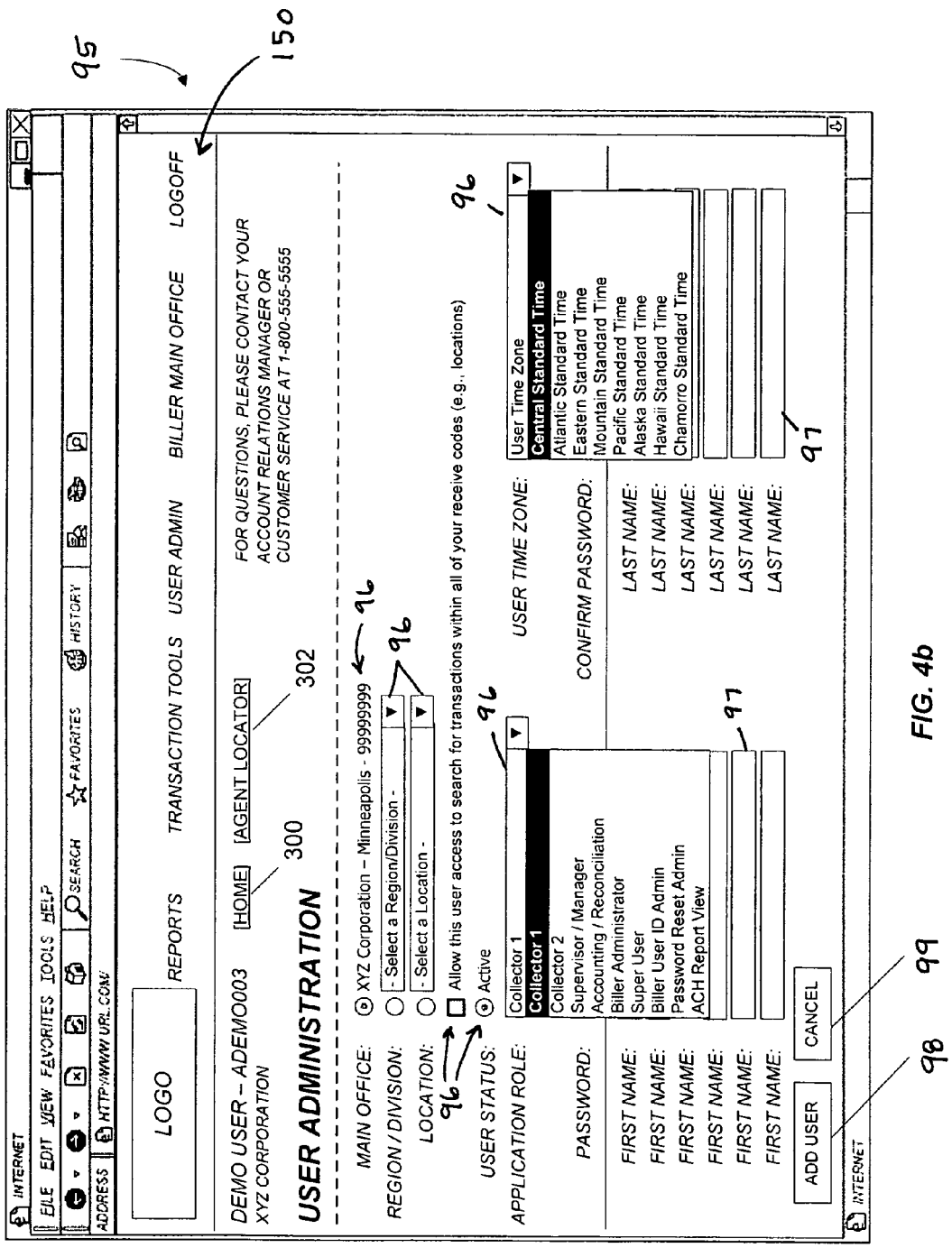

In some embodiments, the payment management system 72 can allow a user associated with receiver 66 or a third-party organization managing the processing system 64 (an "administrator") to set up one or more users that can access and operate the payment management application 72. FIGS. 4a and 4b illustrate user administration pages 95 of the payment management application 72 according to embodiments of the invention. As shown in FIGS. 4a and 4b, an administrator can use selection mechanisms 96 and/or input mechanisms 97 included in the user administration page 95 to set up one or more users authorized to access the payment management application 72. Using the user administration page, the administrator can set up a hierarchical receiver identification code ("receive code") for a particular user. For example, the administrator can specify a receiver main office, a receiver region or division within the selected main office, and a receiver location within the selected main office and region or division to be associated with a particular user. The administrator can also specify whether a user can access transactions associated with other receiver identification codes (e.g., regions, divisions, or locations) of a receiver 66. In addition, the administrator can activate or inactivate a user.

In some embodiments, an administrator can select an application user role and a time zone for a user. For example, the administrator can use one or more selection mechanisms 96 included in the user administration page 95 in order to view a menu or list of available application user roles and/or time zones. Each application user roles can be associated with access rights, responsibilities, and/or privileges that are extended to each user associated with the application role. The application user roles can include a collector user role, a supervisor/manager user role, an account/reconciliation user role, a receiver administrator user role, a super user role, a receiver user identifier user role, a password reset administrator user role, a reject administrator user role, and/or an ACH report view user role. In some embodiments, the administrator can select a selection mechanism 96 included in the user administration page 95 in order to view a separate screen or page that lists available application user roles and/or associated access rights, responsibilities, or privileges. It should be understood that additional user roles are also possible within the payment management application 72.

In addition to or in place of setting up user roles and assigning a user to a particular user role, the payment management application 72 can allow the administrator to select individual access rights, responsibilities, and/or privileges for individual users. For example, the application 72 can provide a menu of available access rights, responsibilities, and/or privileges and the administrator can select particular access rights, responsibilities, and/or privileges for an individual user or a group of users.

As shown in FIGS. 4a and 4b, the administrator can specify an identifier and/or a password for a user using input mechanisms 97 included in the user administration page 95. In some embodiments, the administrator can associate one or more users with a particular application role and/or password. As shown in FIGS. 4a and 4b, in some embodiments, the administrator can specify the names of one or more users to be associated with the selected role, password, and other user parameters selected by the administrator using the user administration page 95. After entering one or more user names, the administrator can select an add user selection mechanism 98 included in the user administration page 95 in order to submit the user information. Alternatively, the administrator can select a cancel selection mechanism 99 included in the user administration page 95 in order to cancel or disregard any user information selected and/or entered by the administrator. Once a user is set up by an administrator, the user can access the payment management application 72 and, in some embodiments, can modify their identifier, password, and/or other user parameters and/or set up additional users.

In some embodiments, the payment management application 72 can limit the number of users who can log into the payment management application 72 using the same identifier and/or password (e.g., one user). The payment management application 72 can also allow the administrator to set up Internet Protocol ("IP") address parameters that limit where a user can access the payment management application 72 from.

Figure 5:
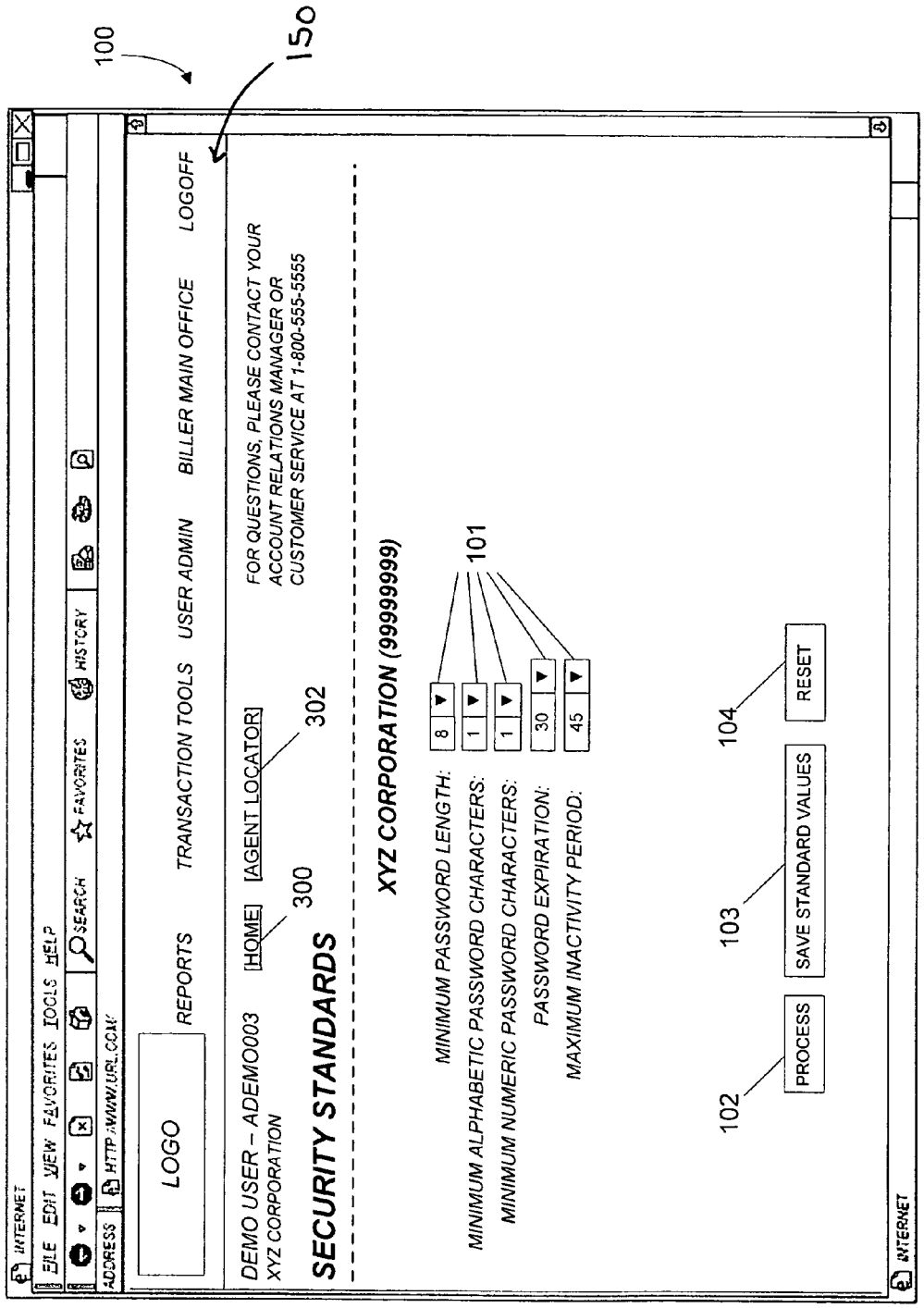
FIG. 5 illustrates a security standards page of the payment management application of FIG. 1 according to one embodiment of the invention.

FIG. 5 illustrates a security standards page 100 of the payment management application 72 according to one embodiment of the invention. As shown in FIG. 5, an administrator can use the security standards page 100 to set security standards for users that will be allowed to execute and operate the payment management application 72. The security standards can include a minimum password length standard, a minimum alphabetic password characters standard, a minimum password characters standard, a password expiration standard, a maximum inactivity period standard, a maximum number of failed login attempts before locking out a user standard, and/or other standards associated with the security of the application 72. For each standard, the payment management application 72 can provide a selection mechanism 101, such as a drop-down menu or a radio button, that allows the administrator to view and select available values. For example, selecting a selection mechanism 101 associated with a password expiration standard can display options for expiration values, such as 30 days, 45 days, or 60 days.

As shown in FIG. 5, the security standards page 100 can also include a process selection mechanism 102 (e.g., a button), a save standard values selection mechanism 103, and a reset selection mechanism 104. Selecting the save standard values selection mechanism 103 can save the values selected by the administrator without applying any changes made to the values by the administrator. Selecting the reset selection mechanism 104 can disregard or cancel any changes made to the values by the administrator and can return the security standards to their previous values.

Figure 6:
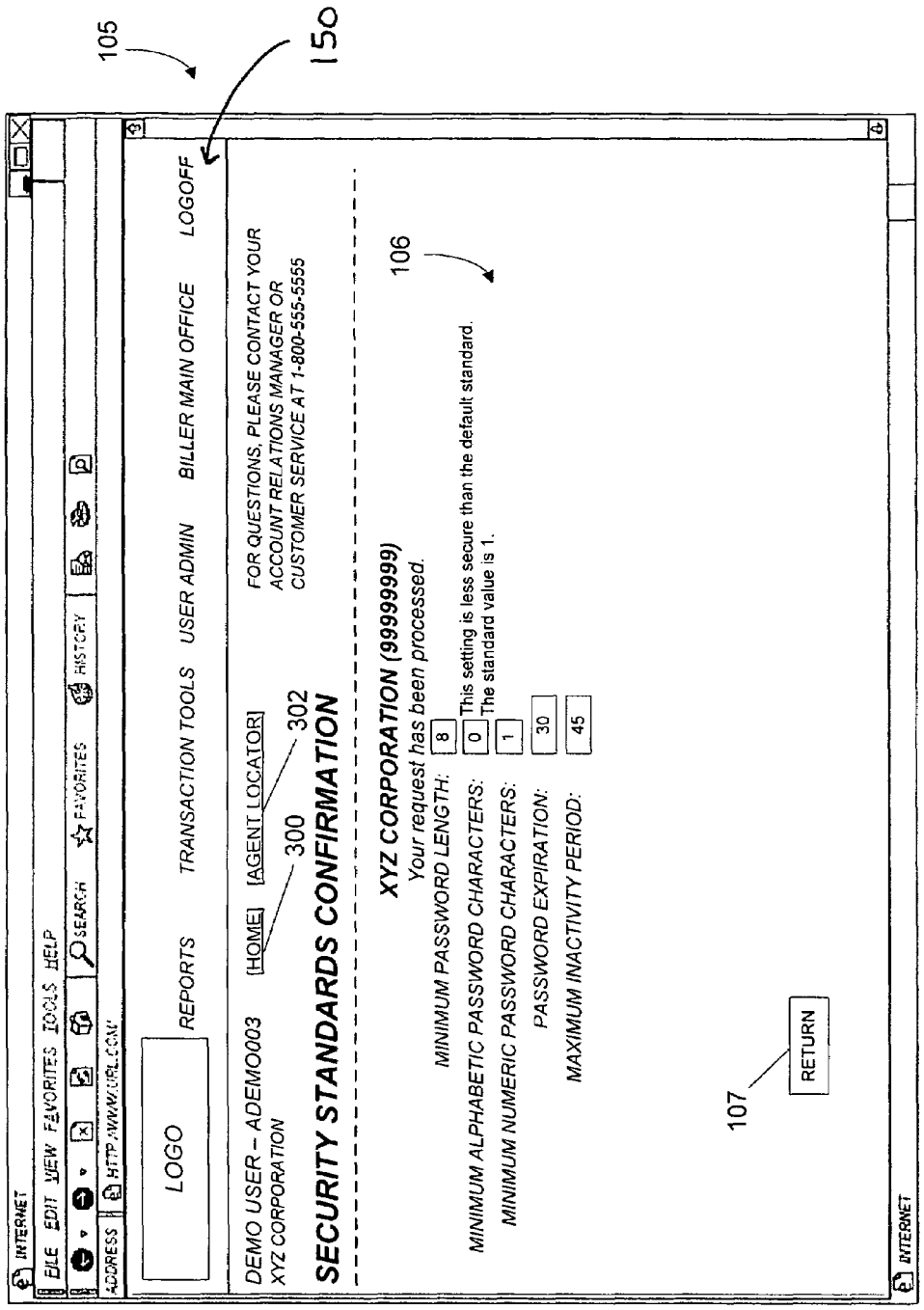
FIG. 6 illustrates a security standards confirmation page of the payment management application of FIG. 1 according to one embodiment of the invention.

Selecting the process selection mechanism 102 can apply any changes made to the values by the administrator and can display a security standards confirmation page 105, as shown in FIG. 6. The security standards confirmation page 105 can display the security standard values selected by the administrator. In some embodiments, if the administrator selected a value for a security standard that is less secure or not recommended by the processing system 64, the security standard values confirmation page 105 and/or the security standards page 100 can display a message or statement 106 to the administrator. The message 106 can also inform the administrator of a secure, standard, or recommended value. As shown in FIG. 6, the security standards confirmation page 105 can include a return selection mechanism 107. Selecting the return selection mechanism 107 can close the security standards confirmation page 105 and can return the administrator to a new or previously-displayed page, such as the security standards page 100.

Figure 7A:
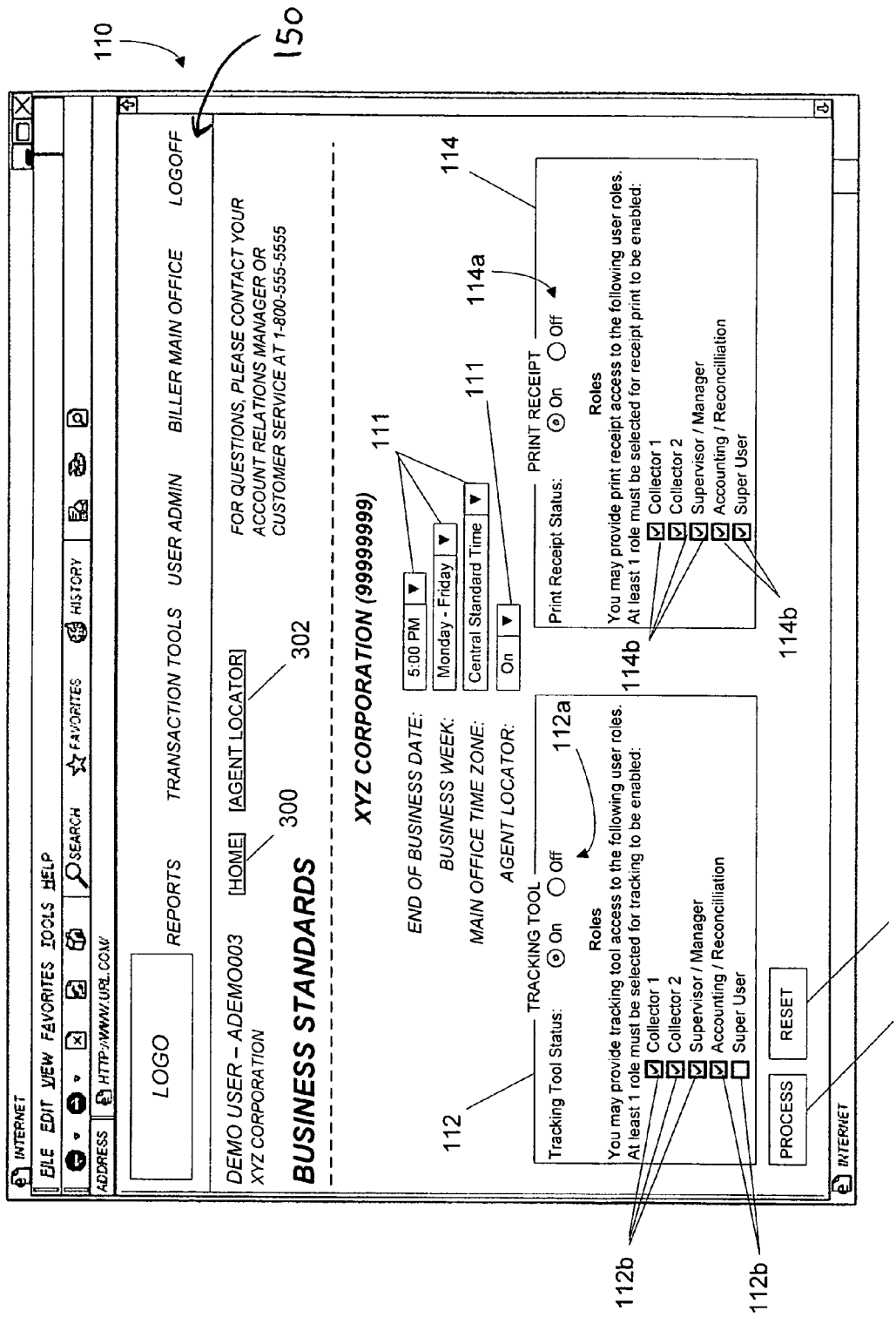
FIGS. 7a and 7b illustrate business standards pages of the payment management application of FIG. 1 according to embodiments of the invention.
Figure 7B:
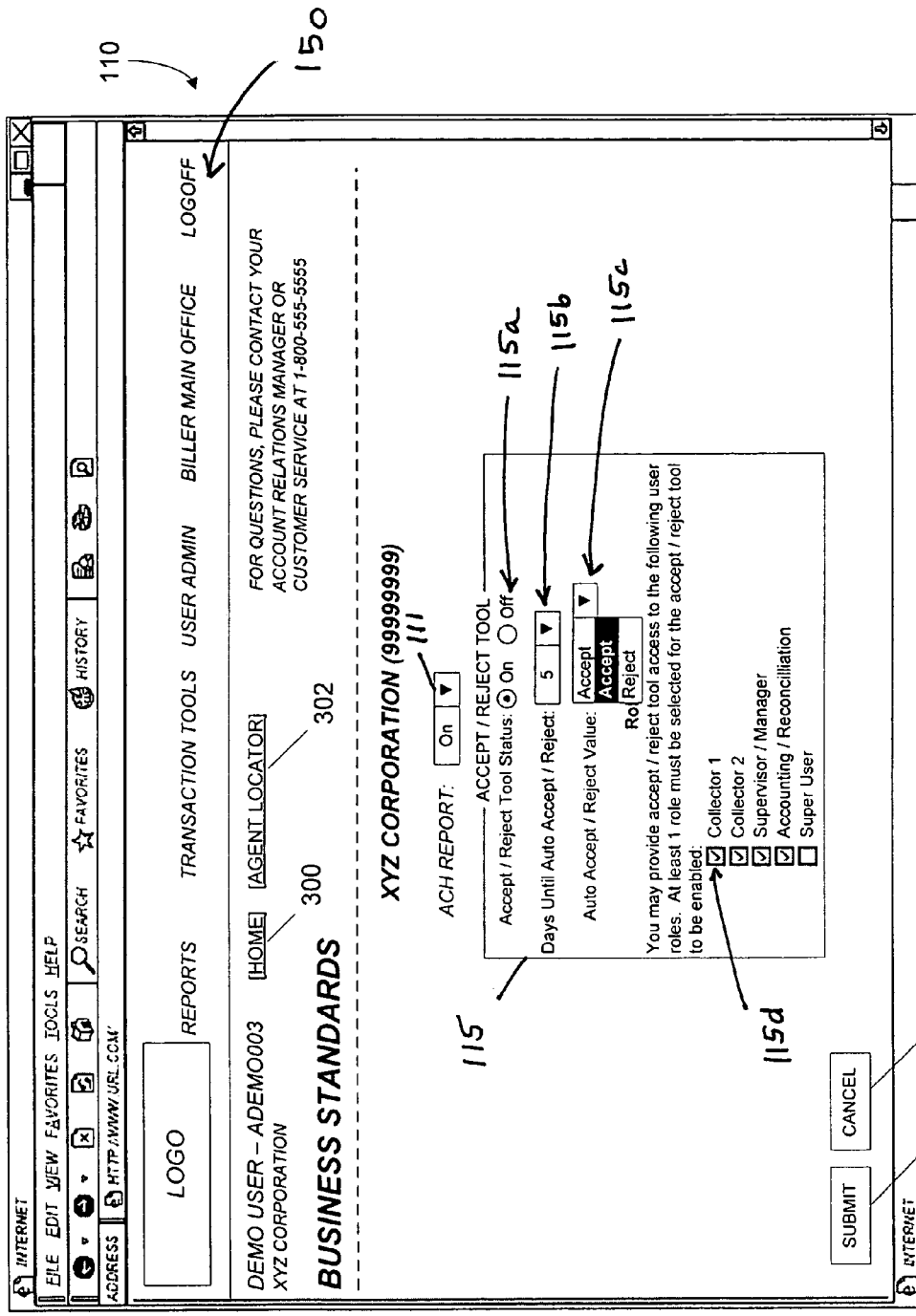

FIGS. 7a and 7b illustrate business standards pages 110 according to embodiments of the invention. As shown in FIGS. 7a and 7b, an administrator can use the business standards page 100 to set business standards that will be used by the payment management system 72 and the payment processor 68 to process payments 62 on behalf of one or more receivers 66. The business standards can include an end of business day standard, a business week standard, a main office time zone standard, and/or an agent locator standard. In some embodiments, for each standard, the payment management application 72 can provide a selection mechanism 111, such as a drop-down menu or a radio button, that allows the administrator to view and select available values. For example, selecting a selection mechanism 111 associated with a business week standard can display options for business week values, such as Monday through Friday, Monday through Saturday, and Saturday through Sunday.

As shown in FIG. 7a, the business standards page 110 can also include a tracking tool standards section 112 and a print receipt standards section 114. The tracking tool standards section 112 can include a selection mechanism 112a (e.g., radio buttons) for turning a tracking tool provided by the payment management application 72 (described with respect to FIGS. 11-16d) on and off. The tracking tool standards section 112 can also include one or more selection mechanisms 112b for selecting users or user roles that can execute and operate the tracking tool. For example, using the selection mechanisms 112b, the administrator can select whether a collector user role, a supervisor/manager user role, an accounting/reconciliation user role, and a super user role can access the tracking tool. In some embodiments, the tracking tool must be enabled before the administrator can select one or more users or user roles that are allowed to access the tracking tool. In addition, if the tracking tool is enabled, the administrator can be required to select at least one user or user role that is allowed to access the tracking tool.

Similarly, the print receipt standards section 114 can include a selection mechanism 114a (e.g., radio buttons) for turning a print receipt feature provided by the payment management application 72 on and off. The print receipt standards section 114 can also include one or more selection mechanisms 114b for selecting users or user roles that can execute and operate the print receipt feature. For example, using the selection mechanisms 114b, the administrator can select whether a collector user role, a supervisor/manager user role, an accounting/reconciliation user role, and a super user role can access the print receipt feature. In some embodiments, the print receipt feature must be enabled before the administrator can select one or more users or user roles that are allowed to access the print receipt feature. In addition, if the print receipt feature is enabled, the administrator can be required to select at least one user or user role that is allowed to access the print receipt feature.

As shown in FIG. 7b, the business standards page 110 can also include one or more selection mechanisms 111 for turning on and off other various features of the payment management application 72, such as an ACH report feature.

As also shown in FIG. 7b, the business standards page 110 can include an accept/reject tool standards section 115. The accept/reject tool standards section 115 can include a selection mechanism 115a (e.g., radio buttons) for turning an accept/reject tool provided by the payment management application 72 (described with respect to FIGS. 18-25) on and off. As described above, when turned on, the accept/reject tool can determine whether to automatically accept or reject a payment 62 and/or hold a payment 62 in a pending state for manual review by a user (e.g., a user associated with a receiver 66). As also described above, if a user does not review a pending payment 62 and either accept or reject the payment 62 within a predetermined amount of time, the payment management application 72 can automatically accept or reject the pending payment 62. As shown in FIG. 7b, the accept/reject tool standards section 115 can include a selection mechanism 115b for selecting an automatic action to be performed by the payment management application 72 if a pending payment is not reviewed by a user within a predetermined amount of time. Using the selection mechanism 115b, the administrator can specify whether pending payments 62 should be automatically accepted or automatically rejected. As shown in FIG. 7b, the administrator can also use a selection mechanism 115c to specify the predetermined amount of time before pending payments 62 are automatically accepted or rejected.

Optionally, the accept/reject tool standards section 115 can also include selection mechanisms 115d for selecting users or user roles that can execute and/or operate the accept/reject tool. For example, using the selection mechanisms 115d, the administrator can select whether a collector user role, a supervisor/manager user role, an accounting/reconciliation user role, a reject administrator user role, and a super user role can access the accept/reject tool. In some embodiments, only particular users or user roles can be authorized to accept or reject conditionally accepted transactions. For example, only users with a reject administrator user role or similar access rights can be authorized to perform rejects. In some embodiments, the accept/reject tool must be enabled before the administrator can select one or more users or user roles that are allowed to access the accept/reject tool. In addition, if the accept/reject tool is enabled, the administrator can be required to select at least one user or user role that is allowed to access the accept/reject tool.

As shown in FIGS. 7a and 7b, the business standards page 110 can also include a process selection mechanism 116 and a reset selection mechanism 118. Selecting the reset selection mechanism 118 can disregard or cancel any changes made to the business standard values by the administrator and can return the business standards to their previous values. Selecting the process selection mechanism 116 can apply any changes made to the business standards values by the administrator and can display a new or previously-displayed page.

Figure 8:
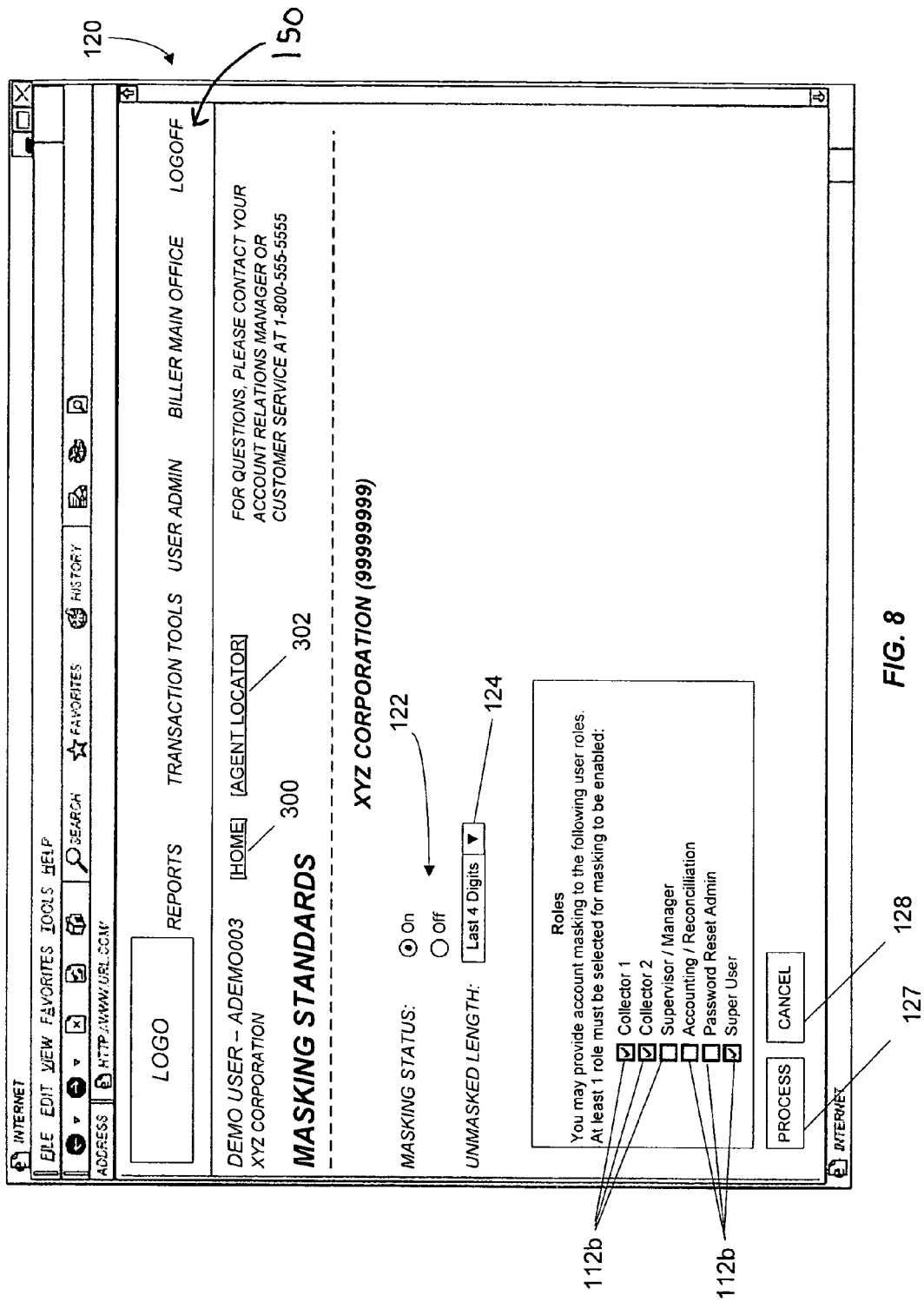
FIG. 8 illustrates a masking standards page of the payment management application of FIG. 1 according to one embodiment of the invention.

FIG. 8 illustrates a masking standards page 120 of the payment management application 72 according to one embodiment of the invention. As shown in FIG. 8, the masking standards page 120 can include a selection mechanism 122 (e.g., radio buttons) for turning account number masking provided by the payment management application 72 on and off. The masking standards page 120 can also include one or more selection mechanisms 124 for setting parameters for performing account number masking. For example, the masking standards page 120 can include a selection mechanism 124 for setting the length of the masked portion of an account number and/or the length of the unmasked portion of an account number.

As shown in FIG. 8, the masking standards page 12 can also include one or more selection mechanisms 126 for selecting users or user roles that account masking will apply to. For example, using the selection mechanisms 126, the administrator can select whether account masking will apply to a collector user role, a supervisor/manager user role, an accounting/reconciliation user role, a password reset administrator user role, and a super user role. In some embodiments, account masking must be enabled before the administrator can select one or more users or user roles that account masking applies to. In addition, if account masking is enabled, the administrator can be required to select at least one user or user role that account masking applies to. Furthermore, in some embodiments, the payment management application 72 can apply account masking to all users or user roles by default and the administrator can use the masking standards page 120 to select users, groups of users, or user roles to which account masking will not apply.

As shown in FIG. 8, the masking standards page 120 can also include a process selection mechanism 127 (e.g., a button) and a cancel selection mechanism 128. Selecting the cancel selection mechanism 128 can disregard or cancel any changes made to the account masking feature values by the administrator and can return the masking feature values to their previous values. Selecting the process selection mechanism 127 can apply any changes made to the account masking values by the administrator and can display a new or previously-displayed page.

Figure 9A:
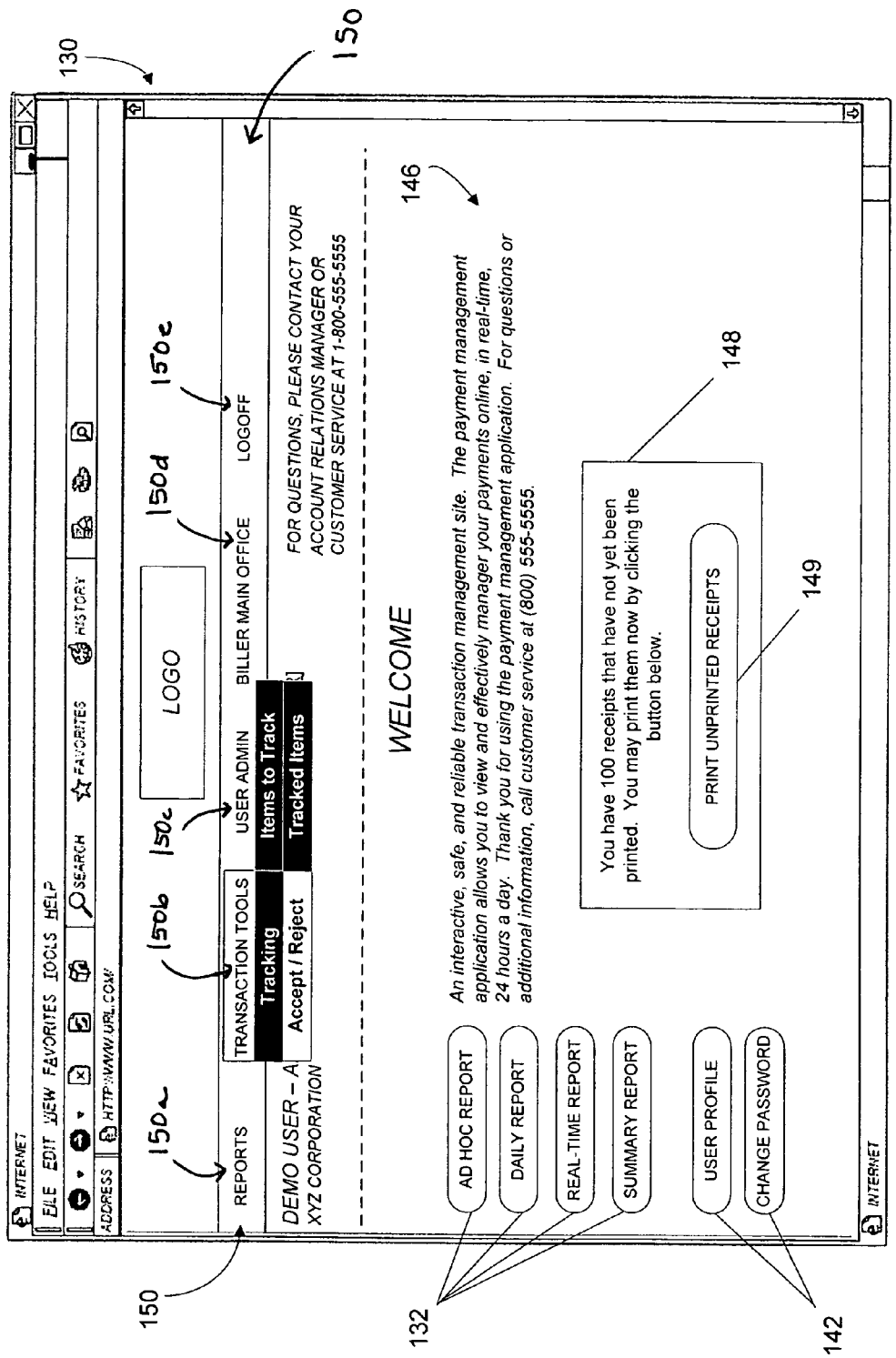
FIGS. 9a and 9b illustrate welcome pages of the payment management application of FIG. 1 according to embodiments of the invention.
Figure 9B:
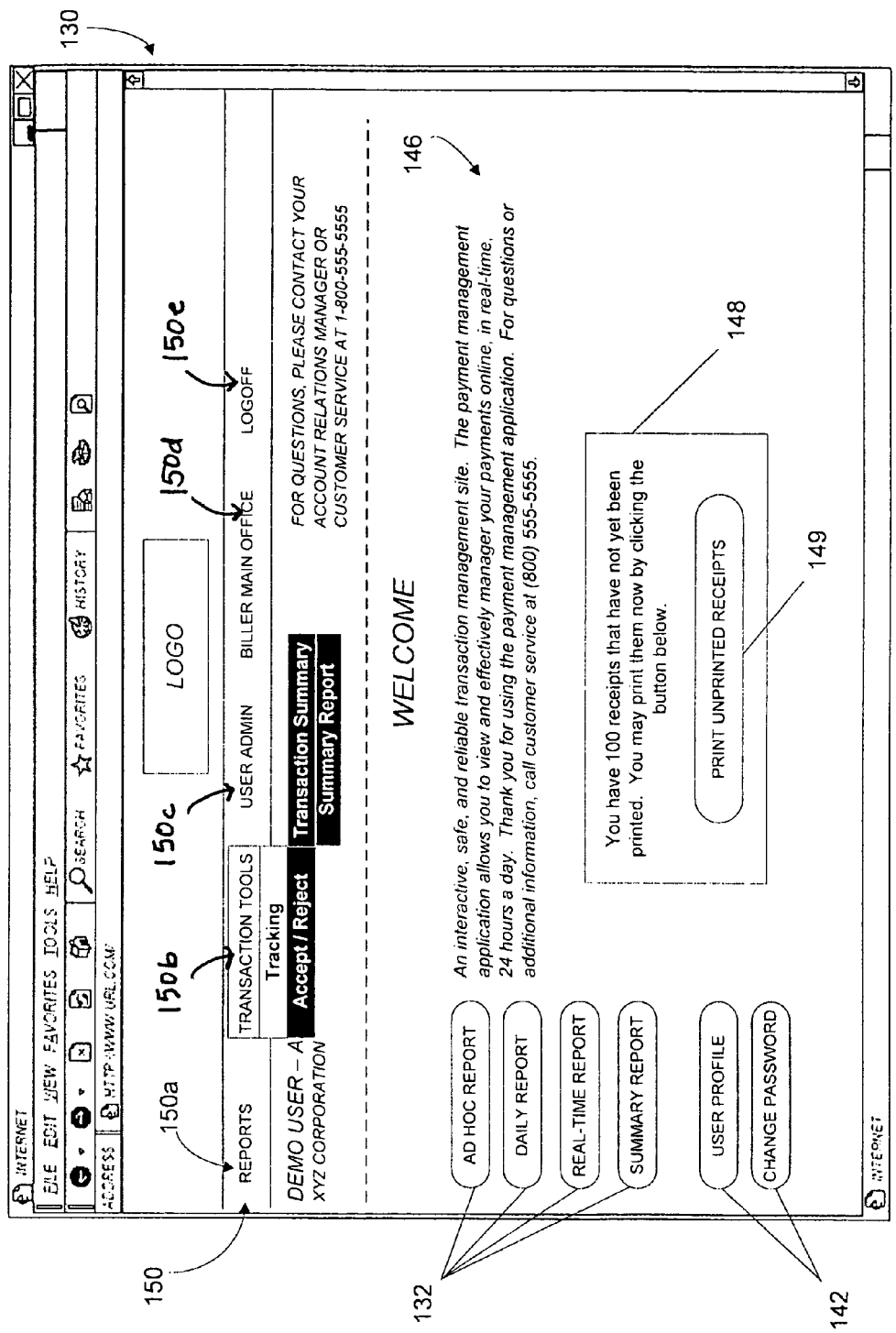

FIGS. 9a and 9b illustrate welcome pages 130 of the payment management application 72 according to embodiments of the invention. In some embodiments, the payment management application 72 can display the welcome page 130 after a user (e.g., a user associated with a receiver 66 or a third-party organization managing the processing system 64) has successfully logged into the payment management application 72 by providing a valid username and password or other secure access mechanism. The welcome page 130 can include one or more report selection mechanisms 132. The user can use the report selection mechanisms 132 to view a report criteria page that the user can use to generate and/or view a report of payments 62 received by the processing system 64. For example, the user can select an ad hoc report selection mechanism 132 to generate and view an ad hoc report. In some embodiments, selecting the ad hoc report selection mechanism 132 can cause the payment management application 72 to display an ad hoc report criteria page 135, as shown in FIG. 10a.

Figure 10A:
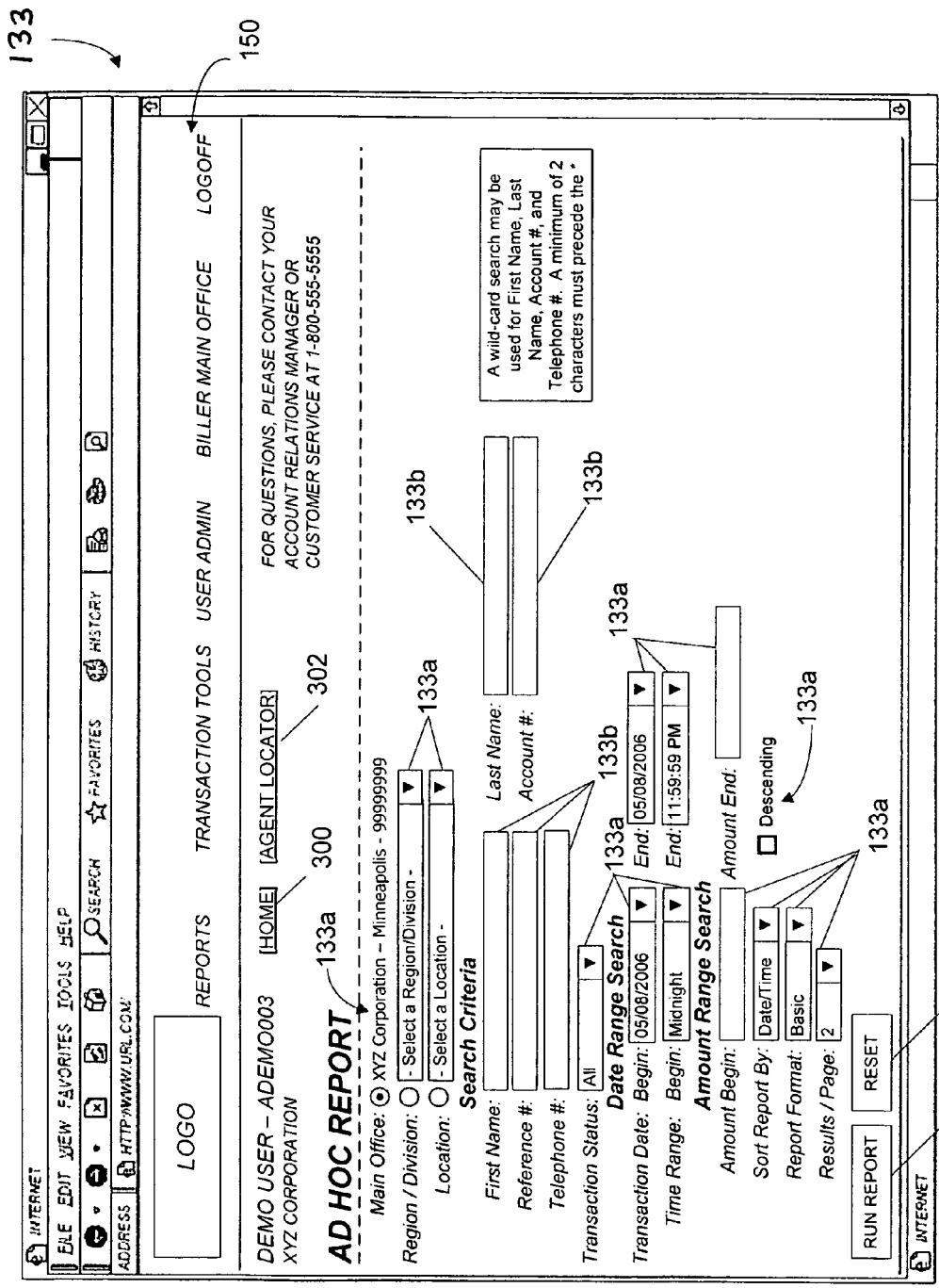
FIG. 10a illustrates an ad hoc report criteria page of the payment management application of FIG. 1 according to one embodiment of the invention.

As shown in FIG. 10a, the ad hoc report criteria page 133 can include one or more selection mechanisms 133a and/or input mechanisms 133b that the user can use to specify search parameters (e.g., report criteria). For example, the search parameters can include a customer's first name, a customer's last name, a payment reference number, a customer's account number, a customer's telephone number, a transaction status (e.g., pending, reviewed, approved, etc.), a method of payment indicator (e.g., payment by telephone, payment by check, etc.), or any other parameter associated with a transaction. In some embodiments, wild-card characters can be used for the customer's first name, last name, account number, and telephone number. In some embodiments, wild-card character can be required to be preceded by at least two alphabetic and/or numeric characters. In other embodiments, the payment management application 72 can be configured to automatically perform a smart search (search for all parameters having a complete or partial match) based on keywords entered by a user without requiring the user to enter wild-card characters.

As shown in FIG. 10a, the ad hoc report criteria page 133 can also include selection mechanisms 133a and/or input fields 133b that a user can use to specify search parameters that include a transaction begin date, a transaction end date a transaction time range, an amount range, a sort order (e.g., ascending or descending), a report format, and/or results per page.

As shown in FIG. 10a, the ad hoc report criteria page 133 can also include a run report selection mechanism 133c and a reset selection mechanism 133d. Selecting the reset selection mechanism 133d can cause the payment management application 72 to disregard any changes made by the user to the values and parameters included in the ad hoc report criteria page 133 and can return the values and parameters to their default values.

Figure 10B:
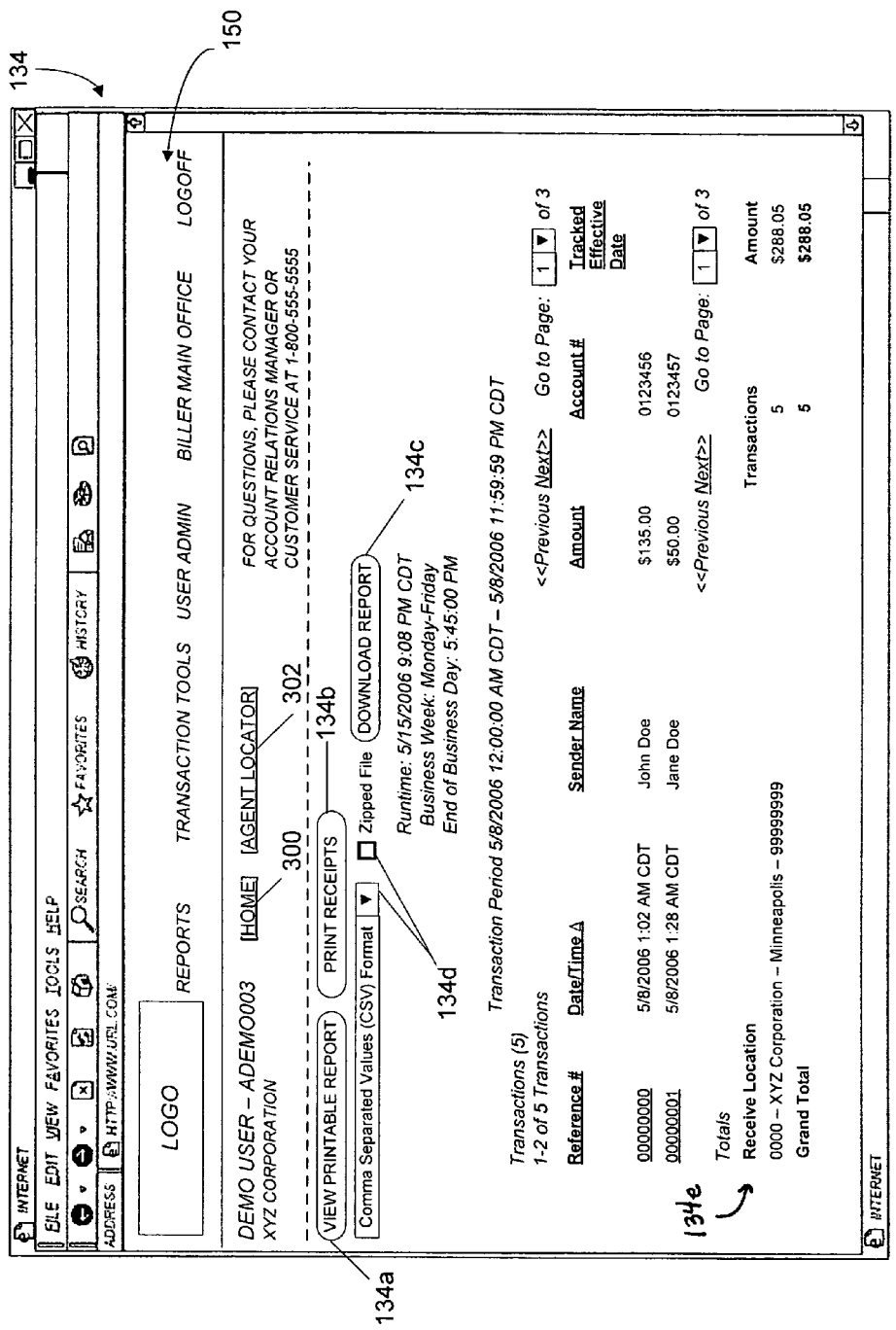
FIG. 10b illustrates an ad hoc basic report page of the payment management application of FIG. 1 according to one embodiment of the invention.

Selecting the run report selection mechanism 133c can cause the payment management application 72 to generate an ad hoc report page 133, as illustrated in FIG. 10b. The ad hoc report page 133 includes payments 62 received by the processing system 64 that match the search parameters specified by the user using the ad hoc report criteria page 133.

It should be understood, that account number included in reports generated by the payment management application 72, such as the ad hoc report page 133, can be masked based on the masking standards set by an administrator and the particular user generating the report. As shown in FIG. 10b, each transaction included in the ad hoc report page 133, as well as other reports generated by the payment management application 72, can include a reference number. In some embodiments, the user can select the reference number in order to view additional details associated with the selected transactions. In addition, the user can select a column heading included in the ad hoc report page 133, and other reports generated by the payment management application 72, in order to sort the report based on the selected heading.

As shown in FIG. 10b, the ad hoc report page 134 can include a view printable report selection mechanism 134a and a print receipts selection mechanism 134b. The user can select the view printable report selection mechanism 134a in order to view a version of the ad hoc report page 134 that can be sent to a printer or other destination. The user can select the print receipts selection mechanism 134b in order to print or reprint receipts associated with the payments 62 included in the ad hoc report page 134. As also shown in FIG. 10b, the ad hoc report page 134 can also include a download report selection mechanism 134c and one or more download parameter selection mechanisms 134d. The user can select the download report selection mechanism 134c in order to download a version of the ad hoc report page 134 and store the ad hoc report page 134 to a storage device, such as a file, a database, a compact disc, etc. The downloaded version of the ad hoc report page 134 can be formatted based on download parameters selected by the user using the download parameters selection mechanisms 134d. For example, the download parameters can include a format for the downloaded ad hoc report page 134 (e.g., a comma separated values ("CSV") format), an extensible markup language ("XML") format, a text format, or another public or proprietary format) and whether the downloaded ad hoc report page 134 should include a compressed format (e.g., a zipped file). In some embodiments, the downloaded ad hoc report page 134 can be manipulated using a standard spreadsheet application, such as Excel provided by Microsoft. In some embodiments, the user can also communicate or transmit (e.g., email) a version of the ad hoc report page 134 to one or more receipts using the payment management application 72.

Figure 10C:
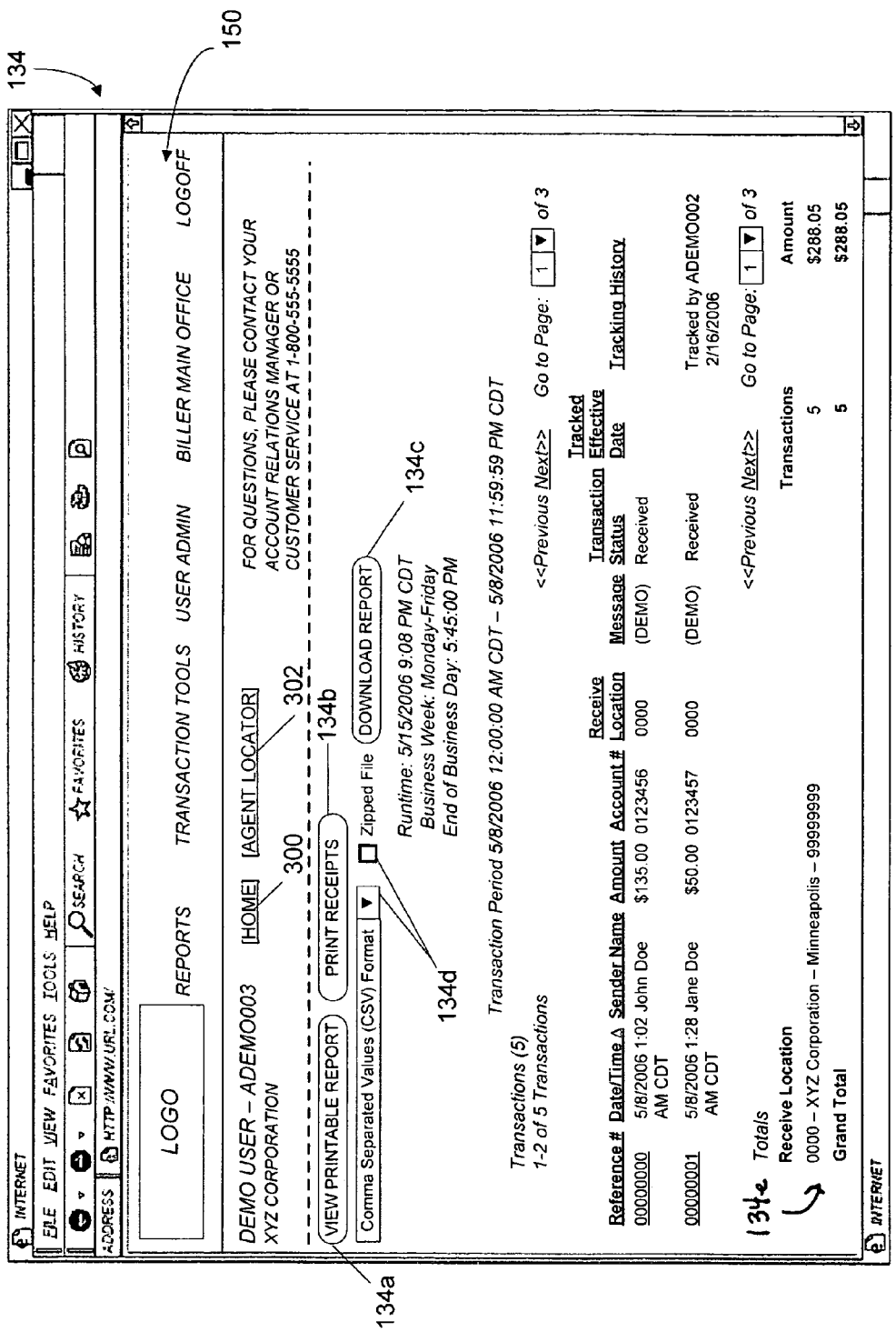
FIG. 10c illustrates an ad hoc detailed report page of the payment management application of FIG. 1 according to one embodiment of the invention.

In some embodiments, the payment management application 72 can generate multiple forms of the ad hoc report page 134. For example, the payment management application 72 can generate a basic form of the ad hoc report page 134 (e.g., as shown in FIG. 10b) and a detailed form of the ad hoc report page 134 (e.g., as shown in FIG. 10c). As shown in FIG. 10c, the detailed form of the ad hoc report page 134 can include additional information not included in the basic form of the ad hoc report page 134, such as a receiver receive location, a message, a transaction status, and a tracking history. The transaction status can indicate the status of the transaction, such as pending, sent, received, refund, or cancelled. In addition, the payment management application 72 can generate a customized ad hoc report based on report parameters (e.g., columns, order, etc.) selected by a particular user. In some embodiments, parameters set by a user for a customized ad hoc report can be shared with or provided to other users of the application 72.

As shown in FIGS. 10b and 10c, the ad hoc report page 134 can include a total section 134e. The total section 134e can display a total (e.g., total number and/or a total amount) of transactions included in the ad hoc report page 134. In some embodiments, the total can be divided into totals for each location or receive code associated with one or more receivers 66.

Figure 10D:
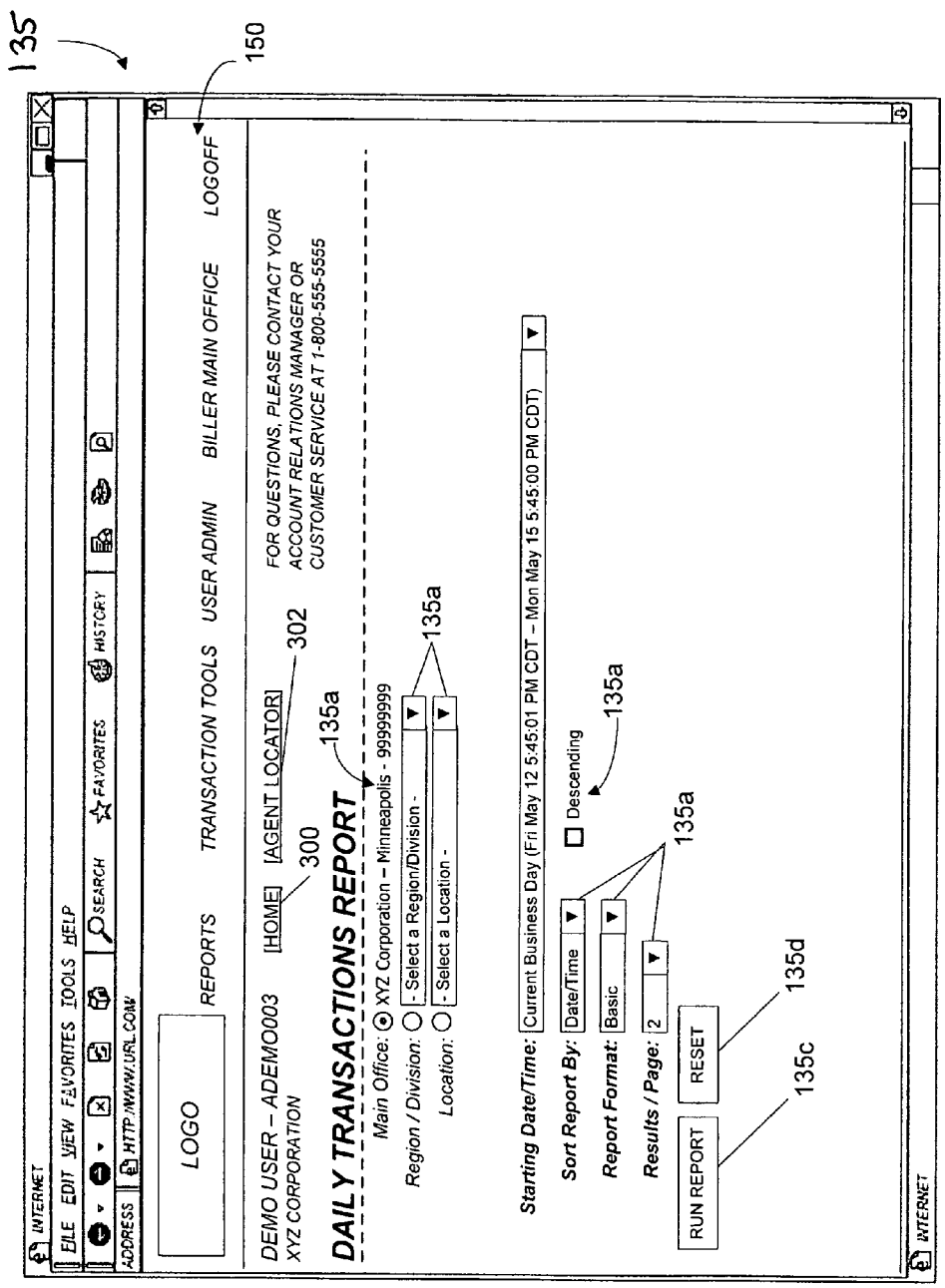
FIGS. 10d and 10e illustrate daily report criteria pages of the payment management application of FIG. 1 according to embodiments of the invention.
Figure 10E:
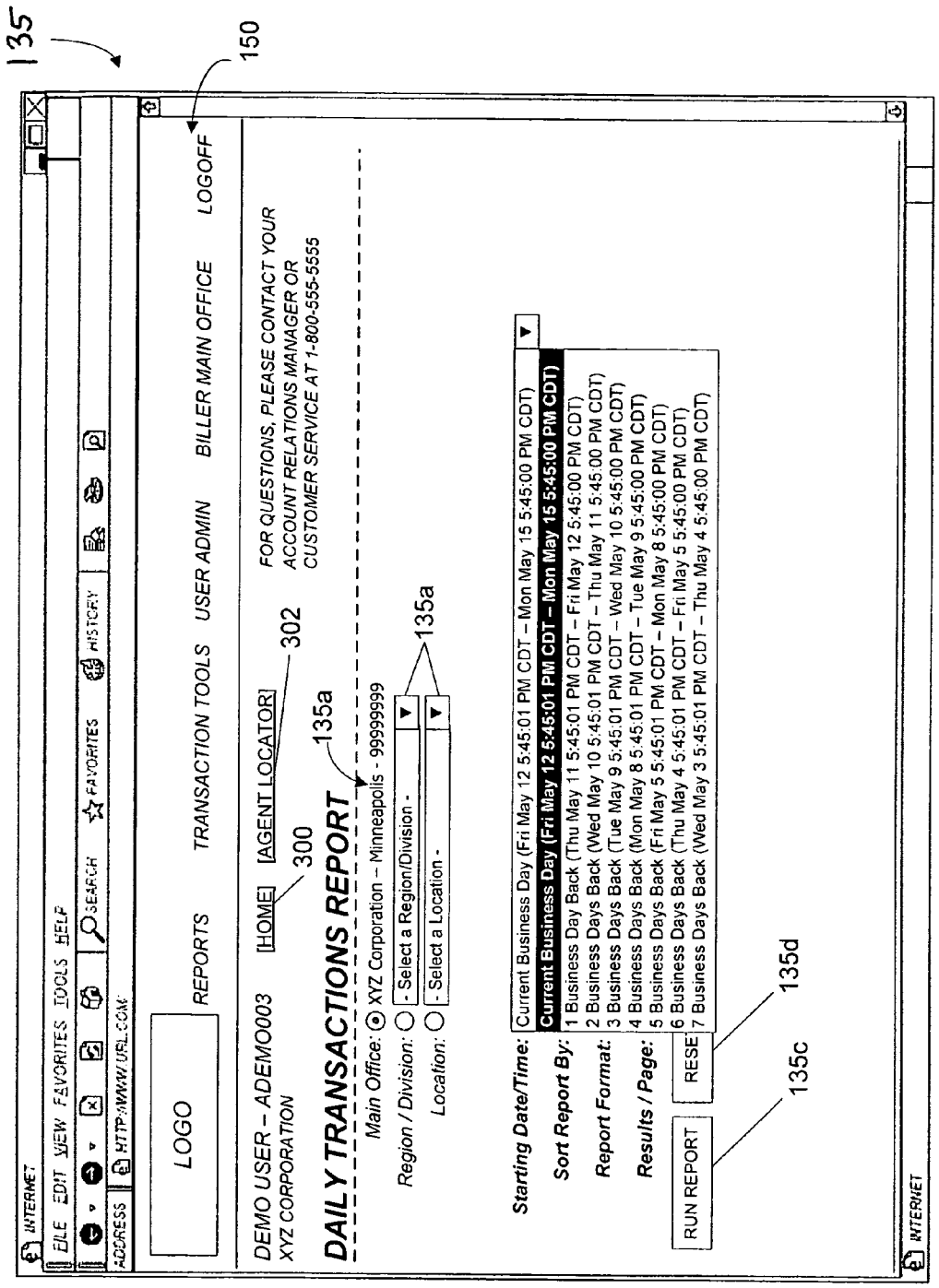

As shown in FIGS. 9a and 92, the user can select a daily report selection mechanism 132 included in the welcome page 130 in order to view a daily report generated by the payment management application 72. In some embodiments, selecting the daily report selection mechanism 132 can cause the payment management application 72 to display a daily report criteria page 135, as shown in FIGS. 10d and 10e. The daily report criteria page 135 can include one or more report parameter selection mechanisms 135a and/or input fields 135b that can be used by a user to select search parameters (e.g., report criteria) for a daily report. For example, using the selection mechanisms included in the daily report criteria page 135, the user can specify a main office, a region/division, a starting date and time, sorting parameters, a report format, and a number of results per page.

As shown in FIG. 10e, in some embodiments, the user can select a selection mechanism 135a associated with a starting date and time search parameter in order to view a menu or list of available starting dates and times. In some embodiments, the available starting dates can be limited to business days of a receiver 66 (e.g., the past 3 business days of the receiver 66) and the available starting times can be limited to business day start times of a receiver 66.

As shown in FIGS. 10d and 10e, the daily report criteria page 135 can also include a run report selection mechanism 135c and a reset selection mechanism 135d. Selecting the reset selection mechanism 135d can cause the payment management application 72 to disregard any changes made by the user to the values and parameters included in the daily report criteria page 135 and can return the values and parameters to their default values.

Figure 10F:
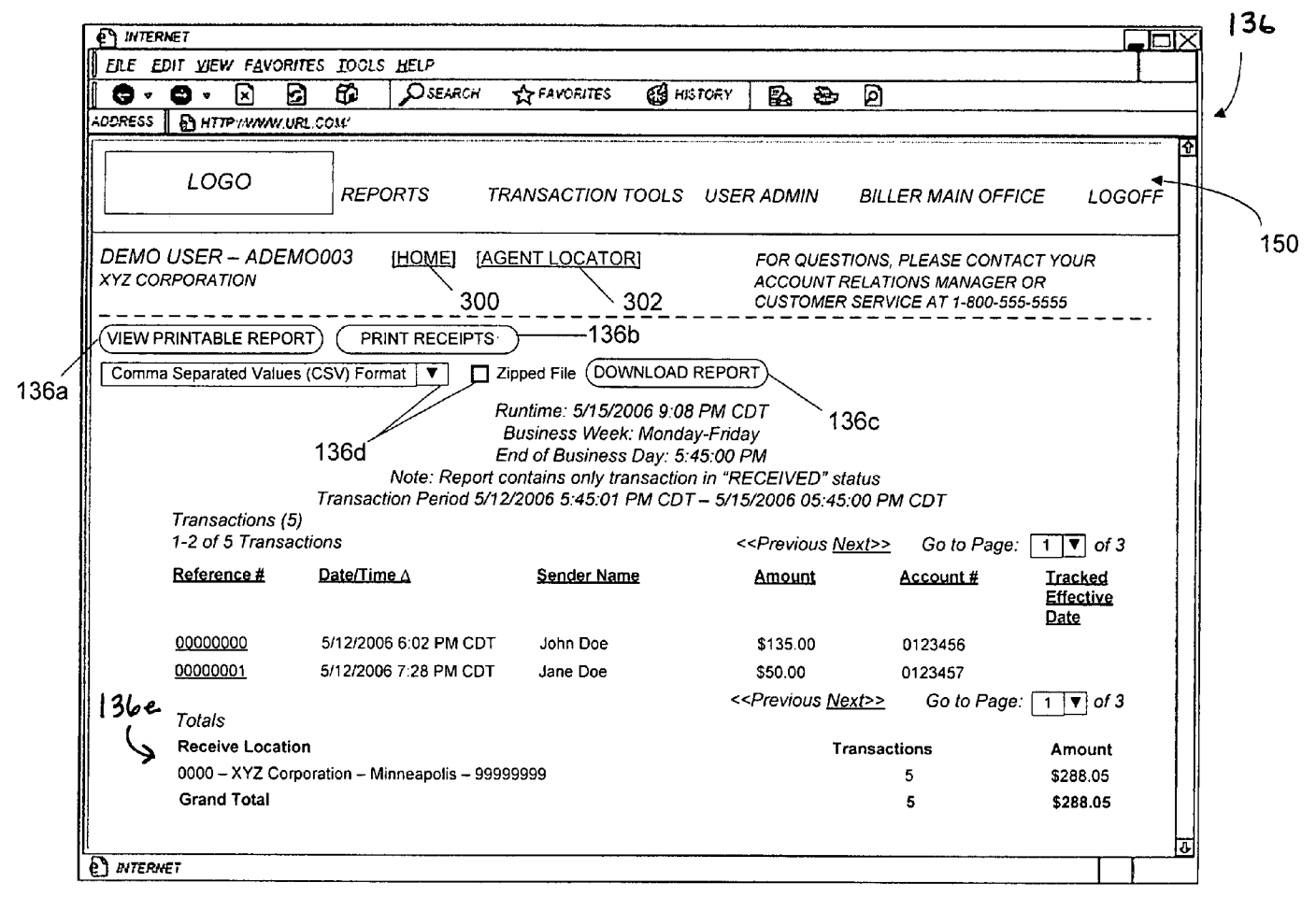

Selecting the run report selection mechanism 135c can cause the payment management application 72 to generate a daily report page 136, as illustrated in FIG. 10f. The daily report page 136 includes payments 62 received by the processing system 64 that match the search parameters specified by the user using the daily report criteria page 135.

As shown in FIG. 10f, the daily report page 136 can include a view printable report selection mechanism 136a, a print receipts selection mechanism 136b, a download report selection mechanism 136c, and one or more download parameter selection mechanisms 136d. In some embodiments, the daily report page 136 can also include a refresh selection mechanism (not shown) that a user can select in order to refresh the information included in the daily report page 136.

Figure 10G:
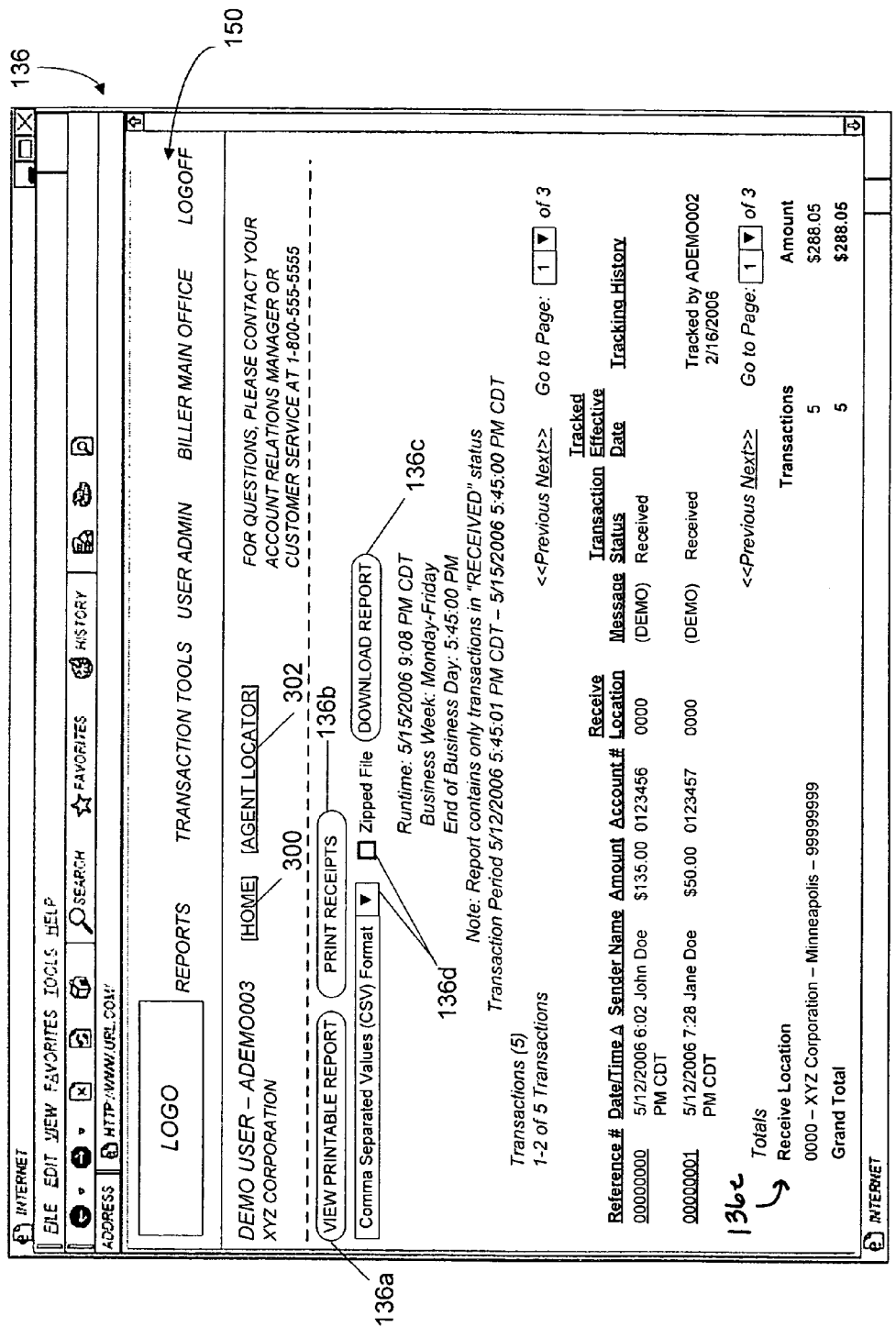
FIG. 10g illustrates a daily detailed report page of the payment management application of FIG. 1 according to one embodiment of the invention.

In some embodiments, the payment management application 72 can generate multiple forms of the daily report page 136. For example, the payment management application 72 can generate a basic form of the daily report page 136 (e.g., as shown in FIG. 10f) and a detailed form of the daily report page 136 (e.g., as shown in FIG. 10g). As shown in FIG. 10g, the detailed form of the daily report page 136 can include additional information not included in the basic form of the daily report page 136, such as receive location, message, transaction status, and tracking history. In addition, the payment management application 72 can generate a customized daily report based on report parameters (e.g., columns, order, etc.) selected by a particular user. In some embodiments, parameters set by a user for a customized daily report can be shared with or provided to other users of the application 72.

As shown in FIGS. 10f and 10g, the daily report page 136 can include a total section 136e. The total section 136e can display a total (e.g., total number and total amount) of the transactions included in the daily report page 136. In some embodiments, the total can be divided into totals for each location or receive code associated with one or more receivers 66.

Figure 10H:
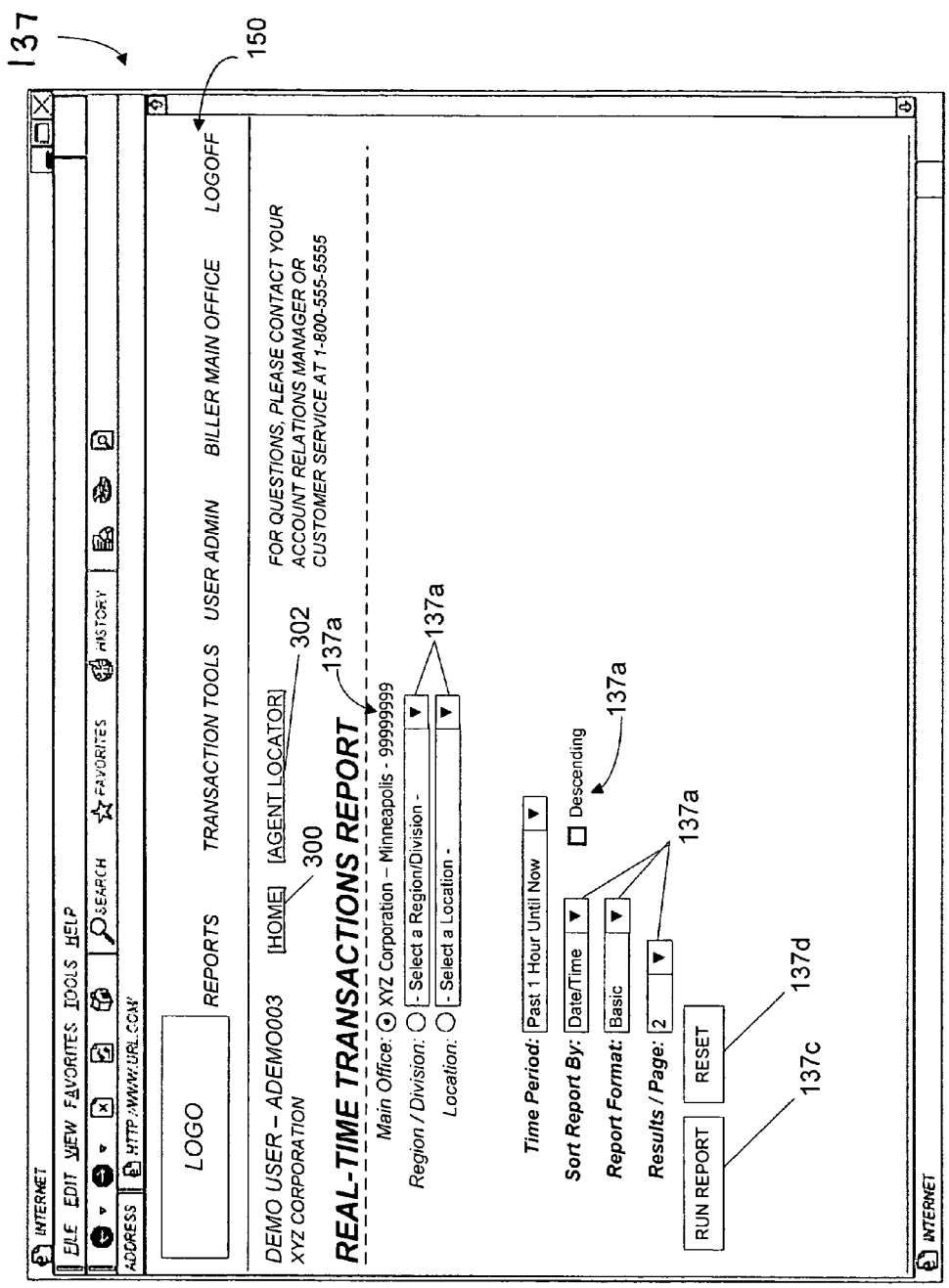
FIGS. 10h and 10i illustrate real-time report criteria pages of the payment management application of FIG. 1 according to embodiments of the invention.
Figure 10I:
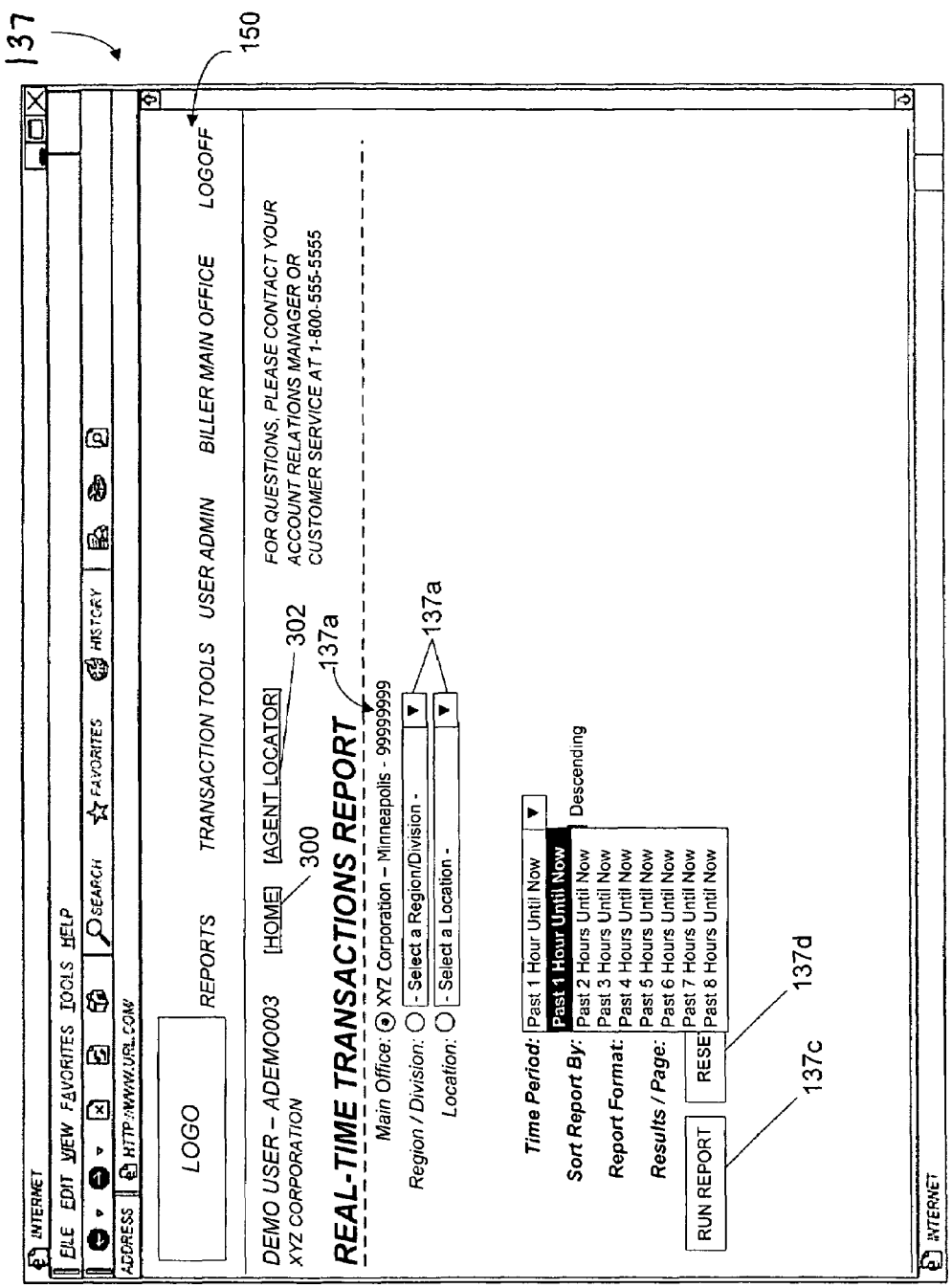

As shown in FIGS. 9a and 92, the user can select a real-time report selection mechanism 132 included in the welcome page 130 in order to view a real-time report generated by the payment management application 72. In some embodiments, selecting the real-time report selection mechanism 132 can cause the payment management application 72 to display a real-time report criteria page 137, as shown in FIGS. 10h and 10i. The real-time report criteria page 137 can include one or more report parameter selection mechanisms 137a and/or input fields 137b that a user can use to select search parameters (e.g., report criteria) for a real-time report. For example, using the selection mechanisms included in the real-time report criteria page 137, the user can specify a main office, a region/division, a time period, sorting parameters, a report format, and a number of results per page.

As shown in FIG. 10i, in some embodiments, the user can select a selection mechanism 137a associated with a time period search parameter in order to view a menu or list of available time periods. In some embodiments, the available time periods can be limited to up to the past 8 hours.

As shown in FIGS. 10h and 10i, the real-time report criteria page 137 can also include a run report selection mechanism 137c and a reset selection mechanism 137d. Selecting the reset selection mechanism 137d can cause the payment management application 72 to disregard any changes made by the user to the values and parameters included in the real-time report criteria page 137 and can return the values and parameters to their default values.

Figure 10J:
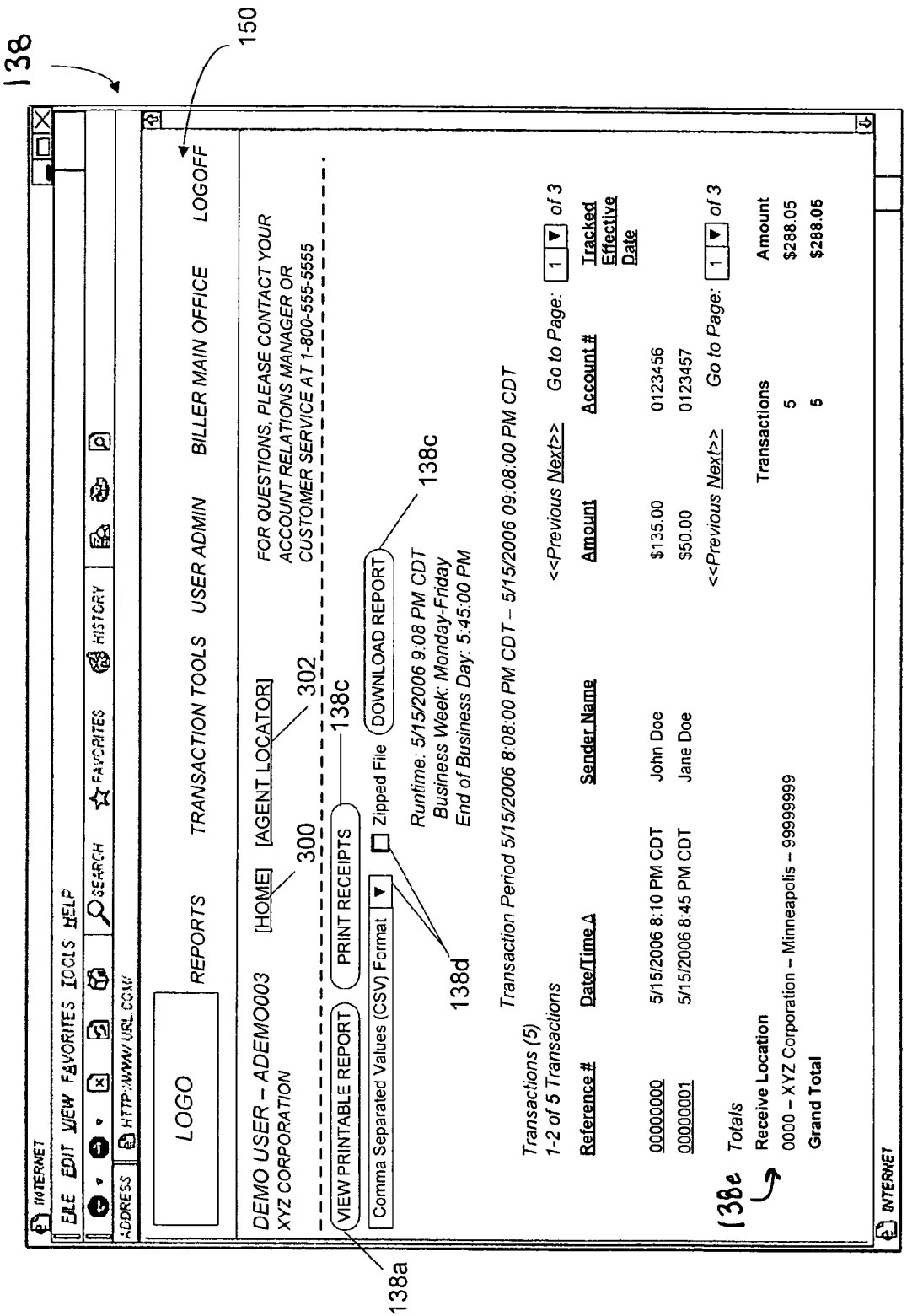
FIG. 10j illustrates a real-time basic report page of the payment management application of FIG. 1 according to one embodiment of the invention.
Figure 10I:
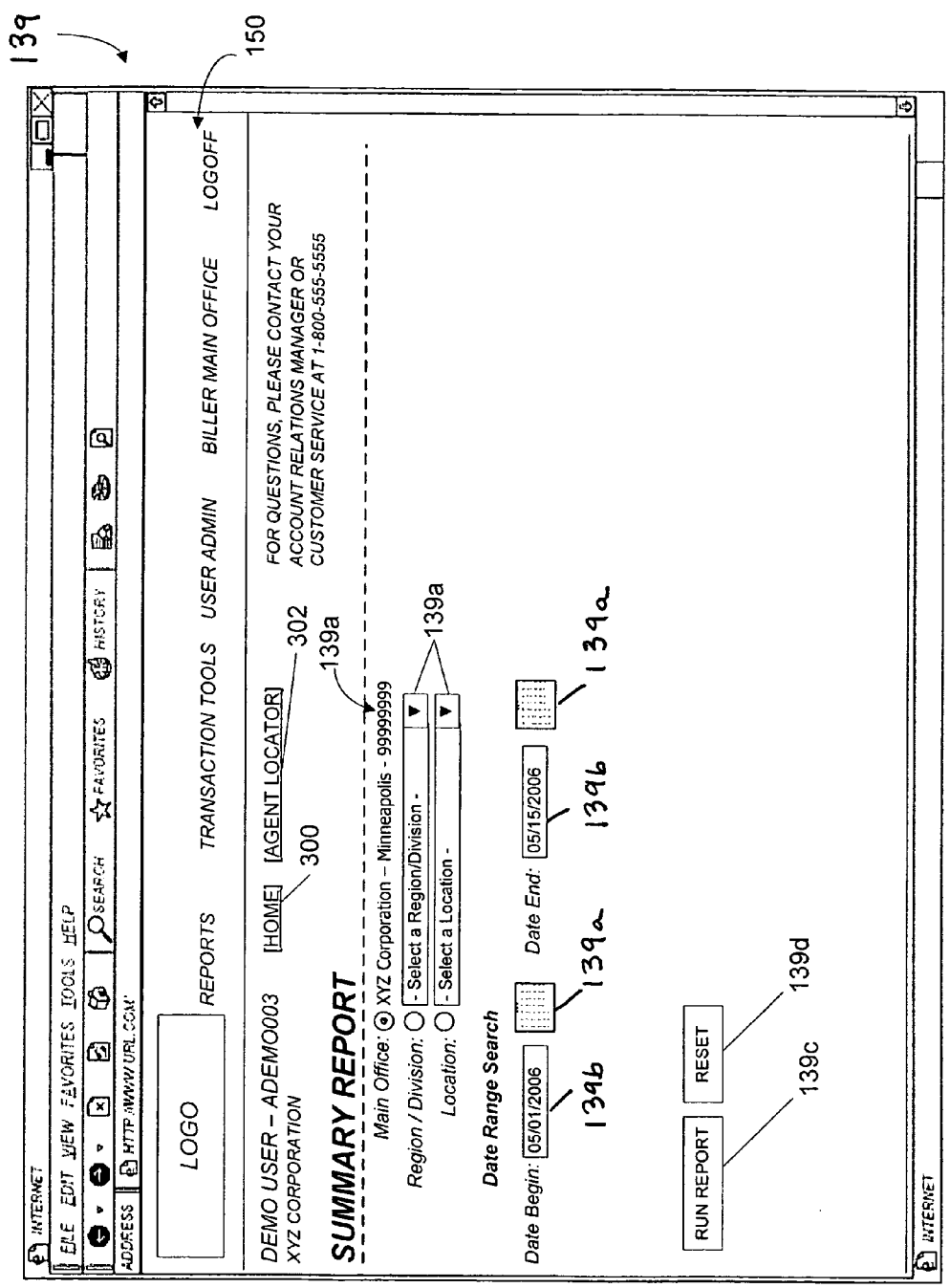

Selecting the run report selection mechanism 137c can cause the payment management application 72 to generate a real-time report page 138, as illustrated in FIG. 10j. The real-time report page 138 includes payments 62 received by the processing system 64 that match the search parameters specified by the user using the real-time report criteria page 137.

As shown in FIG. 10j, the real-time report page 138 can include a view printable report selection mechanism 138a, a print receipts selection mechanism 138b, a download report selection mechanism 138c, and one or more download parameter selection mechanisms 138d. In some embodiments, the real-time report page 138 can also include a refresh selection mechanism (not shown) that a user can select in order to refresh the information included in the real-time report page 138.

In some embodiments, the payment management application 72 can generate multiple forms of the real-time report page 138. For example, the payment management application 72 can generate a basic form of the real-time report page 138 (e.g., as shown in FIG. 10j) and a detailed form of the real-time report page 138 (e.g., as shown in FIG. 10k). As shown in FIG. 10k, the detailed form of the real-time report page 138 can include additional information not included in the basic form of the real-time report page 138, such as receive location, message, transaction status, and tracking history. In addition, the payment management application 72 can generate a customized real-time report based on report parameters (e.g., columns, order, etc.) selected by a particular user. In some embodiments, parameters set by a user for a customized real-time report can be shared with or provided to other users of the application 72.

As shown in FIGS. 10j and 10k, the real-time report page 138 can include a total section 138e. The total section 138e can display a total (e.g., total number and total amount) of the transactions included in the real-time report page 138. In some embodiments, the total can be divided into totals for each location or receive code associated with one or more receivers 66.

As shown in FIGS. 9a and 92, the user can select a summary report selection mechanism 132 included in the welcome page 130 in order to view a summary report generated by the payment management application 72. In some embodiments, selecting the summary report selection mechanism 132 can cause the payment management application 72 to display a summary report criteria page 139, as shown in FIG. 10l. The summary report criteria page 139 can include one or more report parameter selection mechanisms 139a and/or input fields 139b that a user can use to select search parameters (e.g., report criteria) for a summary report. For example, using the selection mechanisms included in the summary report criteria page 139, the user can specify a main office, a region/division, a location, and a data range. As shown in FIG. 10l, in some embodiments, the summary report criteria page 139 (and other pages generated by the payment management application 72) can include selection mechanisms 139a that include a calendar selection mechanism that the user can use to view a calendar and select a date for a date range beginning date or a date range ending date.

As shown in FIG. 10l, the summary report criteria page 139 can also include a run report selection mechanism 139c and a reset selection mechanism 139d. Selecting the reset selection mechanism 139d can cause the payment management application 72 to disregard any changes made by the user to the values and parameters included in the summary report criteria page 139 and can return the values and parameters to their default values.

Figure 10M:
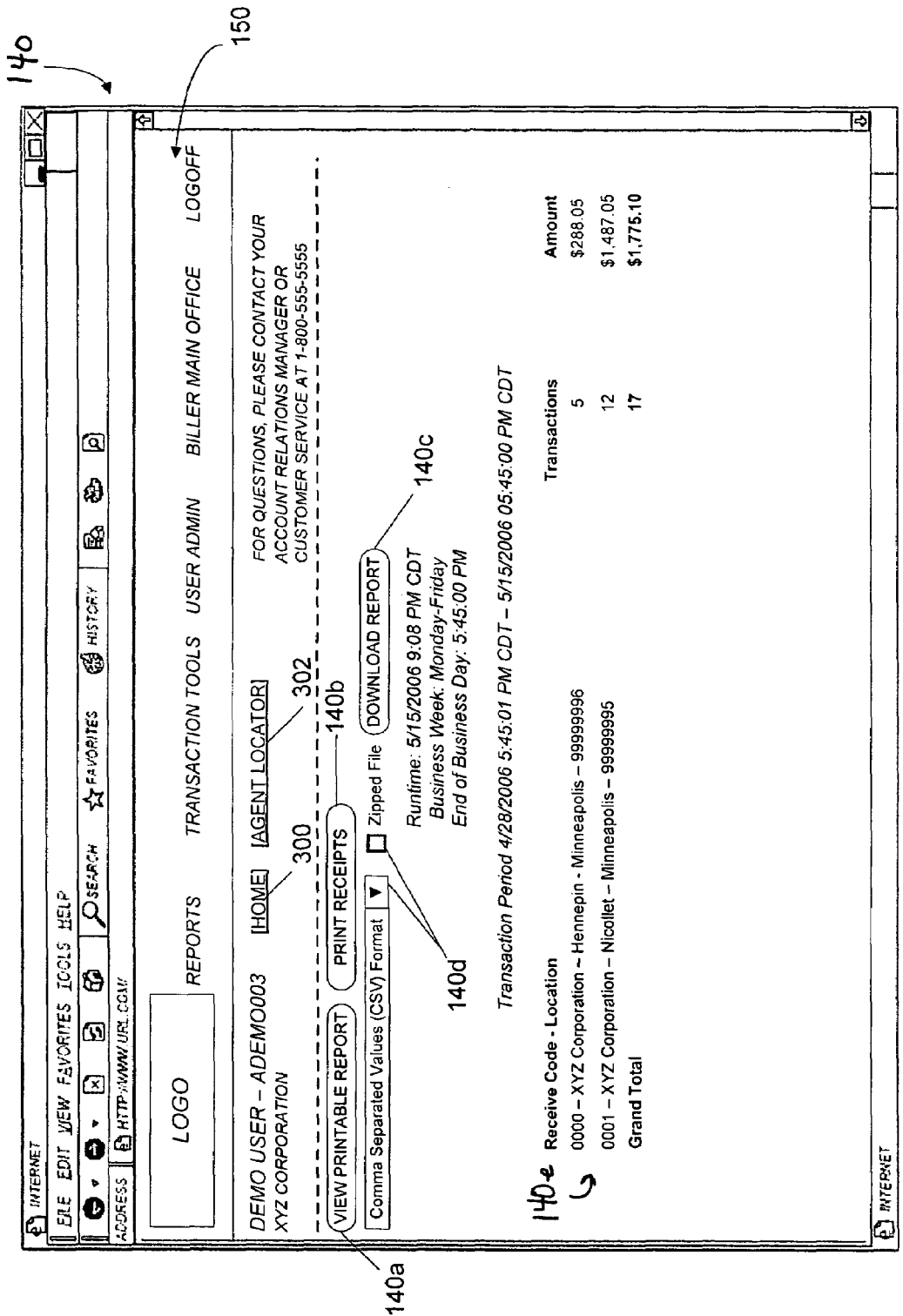
FIG. 10*m* illustrates a summary report page of the payment management application of FIG. 1 according to one embodiment of the invention.

Selecting the run report selection mechanism 139c can cause the payment management application 72 to generate a summary report page 140, as illustrated in FIG. 10m. The summary report page 140 can include a summary of payments 62 received by the processing system 64 that match the search parameters specified by the user using the summary report criteria page 139.

As shown in FIG. 10m, the summary report page 140 can include a view printable report selection mechanism 140a, a print receipts selection mechanism 140b, a download report selection mechanism 140c, and one or more download parameter selection mechanisms 140d. In some embodiments, the summary report page 140 can also include a refresh selection mechanism (not shown) that a user can select in order to refresh the information included in the summary report page 140.

As shown in FIG. 10m, the summary report page 140 can include a total section 140e. The total section 140e can display a total (e.g., total number and total amount) of the transactions meeting the search parameters specified by the user using the summary report criteria page 139. In some embodiments, the total can be divided into totals for each location or receive code associated with one or more receivers 66.

In some embodiments, the payment management application 72 can generate a customized summary report based on report parameters (e.g., columns, order, etc.) selected by a particular user. In some embodiments, parameters set by a user for a customized summary report can be shared with or provided to other users of the application 72.

In some embodiments, the payment management application 72 can also provide a selection mechanism that a user can select in order to view a graph associated with a report generated by the payment management application 72. The payment management application 72 can also allow a user to select parameters for a graph, such as data to be included in the graph, a type of graph to use to display the report data, a format for displaying the graph, and other graph options (e.g., title, legend, axes labels, scales, etc.). In addition, the application 72 can allow a user to download a version of a generated graph. For example, the payment management application 72 can allow a user to download a version of a generated graph in an XML format, a CSV format, a text format, or another public or proprietary format. In addition, the application 72 can allow a user to communicate or transmit a version of a generated graph via an email message, a text message, or other transmission mechanism.

As shown in FIGS. 9a and 9b, the welcome page 130 can also include one or more user settings selection mechanisms 142. For example, the welcome page 130 can include a user profile selection mechanism 142 and a change password selection mechanism. Selecting the user profile selection mechanism 134 can cause the payment management application 72 to display a user profile page that the user can use to change user settings and/or parameters.

The user can also select the change password selection mechanism 142 in order to change the password or other secure access mechanism that the user uses to access the payment management application 72.

As shown in FIGS. 9a and 9b, the welcome page 130 can include a message section 146. The message section 146 can includes instructions, contact information, notices, new product releases, newsletter, advertising, product overviews, promotions, tips and hints, links to chat rooms or bulletin boards, administration changes, surveys, etc. posted by the processing system 64. In some embodiments, the processing system 64 can broadcast messages to one or more users using the message section 146. The processing system 64 can also broadcast messages to specific user roles or users associated with one or more receivers 66. For example, the processing system 64 can broadcast a message to administrators associated with one or more receivers 66. The broadcast message can be automatically determined by the processing system 64 or can be specified by a user (e.g., an administrator) associated with a receiver 66 or a third-party organization managing the processing system 64.

The welcome page 130 can also include a print receipts section 148. The print receipts section 148 can include a message or statement informing the user of the number of new receipts generated by the payment processor 64 and/or the payment management application 72 for payments received by the processing system 64 on behalf of one or more receivers 66 (e.g., a receiver 66 associated with the user). In some embodiments, the number of new receipts can include the number of new receipts that have not yet been printed. As shown in FIGS. 9a and 9b, the print receipts section 148 can include a print unprinted receipts selection mechanism 149. The user can select the print unprinted receipts selection mechanism 149 in order to print one or more unprinted receipts. In some embodiments, the user can also use the print unprinted receipts selection mechanism 149 to print previously-printed receipts. The re-printed receipts can include a statement or message that the receipts have been re-printed. In some embodiments, selecting the print unprinted receipts selection mechanism 149 can cause the payment management application 72 to display printable versions of the unprinted receipts that can be sent to a printer. The printable versions of the unprinted receipts can be in a common printable format (e.g., an adobe acrobat format) that can be sent to general purpose printers. The common printable format of the receipts can allow the user to print the receipts to any available, general purpose printer without requiring specific hardware or software. In some embodiments, the user can customize the print settings of the receipts, such as the size of the printed receipt and the number of receipts to print per page. The user can also print receipts individually or in batches.

In some embodiments, the payment management application 72 can push unprinted or printed receipts directly to a local printer or other device of the user through the computer or other device operated by the user requesting printing of the receipts. In other embodiments, the computer or other device operated by the user to execute the payment management application 72 can pull unprinted or printed receipts from the processing system 64 and can then print the receipts to a local printer of the user. Receipts can be pushed or pulled individually or as a batch and can be pushed or pulled as they become available or at a predetermined time (e.g., overnight).

A user can also clear the message or statement included in the print receipts section 148 with or without printing the unprinted receipts indicated in the message. In addition, the payment management application 72 can be configured to turn off the message displayed in the print receipts section 148 for a particular receiver 66 and/or particular users associated with one or more receivers 66. For example, the payment management application 72 can be configured to display the message in the print receipts section only to particular users and/or user roles.

As shown in FIGS. 9a and 9b, the welcome page 130 (and other pages generated by the payment management application 72) can also include a menu section 150 with one or more selection mechanisms for accessing features provided by the payment management application 72. For example, the menu section 150 can include a reports selection mechanism 150a, a transaction management selection mechanism 150b, a user administration selection mechanism 150c, a receiver main office selection mechanism 150d, and a logout selection mechanism 150e. Selecting the reports selection mechanism 150a can allow the user to select a particular type of report to generate and/or view. For example, selecting the reports selection mechanism 150a can cause the payment management application 72 to display a drop-down menu, or one or more other types of selection mechanisms, that lists types of reports that can be generated and/or viewed by the user, such as an ad hoc report, a daily report, a real-time report, and a summary report. If the user selects a particular type of report from the drop-down menu, and the payment management application 72 can display a corresponding report page, as described with respect to FIGS. 10a-10m.

Selecting the transaction management selection mechanism 150b included in the menu section 150 of the welcome page 130 (or of another page generated by the payment management application 72) can allow the user to select a transaction management tool or feature provided by the payment management application 72. For example, as shown in FIGS. 9a and 9b, selecting the transaction management selection mechanism 150b can display a drop-down menu, or other selection mechanism, that allows the user to select a tracking tool or an accept/reject tool. As shown in FIG. 9a, selecting the tracking tool can display another drop-down menu, or other type of selection mechanism, that allows the user to select an items to track selection mechanism or a tracked items selection mechanism.

Figure 11:
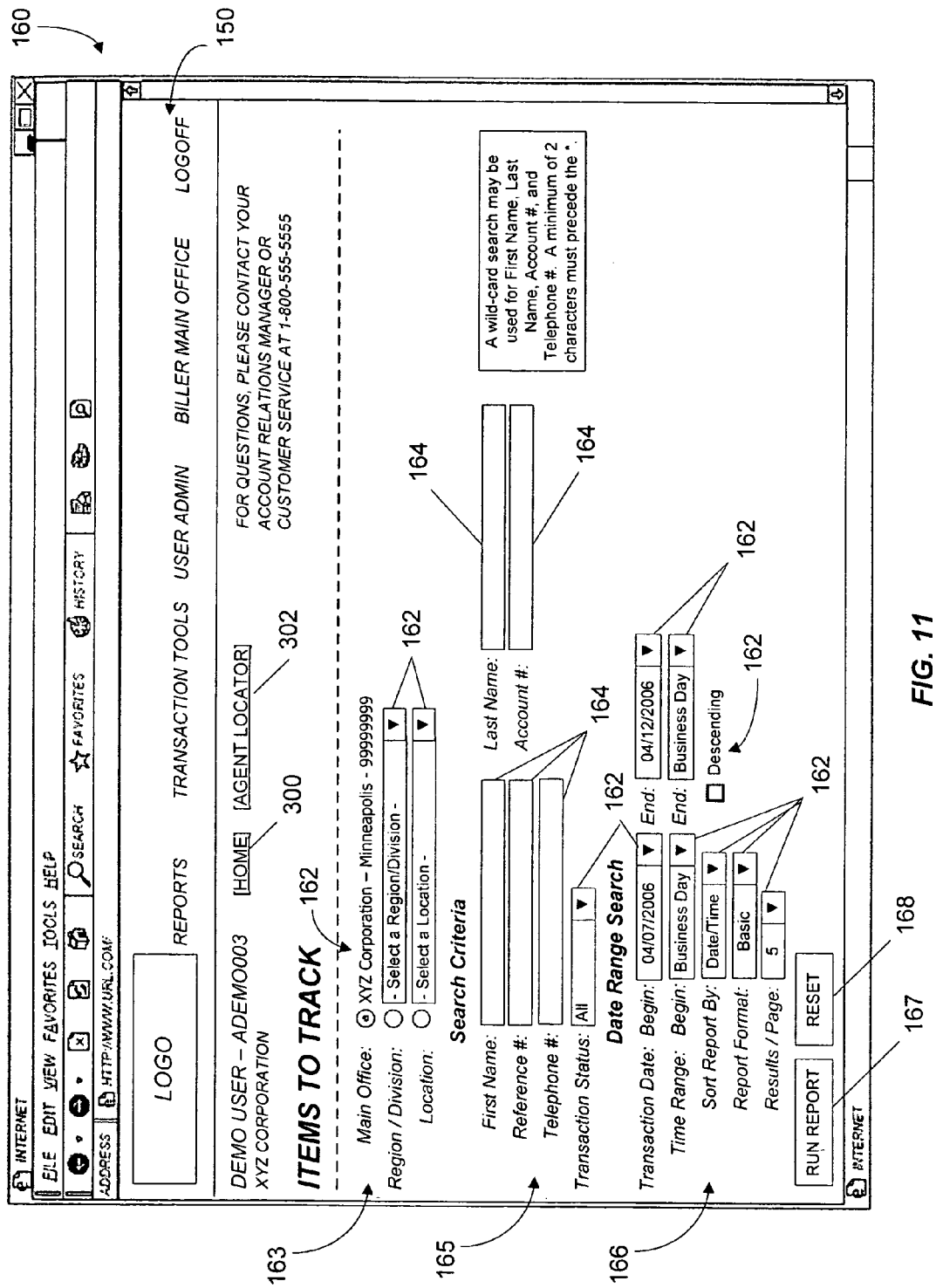
FIG. 11 illustrates an items to track page of the payment management application of FIG. 1 according to one embodiment of the invention.

The user can select the items to track selection mechanism in order select one or more payments or transactions received by the processing system 64 to track. In some embodiments, selecting the items to track selection mechanism can cause the payment management application 72 to display an items to track criteria page 160, as shown in FIG. 11. The items to track criteria page 160 can include one or more selection mechanisms 162 and/or input mechanisms 164 for selecting and entering parameters for generating a track items report from which transactions can be selected for tracking. For example, the items to track criteria page 160 can include a receiver location section 163 that includes main office selection mechanism 162, a region/division selection mechanism 162, and a location selection mechanism 162. The user can use the selection mechanisms 162 included in the receiver location section 163 to select a particular location, branch, division, or office of one or more receivers 66. Payments matching the receiver location parameters are included in the track items report.

As shown in FIG. 11, the items to track criteria page 160 can also include a search criteria section 165. The search criteria section 165 can include one or more selection mechanisms 162 and/or input mechanisms 164 for selecting and entering search parameters. The search parameters can include a customer's first name, a customer's last name, a payment reference number, a customer's account number, a customer's telephone number, or a transaction status. In some embodiments, wild-card characters can be used for the customer's first name, last name, account number, and telephone number. A wild-card character can be required to be preceded by at least two alphabetic and/or numeric characters. Payments matching the search criteria entered by the user are included in the track items report. It should be understood that the search criteria are optional parameters and that the user may not be required to provide them in order to generate the track items report.

In addition to or in place of the receiver location section 163, the items to track criteria page 160 can include a transaction section 166. The transaction section 166 can include one or more selection mechanisms 162 for selecting transaction or payment parameters to be used to filter payments included in the items to track report. For example, the transaction section 166 can include a transaction begin date selection mechanism, a transaction end date selection mechanism, a transaction begin time range selection mechanism, a transaction end time range selection mechanism, a sort report by selection mechanism, a sort order (e.g., ascending or descending) selection mechanism, a report format selection mechanism, and/or a results per page selection mechanism. Payments matching the selected transaction parameters are included in the track items report.

As shown in FIG. 11, the items to track criteria page 160 can also include a run report selection mechanism 167 and a reset selection mechanism 168. Selecting the reset selection mechanism 168 can cause the payment management application 72 to disregard any changes made by the user to the values and parameters and can return the values and parameters to their default values.

Selecting the run report selection mechanism 167 can cause the payment management application 72 to generate a track items report page 170, as illustrated in FIG. 12. The track items report page 170 includes payments 62 received by the processing system 64 that match the payment location parameters, the search criteria, and the transaction parameters set by the user using the items to track criteria page 160. As shown in FIG. 12, the track items report page 170 can include a view printable report selection mechanism 171 and a print receipts selection mechanism 172. The user can also select the view printable report selection mechanism 171 in order to view a version of the items to track report page 170 that can be sent to a printer or other destination. In addition, the user can select the print receipts selection mechanism 172 in order to print or re-print receipts associated with the payments 62 included in the track items report page 170. As also shown in FIG. 12, the track items report page 170 can also include a download report selection mechanism 173 and one or more download parameter selection mechanisms 174. The user can select the download report selection mechanism 173 in order to download a version of the track items report page 170 and store the track items report page 170 to a storage device, such as a file, a database, a compact disc, etc. The downloaded version of the track items report page 170 can be formatted based on the download parameters selected by the user using the download parameters selection mechanisms 174. For example, the download parameters can specify a format for the downloaded track items report page 170 (e.g., a CSV format, an XML format, a text format, or another public or proprietary format) and whether the downloaded track items report page 170 should include a compressed format (e.g., a zipped file). In some embodiments, the downloaded track items report page 170 can be manipulated using a standard spreadsheet application, such as Excel provided by Microsoft. In some embodiments, the user can also communicate or transmit (e.g., email) a version of the tracked items report page 170 to one or more receipts using the payment management application 72.

As shown in FIG. 12, each payment included in the track items report page 170 is identified by a reference number, a date and time, a sender's or customer's name, an amount and an account number. Each listed payment is also associated with a track item selection mechanism 175a (e.g., a check box). The user can use the track item selection mechanism 175a to select or unselect a particular payment to be tracked. As shown in FIG. 12, the track items report page 170 can also include a select all selection mechanism 175b and/or an unselect all selection mechanism 175c. The user can select the select all selection mechanism 175b to select all of the payments 62 included in the track items report page 170 and can select the unselect all selection mechanism 175c to unselect all of the payments 62 included in the track items report page 170.

As shown in FIG. 12, after the user selects one or more payments 62 to track, the user can select a track selected selection mechanism 176 in order to track the selected payments 62. The user can also select a track all results selection mechanism 178 in order to track all of the payments 62 included in the track items report page 170.

Figure 13:
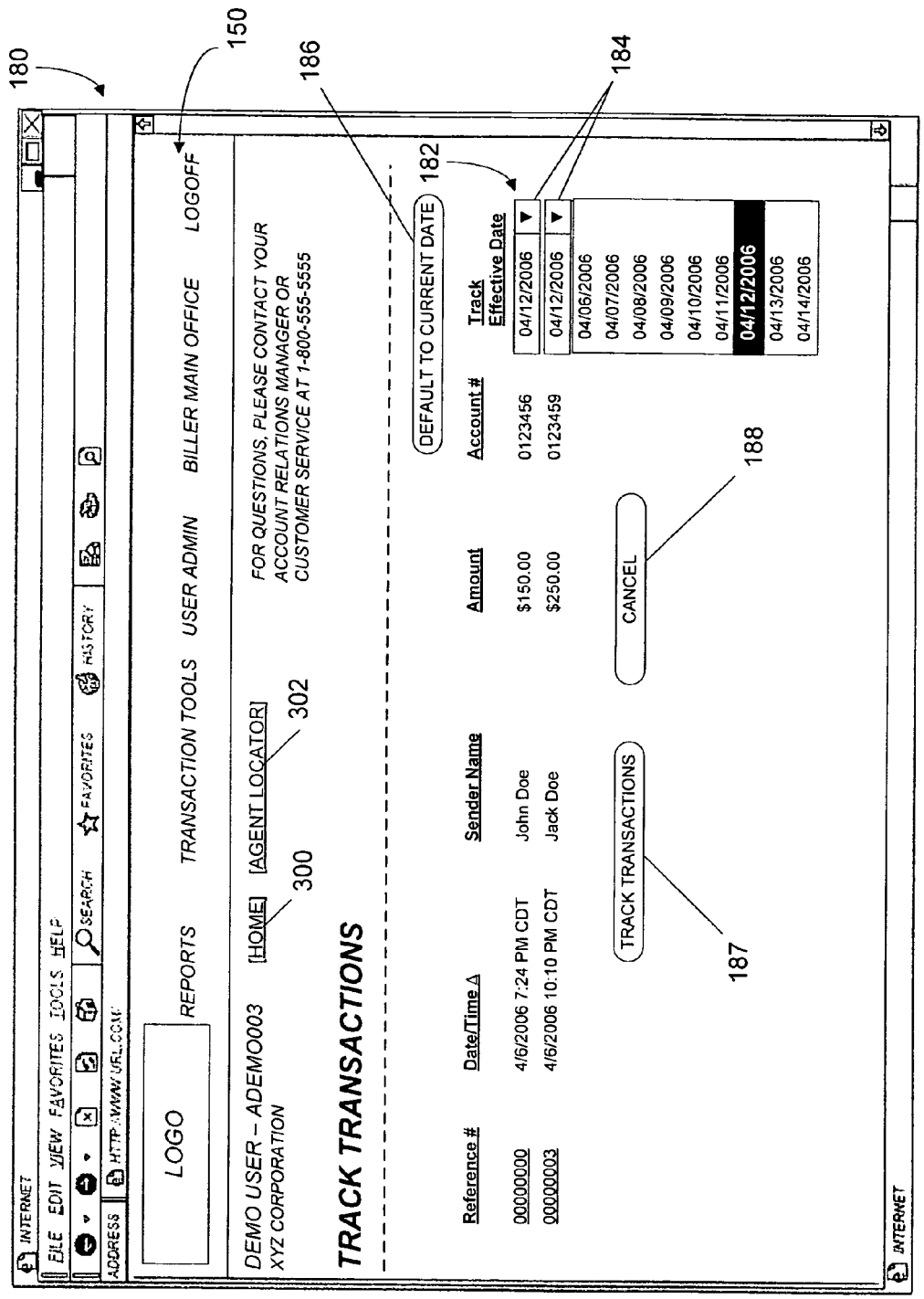
FIG. 13 illustrates a track transactions page of the payment management application of FIG. 1 according to embodiments of the invention.

After the user selects the track selected selection mechanism 176 or the track all results selection mechanism 178, the payment management application 72 can display a track transactions page 180, as shown in FIG. 13. The track transactions page 180 can include an items to track report 182 that includes each tracked payment selected by the user. For each tracked payment, the items to track report 182 can list the reference number of the payment, the date and time that payment was received, the sender or customer's name who provided the payment, the amount of the payment, an account number associated with the payment, and a tracking effective date. In some embodiments, the user can change the tracking effective date for a particular tracked payment using an effective date selection mechanism 184. The user can also select a default to current date selection mechanism 186 included in the track transactions page 180 to set the effective date of one or more tracked payments 62 to the current date.

After verifying the items to track report 182 and setting the tracking effective dates, the user can select a track transactions selection mechanism 187 included in the track transactions page 180. Alternatively, to cancel tracking the selected payments 62, the user can select a cancel selection mechanism 188 included in the track transactions page 180. Selecting the cancel selection mechanism 188 can cause the payment management application 72 to display a new or previously-displayed page, such as the items to track page 160 or the items to track report 170.

Figure 14:
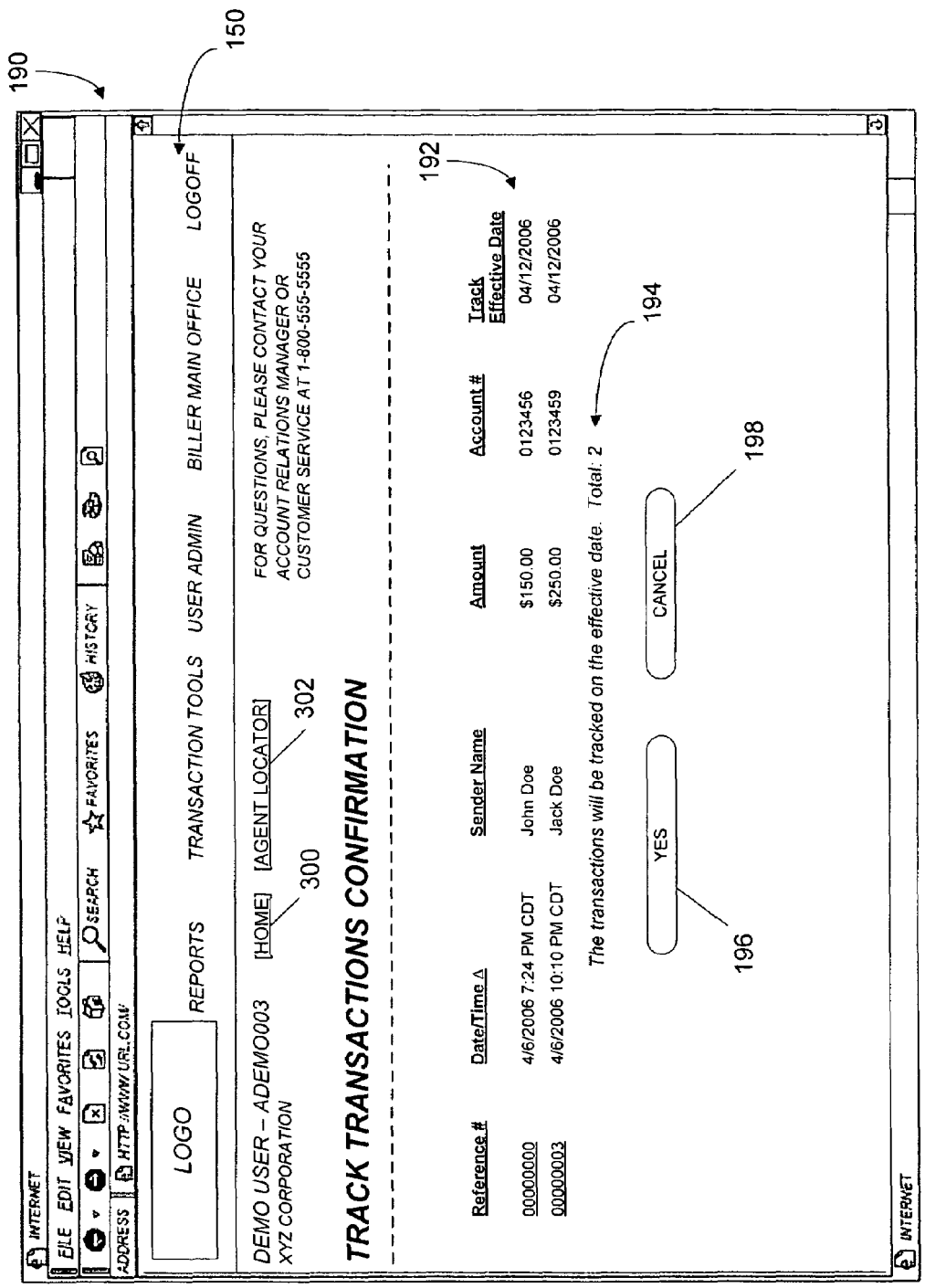
FIG. 14 illustrates a track transaction confirmation page of the payment management application of FIG. 1 according to one embodiment of the invention.

Selecting the track transactions selection mechanism 187 can cause the payment management application 72 to mark the selected payments 62 as tracked. In some embodiments, prior to marking the selected payments 62 as tracked, the payment management application 72 can display a transactions tracked confirmation page 190, as shown in FIG. 14. The transactions tracked confirmation page 190 can include a transactions tracked report 192 that lists the payments 62 to be tracked as selected by the user. The transactions tracked report 192 can also list the tracking effective date selected by the user as described with respect to FIG. 13. The transactions tracked report 192 can also include a statement or message 194 that each transaction or payment 62 included in the transactions tracked report 192 will be tracked as of the specified effective date. The statement 194 can also include a total number of transactions included in the transactions tracked report 192.

To confirm the selected payments 62, the user can select a yes selection mechanism 196 included in the transactions tracking confirmation page 190. Alternatively, to disregard and cancel the selected payments 62, the user can select a no selection mechanism 198 included in the transactions tracking confirmation page 190.

Figure 15:
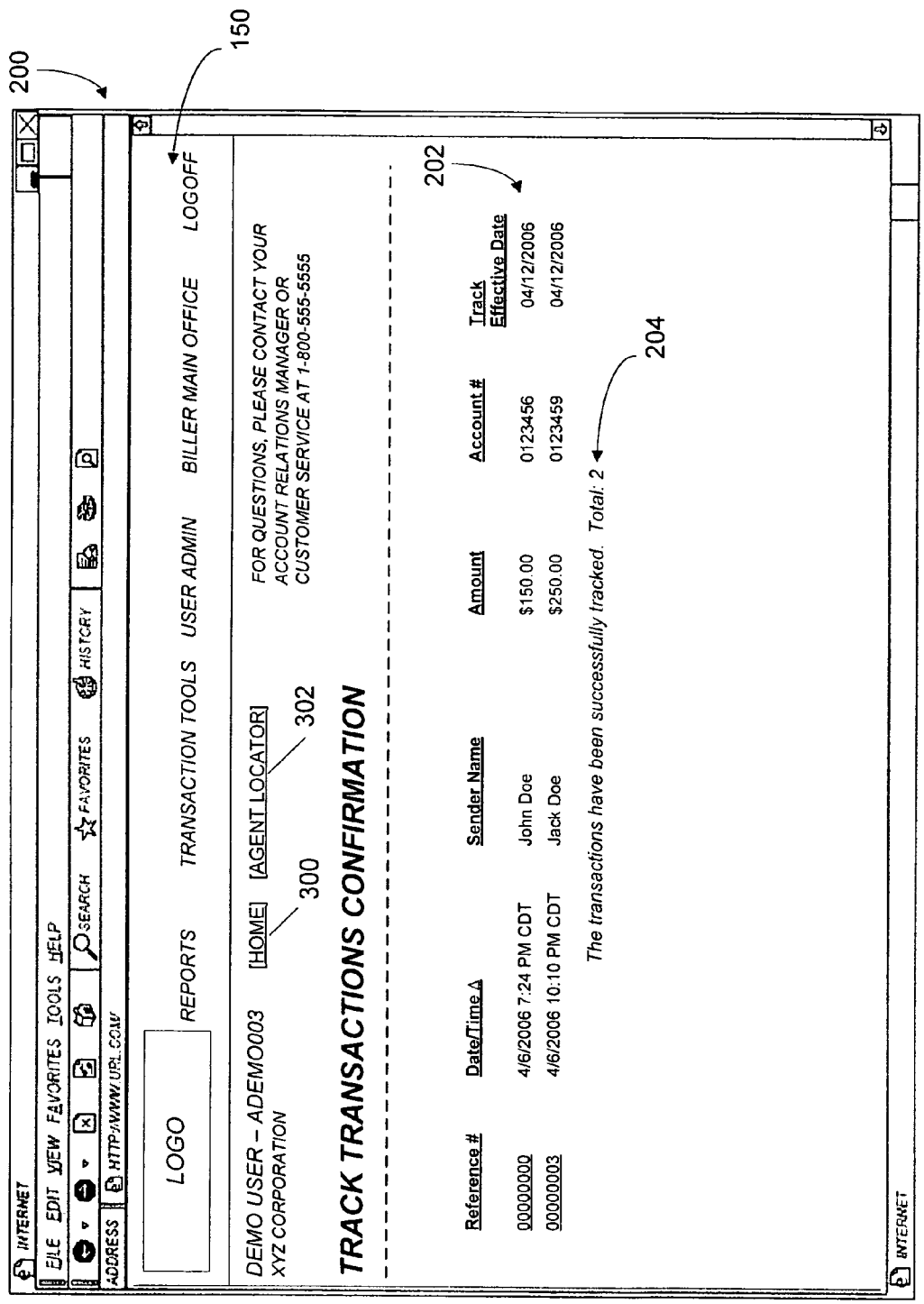
FIG. 15 illustrates a transactions tracked confirmation page of the payment management application of FIG. 1 according to one embodiment of the invention.

In some embodiments, selecting the yes selection mechanism 196 can cause the payment management application 72 to display a transactions tracked confirmation page 200, as shown in FIG. 15. The transactions tracked confirmation page 200 can include a tracked items summary report 202 that lists the payments 62 that have been tracked. The transactions tracked confirmation page 200 can also include a message or statement 204 that the payments 62 included in the tracked items summary report 202 have been successfully tracked. The statement 204 can also include a total number of payments successfully tracked. In some embodiments, any errors occurring when tracking a particular payment can be indicated in the statement 204.

Once a payment is tracked, the user can be notified of any updates or modifications to the payment. In some embodiments, the user can be notified via an email message, text message, voice message, facsimile message, a printed report, etc. that a tracked payment has been modified. The message can include a link that the user can select in order to execute the payment management application 62 and/or view the modified tracked payment. As noted above, a user can also be notified of any updates or modifications to a payment even when the payment is not tracked (e.g., the user can be notified of all updates or modifications to all payments 62).

In some embodiments, payments that have been tracked can be identified on any reports generated by the user using the payment management application 72. For example, ad hoc reports, daily reports, summary reports, real-time reports, etc., generated by the user can identify payments 62 that are tracked. For example, tracked payments 62 can be listed in a report in a different color or format or with a specific marker or indicator that specifies that the payment is being tracked. It should be understood that in some embodiments only particular users associated with a receiver 66 can be authorized to track payments. Users associated with a receiver 66 that are unauthorized to track payments 62, however, may be able to view tracked payments when generating a report using the payment management application 72.

Figure 16A:
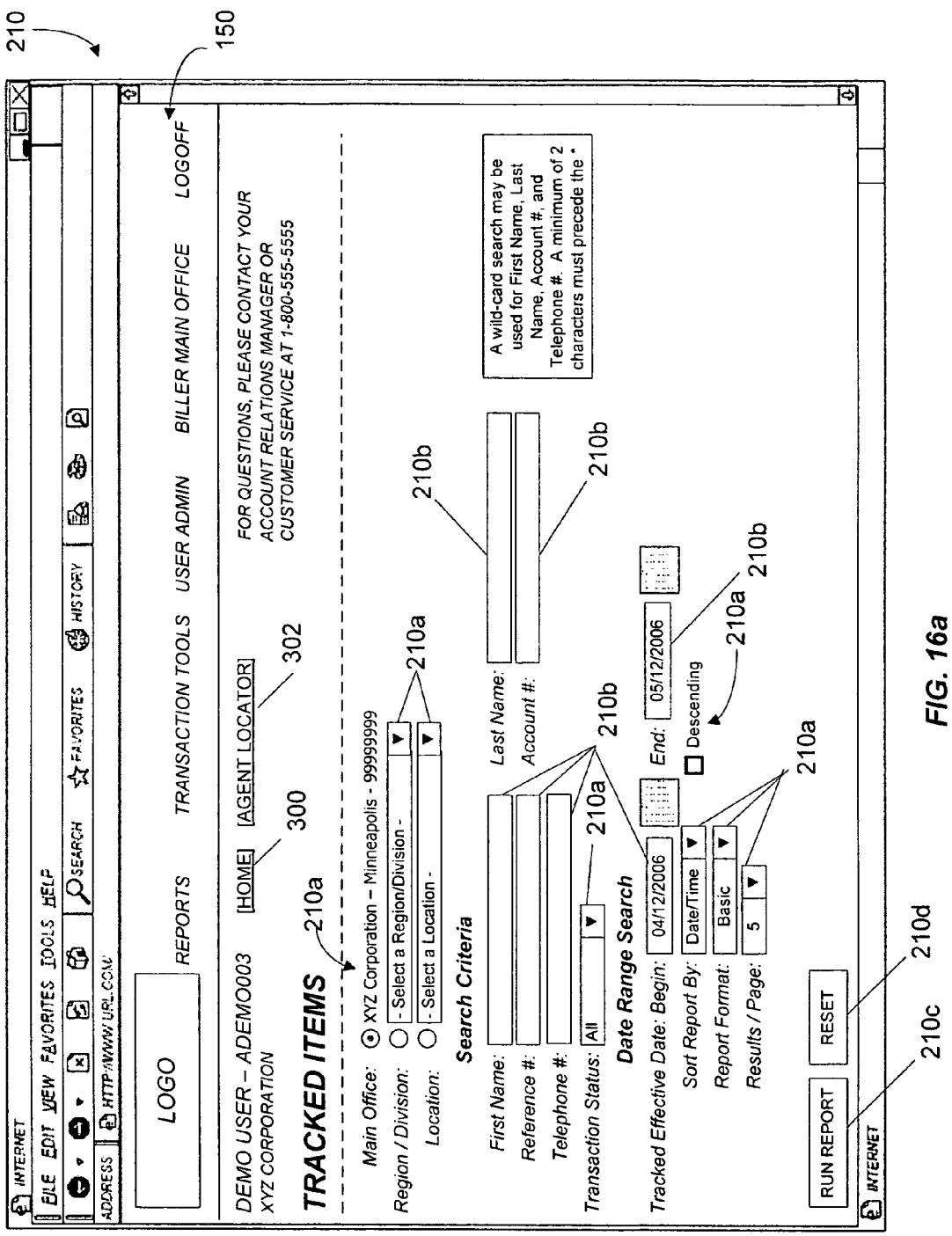
FIG. 16*a* illustrates a tracked items search criteria page of the payment management application of FIG. 1 according to one embodiment of the invention.

To untrack a previously-tracked payment, the user can select the tracking tool selection mechanism 150b included in the menu section 150 of the welcome page 130 (see FIGS. 9a and 9b) and select the tracked items selection mechanism. Selecting the tracked items selection mechanism can cause the payment management application 72 to display a tracked items criteria page 210, as shown in FIG. 16a. The user can use selection mechanisms 210a and input fields 210b included in the tracked items criteria page 210 to specify one or more search parameters. For example, the user can use the selection mechanisms 210a and input field 210b to specify a main office, a region/division, a location, a customer's name, a reference number, an account number, a telephone number, a transaction status, a tracked effective date range, a sort by parameter, a report format, and/or a number of results per page parameter.

Figure 16B:
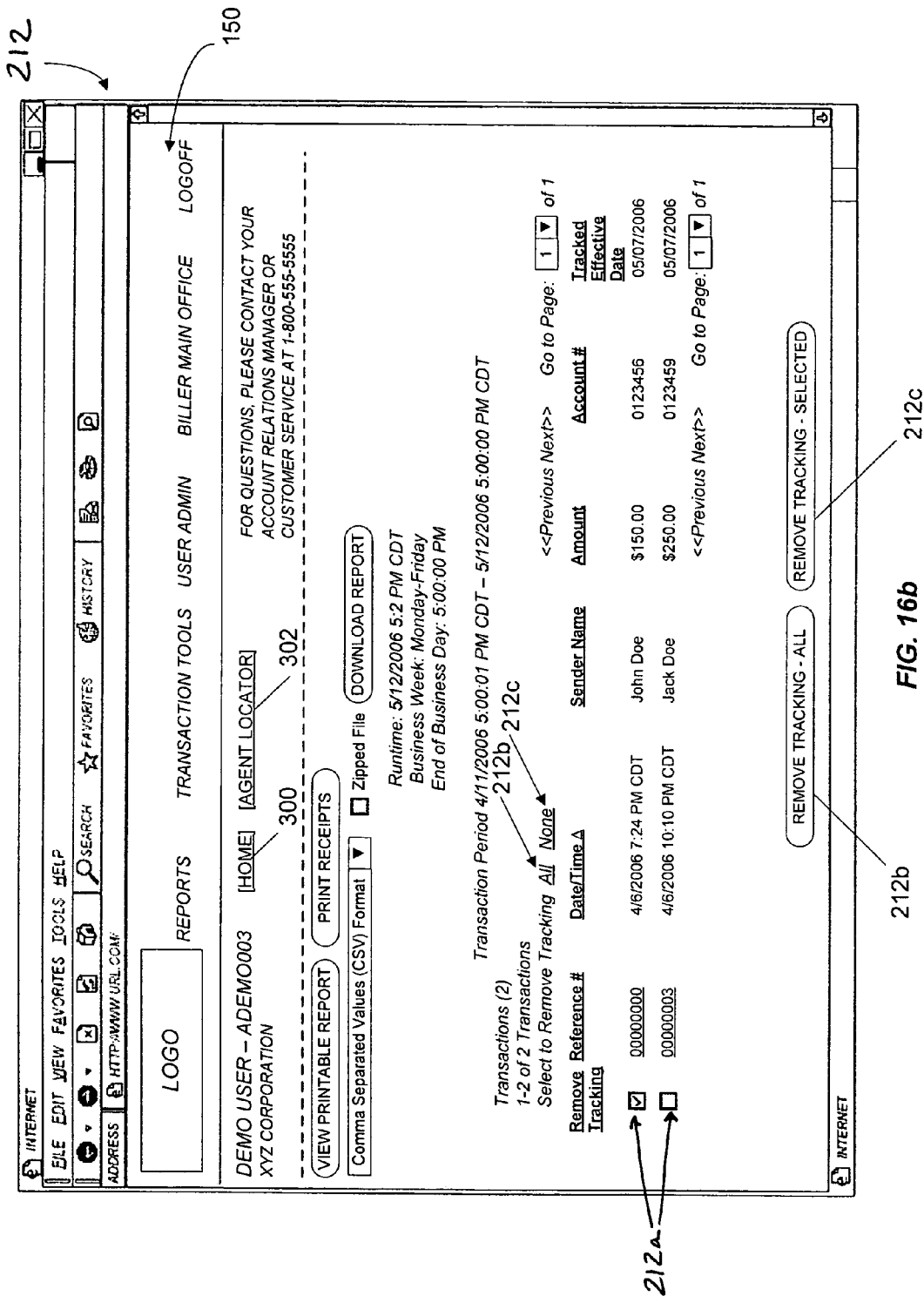
FIG. 16*b* illustrates a tracked items report page of the payment management application of FIG. 1 according to one embodiment of the invention.

As shown in FIG. 16a, the user can select a run report selection mechanism 210c included in the tracked items criteria page 210 in order to generate a tracked items report page 212, as shown in FIG. 16b. Alternatively, the user can select a reset selection mechanism 210d included in the tracked items criteria page 210 in order to cancel the process.

As shown in FIG. 16b, the tracked items report page 212 can list each tracked payment 62. Each listed payment can be associated with an unselect selection mechanism 212a that the user can use to unselect and untrack a particular payment 62. The tracked items report page 212 can also include one or more remove all tracking selection mechanisms 212b and one or more removed selected tracking selection mechanisms 212c.

Figure 16C:
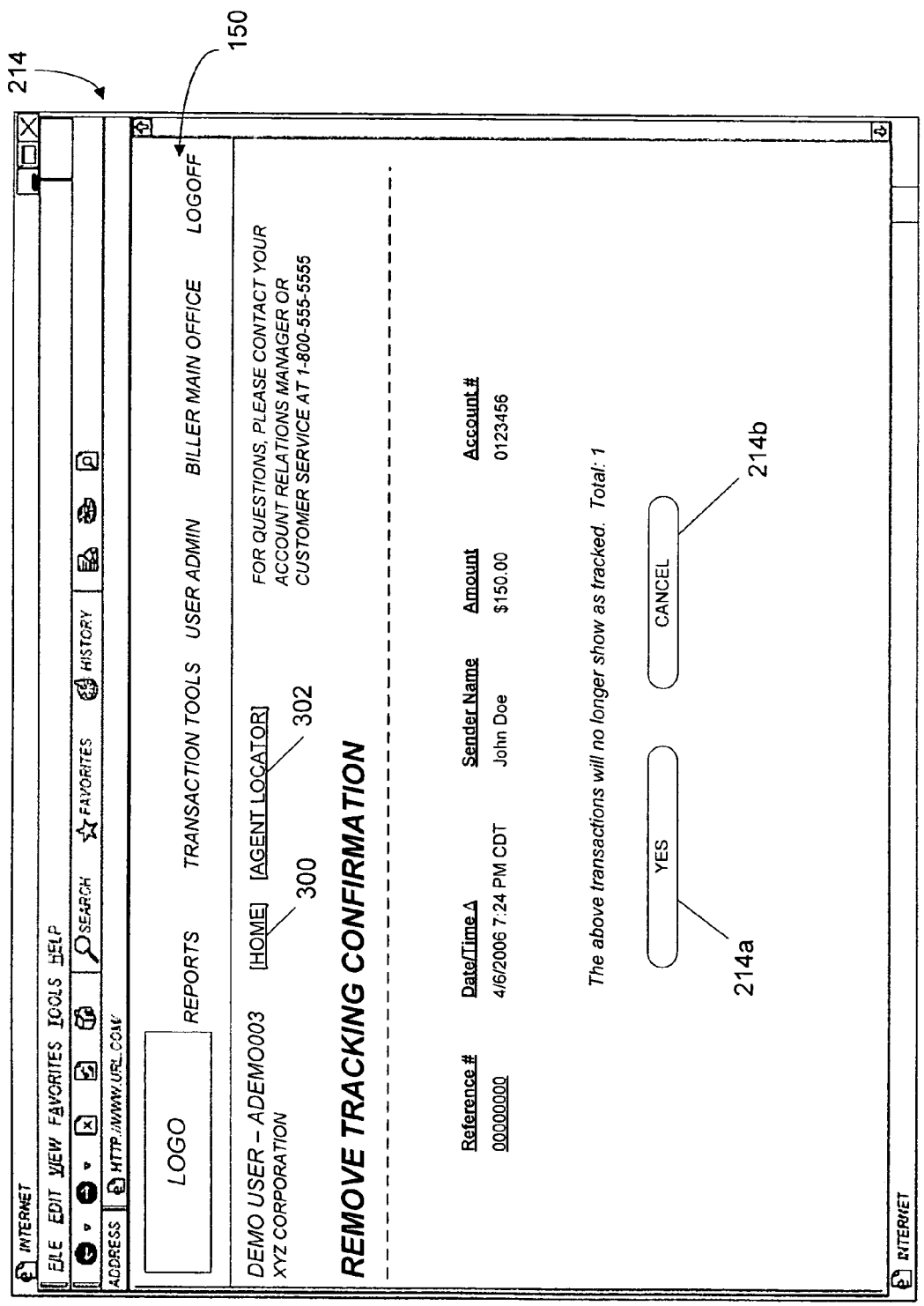
FIG. 16*c* illustrates a remove tracking confirmation page of the payment management application of FIG. 1 according to one embodiment of the invention.

If the user untracks one or more transactions, the payment management application 72 can display a remove tracking confirmation page 214, as shown in FIG. 16c. The remove tracking confirmation page 214 can list the transactions selected by the user to be untracked and can prompt the user to verify that he or she desires to untrack the listed transactions. As shown in FIG. 16c, the remove tracking confirmation page 214 can include a yes or confirm selection mechanism 214a and a no or cancel selection mechanism 214b.

Figure 16D:
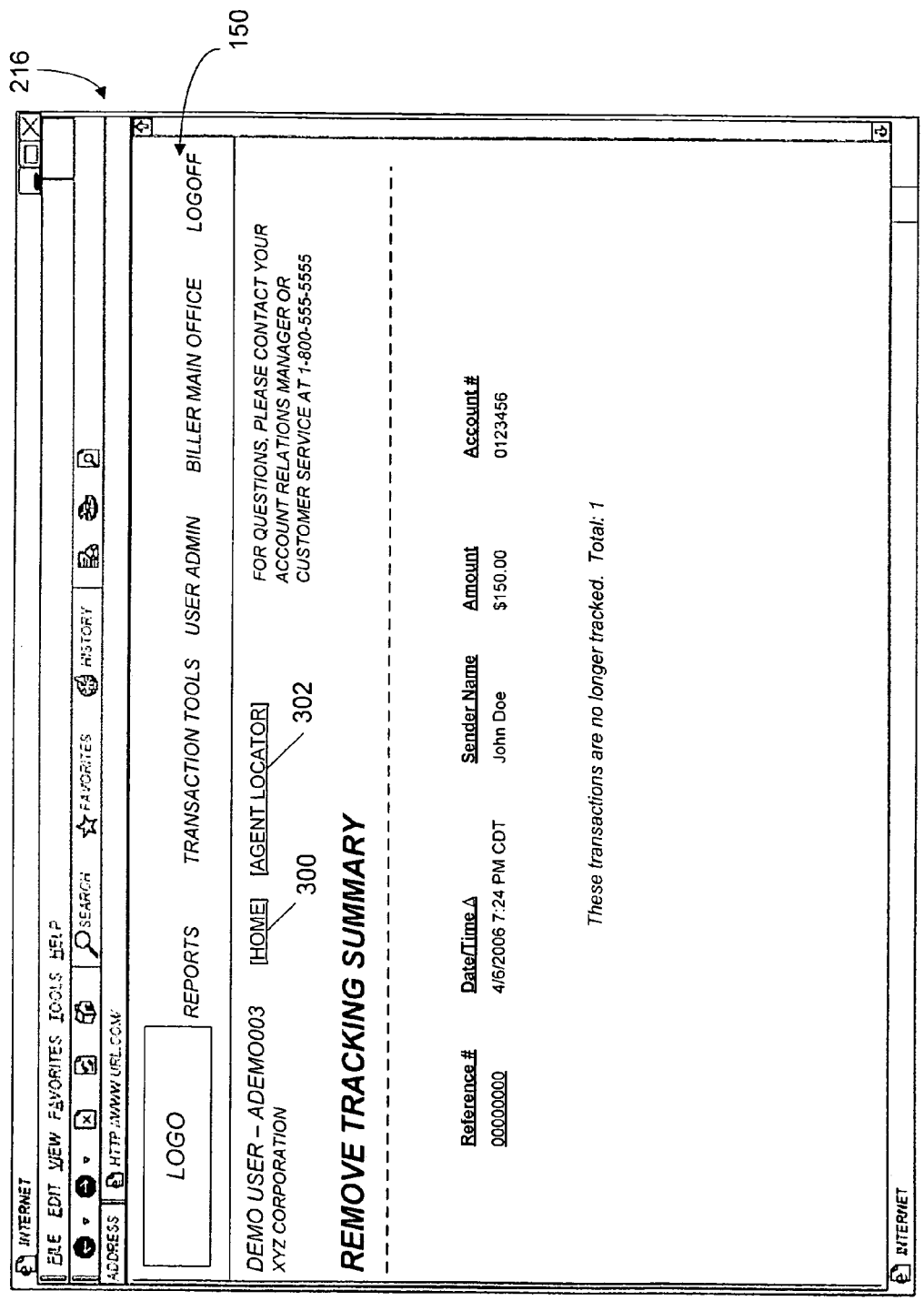
FIG. 16*d* illustrates a remove tracking summary page of the payment management application of FIG. 1 according to one embodiment of the invention.

If the user confirms the remove tracking request (e.g., by selecting the yes selection mechanism 214a), the payment management application 72 can display a remove tracking summary page 216, as shown in FIG. 16d. The remove tracking summary page 216 can inform the user that the selected transactions have been untracked.

As shown in FIGS. 4-25, pages generated by the payment management application 72 can include a home link 300 and/or an agent locator link 302. The user can select the home link 300 on any page generated by the payment management application 72 in order to view the welcome page 130, as described with respect to FIGS. 9a and 9b.

Figure 17:
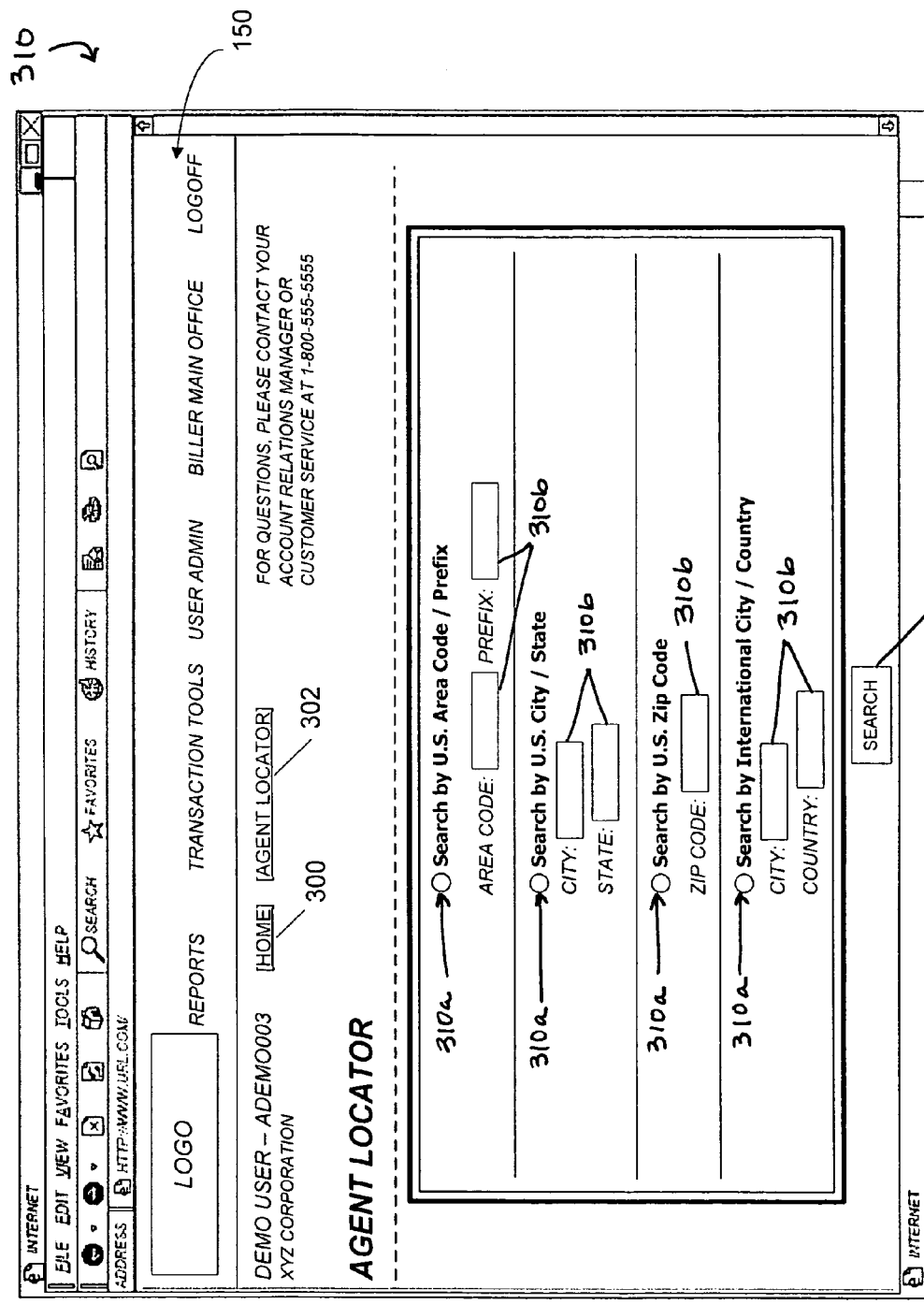
FIG. 17 illustrates an agent locator page of the payment management application of FIG. 1 according to one embodiment of the invention.

The user can select the agent locator link 302 in order to view an agent locator page 310, as illustrated in FIG. 17. The user can use the agent locator page 310 to locate an agent or location of the processing system 64. In some embodiments, the user can locate an agent or location of the processing system close to a customer 60 in order to provide instructions to the customer 60 for making a payment and/or receiving a returned payment. As shown in FIG. 17, the agent locator page 310 can include one or more selection mechanisms 310a and/or input fields 310b that the user can use to specify search parameters for a location or agent of the processing system 64. For example, the user can specify an area code, prefix, city, state, zip code, and/or country. The user can select a search selection mechanism 310c in order to submit the search parameters to the payment management application 72. As shown in FIG. 7a, in some embodiments, an administrator can turn on and off the agent locator link 302.

As shown in FIGS. 9a and 9b, selecting the transaction management selection mechanism 150b included in the menu section 150 of the welcome page 130 (or of another page generated by the payment management application 72) can allow the user to select an accept/reject tool provided by the payment management application 72 as described with respect to FIGS. 1-2. As shown in FIG. 9b, selecting the accept/reject tool can display another drop-down menu, or other selection mechanism, that allows the user to select a transaction summary feature or a summary report feature of the payment management application 72.

Figure 18:
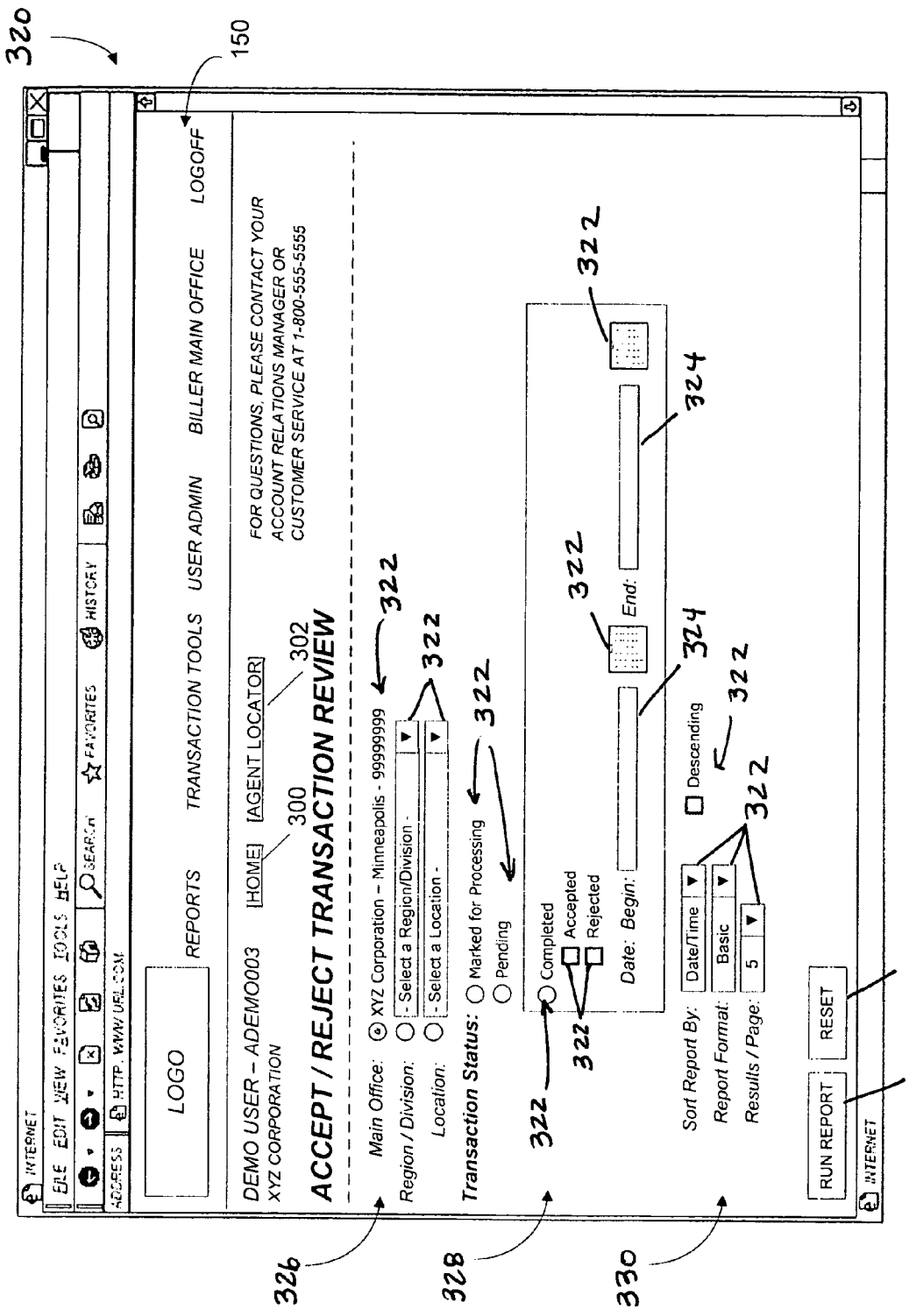
FIG. 18 illustrates an accept/reject transaction review criteria page of the payment management application of FIG. 1 according to one embodiment of the invention.

The user can select the transaction summary feature in order review payments received by the processing system 64 on behalf of one or more receivers 66 that have been accepted by the accept/reject tool, have been rejected by the accept/reject tool, have been conditionally accepted and placed in a pending state awaiting review by at least one user, and/or have been previously reviewed by at least one user and have been accepted or rejected (e.g., marked for processing). In some embodiments, selecting the transaction summary feature can cause the payment management application 72 to display an accept/reject transaction review criteria page 320, as shown in FIG. 18. The accept/reject transaction review criteria page 320 can include one or more selection mechanisms 322 and/or input mechanisms 324 for selecting and entering parameters for generating an accept/reject pending transaction review report from which transactions can be reviewed by the user. For example, the accept/reject transaction review criteria page 320 can include a receiver location section 326 that includes selection mechanisms for selecting a receiver main office, a receiver region/division, and/or a receiver location.

As shown in FIG. 18, the accept/reject transaction review criteria page 320 can also include a transaction status search criteria section 328. The transaction status search criteria section 328 can include one or more selection mechanisms 322 and/or input mechanisms 324 for selecting and/or entering transaction status search parameters, such as a status of transactions parameter (e.g., marked for processing, pending, or completed) and a transaction date range. As shown in FIG. 18, in some embodiments, if the user specifies search parameters that indicate only completed transactions should be included in the accept/reject transaction review report page, the user can specify whether accepted and completed transactions and/or rejected and completed transactions should be included in the report.

In some embodiments, the accept/reject transaction review criteria page 320 can also include a report format section 330 that includes one or more selection mechanisms 322 and/or input mechanisms 324 for selecting a format of the accept/reject transaction report. For example, the user can select a report sorting parameter, a specific report format parameter, and/or a result per page parameter.

As shown in FIG. 18, the accept/reject transaction review criteria page 320 can also include a run report selection mechanism 332 and a reset selection mechanism 324. Selecting the reset selection mechanism 324 can cause the payment management application 72 to disregard any changes made by the user to the values and parameters and can return the values and parameters to their default values.

Figure 19:
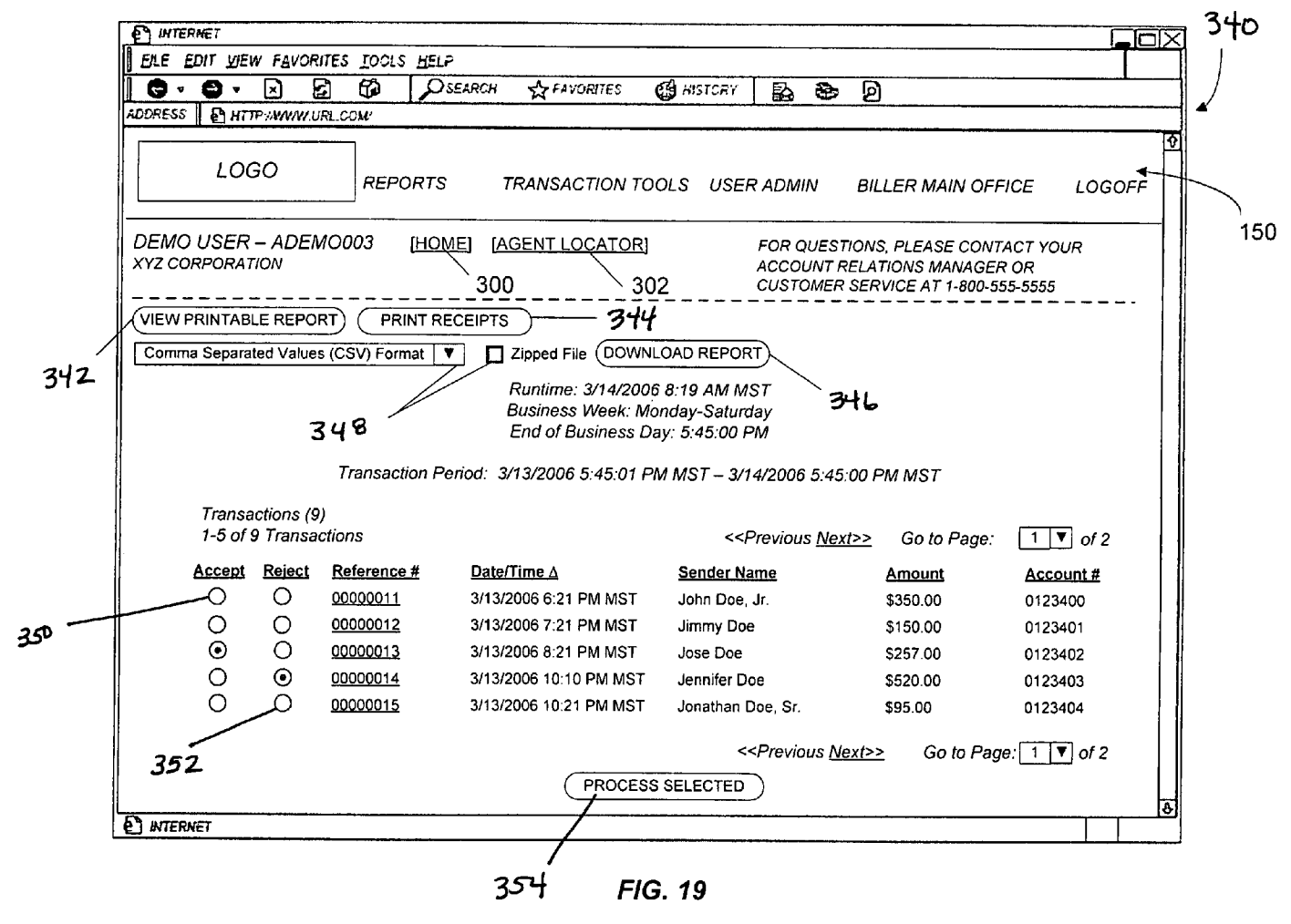

Selecting the run report selection mechanism 332 can cause the payment management application 72 to generate an accept/reject transaction report page 340, as illustrated in FIG. 19. The accept/reject report page 340 can include payments 62 received by the processing system 64 that match the search criteria set by the user on the accept/reject transaction review criteria page 320. For example, the accept/reject transaction report page 340 shown in FIG. 19 includes conditionally accepted transactions awaiting review by a user.

As shown in FIG. 19, the accept/reject transaction report page 340 can include a view printable report selection mechanism 342 and/or a print receipts selection mechanism 344. The user can select the view printable report selection mechanism 342 in order to view a version of the accept/reject transaction report page 340 that can be sent to a printer or other destination. In addition, the user can select the print receipts selection mechanism 344 in order to print or re-print receipts associated with the payments 62 included in the accept/reject transaction report page 340. As also shown in FIG. 19, the accept/reject transaction report page 340 can also include a download report selection mechanism 346 and one or more download parameter selection mechanisms 348. The user can select the download report selection mechanism 346 in order to download a version of the accept/reject transaction report page 340 and store the accept/reject transaction report page 340 to a storage device. The downloaded version of the accept/reject transaction report page 340 can be formatted based on the download parameters selected by the user using the download parameters selection mechanisms 348. In some embodiments, the user can also communicate or transmit (e.g., email) a version of the accept/reject transaction report page 340 to one or more receipts using the payment management application 72.

Each payment included in the accept/reject transaction report page 340 can be identified by a reference number, a date and time, a sender's or customer's name, an amount, and an account number. As shown in FIG. 19, if a payment listed in the accept/reject transaction report page 340 is conditionally accepted (e.g., pending), the payment can be associated with an accept transaction selection mechanism 350 and a reject transaction selection mechanism 352. The user can use the accept transaction selection mechanism 350 and the reject transaction selection mechanism 352 to accept or reject the pending transaction. In some embodiments, the accept/reject transaction report page 340 can also include an accept all selection mechanism and/or a reject all selection mechanism that the user can select in order to accept or reject all pending transactions included in the accept/reject transaction report page 340.

Figure 20:
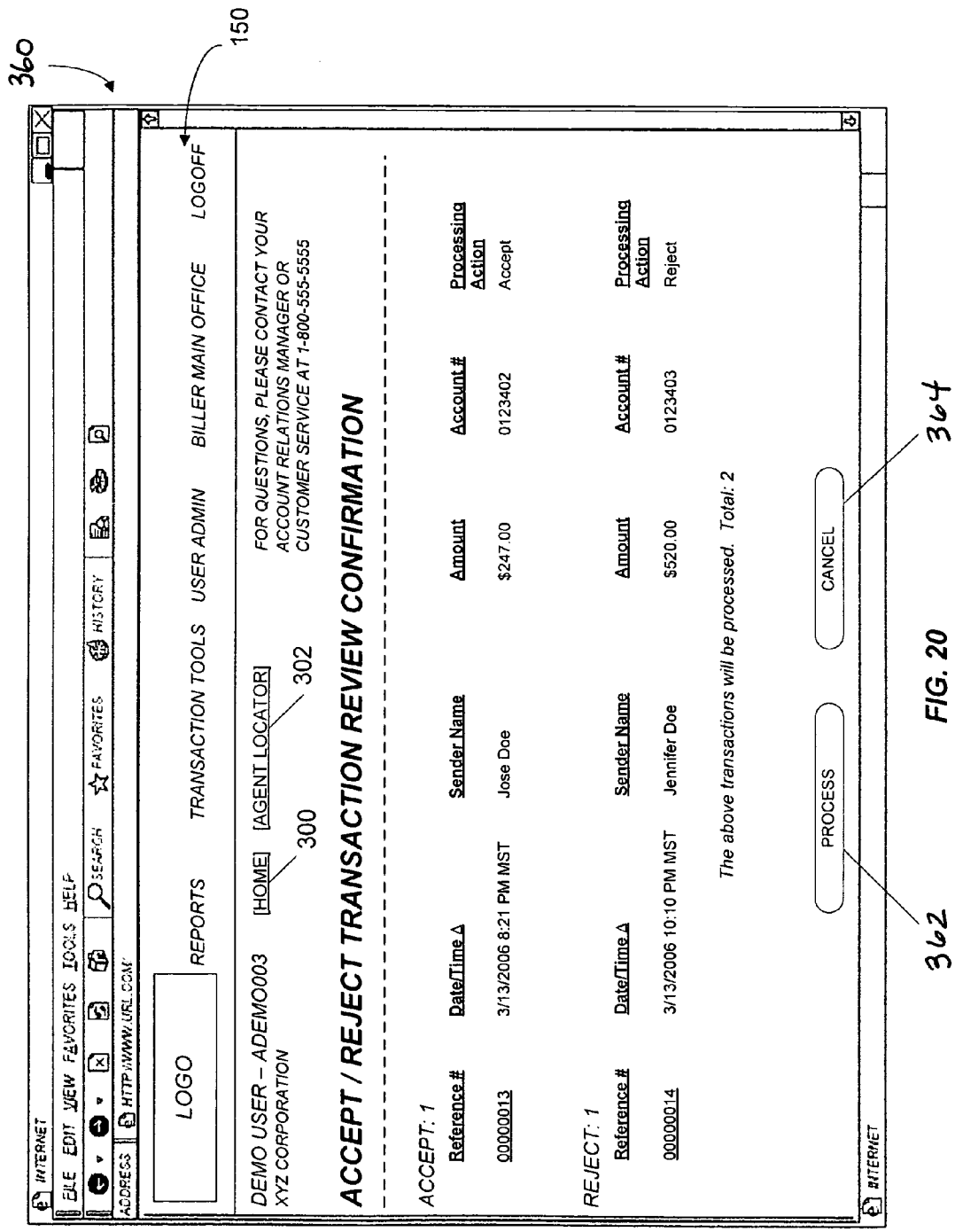
FIG. 20 illustrates an accept/reject pending transaction review confirmation page of the payment management application of FIG. 1 according to one embodiment of the invention.

After the user selects one or more payments 62 to accept or reject, the user can select a process selected selection mechanism 354 included in the accept/reject transaction report page 340 in order to process the selected transactions. In some embodiments, after the user selects the process selected selection mechanism 354, the payment management application 72 can display an accept/reject transaction review confirmation page 360, as shown in FIG. 20. The accept/reject transaction review confirmation page 360 can list each transaction accepted or rejected by the user on the accept/reject transaction report page 340. For each accepted or rejected payment, the accept/reject transaction review confirmation page 360 can list the reference number of the payment, the date and time that payment was received, the date and time that the payment was sent, the effective entry date and time of the payment, the sender or customer's name who provided the payment, the amount of the payment, an account number associated with the payment, a processing action (e.g., accept or reject), and/or any other parameter associated with a payment. In some embodiments, as shown in FIG. 20, the accept/reject transaction review page 360 can display accepted transactions and rejected transactions in separate tables or lists. The accept/reject transaction review page 360 can also display a total number of transactions accepted or rejected, the total number of transactions accepted, and/or the total number of transactions rejected.

After verifying the accept/reject transaction review confirmation page 360, the user can select a process selection mechanism 362 included in the accept/reject transaction review confirmation page 360. Alternatively, to cancel processing the selected payments 62, the user can select a cancel selection mechanism 364 included in the accept/reject transaction review confirmation page 360. Selecting the cancel selection mechanism 364 can cause the payment management application 72 to display a new or previously-displayed page, such as the accepted/reject transaction report page 340.

Selecting the process selection mechanism 362 can cause the payment management application 72 to process (e.g., mark for processing) each transaction manually accepted or rejected by the user. For example, the payment management application 72 can process each accepted transaction (e.g., via the payment processing system 65) in order to affect payment from the customer 60 to a receiver 66 or another destination (e.g., a trust account) through the processing system 64. The payment management application 72 can also process each rejected transaction (e.g., via the payment processing system 65) in order to void the rejected payment and/or cause the payment to be returned to the customer 60 (e.g., by the processing system 64). In some embodiments, accepted and/or rejected transactions can be processed by the payment management application 72 and/or the payment processing system 65 in a batch at predetermined times of the day, week, etc. Alternatively, the accepted and/or rejected transactions can be processed by the payment management application 72 and/or the payment processing as they are selected for processing.

Figure 21:
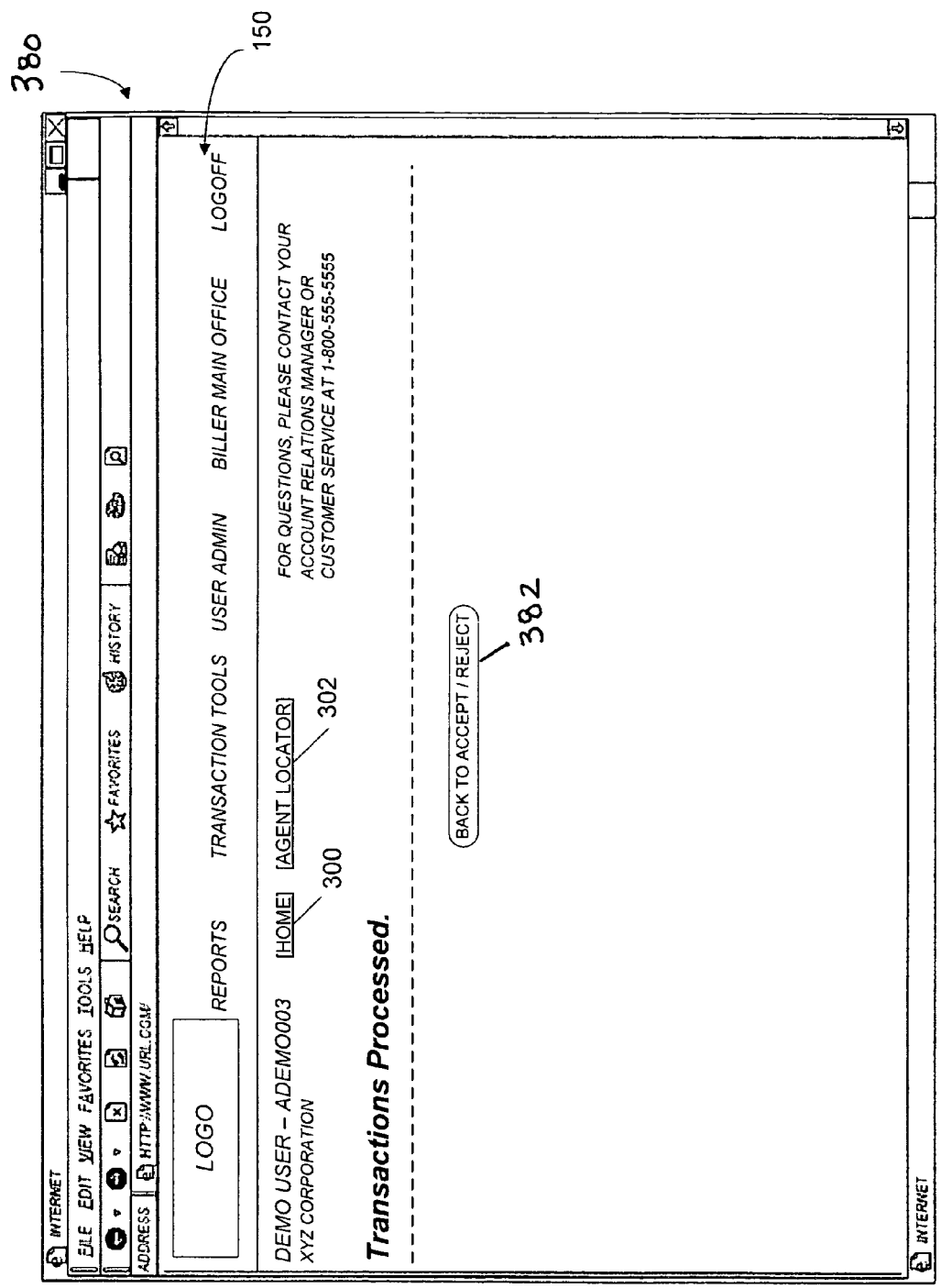
FIG. 21 illustrates an accept/reject pending transactions processed page of the payment management application of FIG. 1 according to one embodiment of the invention.

In some embodiments, selecting the process selection mechanism 362 can also cause the payment management application 72 to display an accept/reject transactions processed page 380, as shown in FIG. 21. The accept/reject transactions processed page 380 can include a message or statement confirming that the selected transactions have been processed as requested. Alternatively, if any errors occurred during the processing of the selected transactions, the accept/reject transactions processed page 380 can include a message or statement indicating any errors that occurred. In some embodiments, the message or statement can indicate a number of transactions processed and/or a number of transactions in which errors occurred. As shown in FIG. 21, the accept/reject transactions processed page 380 can include a back or return selection mechanism 382. The user can select the back selection mechanism 382 in order to close the accept/reject transaction summary page 380 and return to a new or previously-displayed page, such as the accept/reject transaction review criteria page 320 or the accept/reject transaction report page 340.

In some embodiments, the payment management application can be configured to require multiple levels of pending payment review before allowing a pending payment to be manually accepted or rejected. For example, after a first user associated with a receiver 66 reviews pending payments using the payment management application 72 and accepts or rejects one or more of the pending payments, the payment management application 72 can prompt or wait for a second user (e.g., a supervisor) to review and approve the decisions of the first user before committing and processing each accepted or rejected payment. In some embodiments, the second user can modify any of the decisions made by the first user. The payment management application can be configured to require two or more levels of review of pending payments before finalizing a decision regarding a particular payment. In some embodiments, the payment management application 72 can also be configured to require particular user roles or users (e.g., an administrator) to review decisions at each level of review. A receiver 66 can also specify particular user or user roles that are authorized to review pending payment at each level of review. In addition, the payment management application 72 can be configured to enable and disable the requirement for multiple levels of review.

Figure 22:
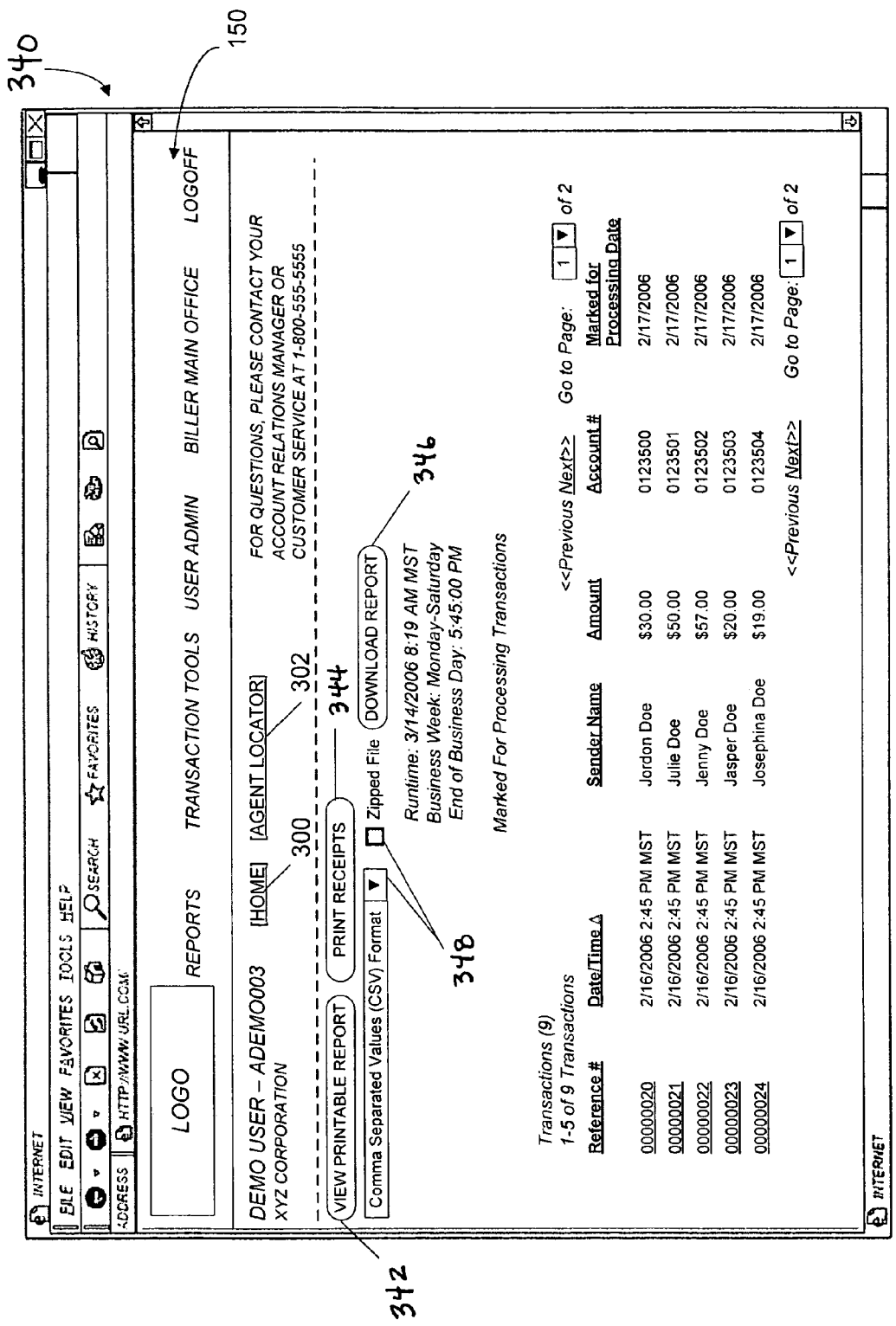
FIG. 22 illustrates an accept/reject marked for processing transaction review report page of the payment management application of FIG. 1 according to one embodiment of the invention.

As shown in FIG. 18, in addition to reviewing pending transactions, the user can review transactions marked for processing (e.g., transactions previously accepted or rejected by a user that are waiting processing and/or processing completion). If the user selects to review marked-for-processing transactions (e.g., via the selection mechanisms 322 and input mechanisms 324 included in the accept/reject transaction review criteria page 320), the payment management application 72 can display an accept/reject transaction report page 340 that lists marked-for-processing transactions matching the criteria specified by the user. For example, FIG. 22 illustrates an accept/reject transaction report page 340 that lists marked-for-processing transactions. As shown in FIG. 22, for each marked-for-processing transaction the accept/reject transaction report page 340 can list a reference number, a date and time, a sender's name, an amount, an account number, and a marked for processing date.

In some embodiments, the user can also use the payment management application 72 to view completed transactions (e.g., transaction previously accepted or rejected by a user). If the user selects to review completed transactions (e.g., via the selection mechanisms 322 and input mechanisms 324 included in the accept/reject transaction review criteria page 320), the payment management application 72 can display an accept/reject transaction report page that lists completed transactions matching the criteria specified by the user. For example, FIG. 23 illustrates an accept/reject transaction report page 340 that lists completed accepted transactions and completed rejected transactions. As shown in FIG. 23, for each completed transaction the accept/reject transaction report page 340 can list a reference number, a date and time, a sender's name, an amount, an account number, and a processing action. In some embodiments, in addition to or in place of transactions manually completed by a user, the accept/reject transaction report page 340 can list completed transactions automatically accepted and/or automatically rejected by the payment processing system 65.

As shown in FIGS. 22 and 23, each type of accept/reject transaction report page 340 can include a view printable report selection mechanism 342, a print receipts selection mechanism 344, a download report selection mechanism 346, and/or one or more download parameter selection mechanisms 348.

Figure 24:
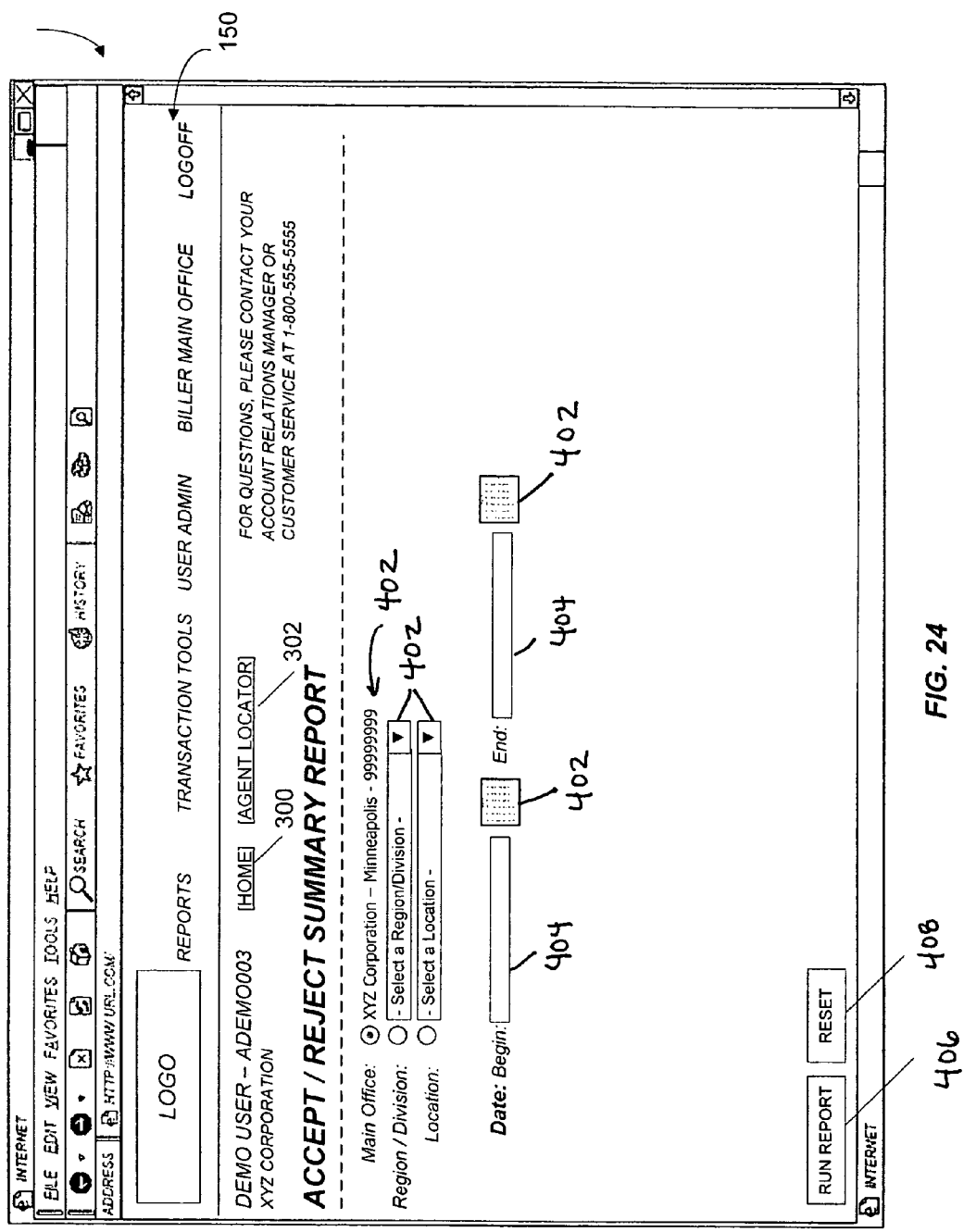
FIG. 24 illustrates an accept/reject summary page of the payment management application of FIG. 1 according to one embodiment of the invention.

In some embodiments, the payment management application 72 can also display one or more summary reports associated with accepted and/or rejected transactions. As shown in FIG. 9b, the user can select the transaction management selection mechanism 150b included in the menu section 150 of the welcome page 130 (or of other pages generated by the payment management application 72) and select the accept/reject tool in order to a display a menu or list (e.g., a drop-down menu) of available features of the accept/reject tool. The menu can include a summary report feature that the user can select in order to view an accept/reject summary report criteria page 400, as shown in FIG. 24. The user can use selection mechanisms 402 and input mechanisms 404 included in the accept/reject summary report criteria page 400 in order to specify one or more search parameters. For example, the user can use the selection mechanisms 402 and input mechanisms 404 in order to specify a receiver main office, a receiver region/division, a receiver a location, and/or a date range.

As shown in FIG. 24, the user can select a run report selection mechanism 406 included in the accept/reject summary report criteria page 400 in order to order generate an accept/reject summary report page 410, as shown in FIG. 25. Alternatively, the user can select a reset selection mechanism 408 included in the accept/reject summary report criteria page 400 in order to cancel the process.

As shown in FIG. 25 and as described with respect to FIG. 2, the accept/reject summary report page 410 can list or display statistics associated with transactions accepted and/or rejected by one or more users associated with one or more receivers using the payment management application 62. For example, the accept/reject summary report page 410 can summarize the performance of a user, a group of users, or a receiver in clearing or processing transactions. As shown in FIG. 25, the accept/reject summary report page 410 can indicate a number of conditionally accepted payments, a number of conditionally accepted payments ultimately accepted, a number of conditionally accepted payments ultimately rejected, a percentage of payments automatically accepted, a percentage of reviewed payments accepted, a percentage of payments automatically rejected, a percentage of reviewed payments rejected, and a number of outstanding pending payments. In some embodiments, the accept/reject summary report page 410 can provide statistics for each day within a date rage specified by the user using the accept/reject summary report criteria page 400. The accept/reject summary report page 410 can also provide grand total statistics for the entire date range specified by the user. In some embodiments, the summary report page 400 can also include statistics related to the number of transactions automatically accepted and/or automatically rejected by the payment processing system 65.

As shown in FIG. 25, the accept/reject summary page 400 can include a view printable report selection mechanism 412, a print receipts selection mechanism 414, a download report selection mechanism 416, and/or one or more download parameter selection mechanisms 418.

Various features of the invention are set forth in the following claims.

The invention claimed is:

1. A computer-implemented method of processing a plurality of payments, the plurality of payments from a plurality of customers and payable to at least one receiver and including at least one of a check payment, a credit card payment, a debit card payment, and a stored value card payment, the method comprising:
   receiving, at a computer-implemented processor, the plurality of payments before a transfer of funds occurs between each of the plurality of customers and the at least one receiver;
   determining, with the processor, a first set of payments included in the plurality of payments to automatically accept on behalf of the at least one receiver based on a plurality of parameters;
   determining, with the processor, a second set of payments included in the plurality of payments to reject on behalf of the at least one receiver based on the plurality of parameters;
   determining, with the processor, a third set of payments included in the plurality of payments to conditionally accept on behalf of, and to hold for manual review by, the at least one receiver based on the plurality of parameters;
   electronically prompting the at least one receiver to accept or reject at least one payment included in the third set of payments; and
   electronically receiving at least one instruction from the at least one receiver related to the third set of payments.

2. The method of claim 1 wherein electronically receiving at least one instruction from the at least one receiver includes electronically receiving at least one instruction from the at least one receiver to accept at least one payment in the third set of payments.

3. The method of claim 1 wherein electronically receiving at least one instruction from the at least one receiver includes electronically receiving an instruction from the at least one receiver to reject at least one payment in the third set of payments.

4. The method of claim 3 further comprising returning a payment to at least one of the plurality of customers based on the instruction to reject the at least one payment.

5. The method of claim 1 and further comprising configuring the parameters as specified by the at least one receiver.

6. The method of claim 5 wherein configuring the parameters as specified by the at least one receiver includes configuring the parameters to include at least one of a valid account number, an invalid account number, and a valid payment amount.

7. The method of claim 1 and further comprising rejecting the second set of payments and returning a payment to at least one of the plurality of customers.

8. The method of claim 1 and further comprising notifying the at least one receiver of the third set of payments.

9. The method of claim 1 and further comprising generating at least one summary report, the summary report including at least one of a number of payments included in the third set of payments, a number of payments included in the third set of payments that were accepted, and a number of payments included in the third set of payments that were rejected.

10. The method of claim 1 and further comprising automatically processing the third set of payments a predetermined amount of time after electronically prompting the at least one receiver.

11. The method of claim 10 wherein automatically processing the third set of payments includes automatically accepting the third set of payments.

12. The method of claim 10 wherein automatically processing the third set of payments includes automatically rejecting the third set of payments.

13. A method as claimed in claim 1, further comprising generating, with a payment management device configured to manage multiple aspects of a payment processing process including reconciliation, balancing, and skip tracing, an instruction to accept or reject a payment before electronically receiving at least one instruction from the at least user related to the third set of payments.

* * * * *